(12) United States Patent
Elliston et al.

(10) Patent No.: US 12,507,827 B2
(45) Date of Patent: Dec. 30, 2025

(54) COOKING DEVICE AND COMPONENTS THEREOF

(71) Applicant: SHARKNINJA OPERATING LLC, Needham, MA (US)

(72) Inventors: Rupert Elliston, London (GB); Roger Neil Jackson, Cornwall (GB); Steven Carter, Needham, MA (US); Benjamin Sharp, Cumbria (GB); Thomas Guerin, Boston, MA (US); Christopher T. Martin, Concord, MA (US); Christopher Smith, Newton, MA (US); Joshua D. Anthony, North Billerica, MA (US); Michaela Dubeau, Uxbridge, MA (US); Joyce Chien Tu, Melrose, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/139,574

(22) Filed: Dec. 31, 2020

(65) Prior Publication Data

US 2021/0121012 A1    Apr. 29, 2021

Related U.S. Application Data

(60) Provisional application No. 63/001,953, filed on Mar. 30, 2020.

(51) Int. Cl.
*A47J 37/06* (2006.01)
*A47J 27/00* (2006.01)
(Continued)

(52) U.S. Cl.
CPC ......... *A47J 37/0641* (2013.01); *A47J 27/004* (2013.01); *A47J 27/0802* (2013.01);
(Continued)

(58) Field of Classification Search
CPC .... A47J 27/08; A47J 27/0806; A47J 27/0815; A47J 27/0802; A47J 27/0804;
(Continued)

(56) References Cited

U.S. PATENT DOCUMENTS

| 472,002 A | 3/1892 | Ross et al. |
| 1,254,384 A | 1/1918 | Albro |

(Continued)

FOREIGN PATENT DOCUMENTS

| CN | 1139304 | 1/1997 |
| CN | 2253170 Y | 4/1997 |

(Continued)

OTHER PUBLICATIONS

Webster Definition, "bias" (Year: 2022).*

(Continued)

*Primary Examiner* — Sang Y Paik
*Assistant Examiner* — Bonita Khlok
(74) *Attorney, Agent, or Firm* — Mintz, Levin, Cohn, Ferris, Glovsky and Popeo, P.C.

(57) ABSTRACT

A cooking system includes a housing defining a hollow chamber configured to receive food. The housing has an upper portion defining an opening to said hollow chamber. A lid is movable relative to the housing between an open position and a closed position. A lid lock is associated with at least one of the lid and the housing. The lid is configurable between a lid locked condition with the housing and a lid unlocked condition with the housing via the lid lock. At least one vent is disposed in at least one of the lid and the housing, and the at least one vent is configurable between an open vent condition and a closed vent condition via actuation of the lid lock.

22 Claims, 21 Drawing Sheets

(51) Int. Cl.
  *A47J 27/08* (2006.01)
  *A47J 27/086* (2006.01)
  *A47J 27/09* (2006.01)
  *A47J 36/32* (2006.01)
  *A47J 37/07* (2006.01)

(52) U.S. Cl.
  CPC ....... *A47J 27/0804* (2013.01); *A47J 27/0806* (2013.01); *A47J 27/086* (2013.01); *A47J 27/09* (2013.01); *A47J 36/32* (2013.01); *A47J 37/0664* (2013.01); *A47J 37/0754* (2013.01); *A47J 2202/00* (2013.01)

(58) Field of Classification Search
  CPC ...... A47J 27/086; A47J 27/09; A47J 37/0641; A47J 37/06; A47J 36/06–10; A23L 5/10–17
  USPC ............................ 220/315; 99/339, 403, 407
  See application file for complete search history.

(56) References Cited

U.S. PATENT DOCUMENTS

| | | |
|---|---|---|
| 1,986,088 A | 1/1935 | Wild |
| 2,055,972 A | 9/1936 | Fritsche |
| 2,188,757 A | 1/1940 | Moon |
| 2,235,911 A | 3/1941 | Wilcox |
| 2,253,833 A | 8/1941 | Volks |
| 2,313,968 A | 3/1943 | Reich |
| 2,378,950 A | 6/1945 | Reich |
| 2,429,282 A | 10/1947 | Ness |
| 2,430,582 A | 11/1947 | Reich |
| 2,462,287 A | 2/1949 | Richeson et al. |
| 2,532,639 A | 12/1950 | Payne |
| 2,622,591 A | 12/1952 | Bramberry |
| 2,785,277 A | 3/1957 | Jepson |
| 2,952,764 A | 9/1960 | Minami |
| 3,076,405 A | 2/1963 | Lang |
| 3,122,134 A | 2/1964 | Reeves |
| 3,514,301 A | 5/1970 | Berger |
| 3,529,582 A | 9/1970 | Hurko et al. |
| 3,610,885 A | 10/1971 | Zingg |
| 3,821,454 A | 6/1974 | Lobel |
| 3,828,760 A | 8/1974 | Farber et al. |
| 4,071,739 A | 1/1978 | Jenn et al. |
| 4,106,486 A | 8/1978 | Lee |
| 4,106,488 A | 8/1978 | Gordon |
| 4,148,250 A | 4/1979 | Miki et al. |
| 4,162,741 A | 7/1979 | Walker et al. |
| 4,210,072 A | 7/1980 | Pedrini |
| 4,241,288 A | 12/1980 | Aoshima et al. |
| 4,268,741 A | 5/1981 | O'Brien |
| 4,313,051 A | 1/1982 | Aoshima |
| 4,315,138 A | 2/1982 | Miwa |
| 4,374,318 A | 2/1983 | Gilliom |
| 4,374,319 A | 2/1983 | Guibert |
| 4,410,030 A | 10/1983 | Skala |
| 4,430,557 A | 2/1984 | Eichelberger et al. |
| 4,484,063 A | 11/1984 | Whittenburg et al. |
| 4,484,083 A | 11/1984 | Jefferies |
| 4,509,412 A | 4/1985 | Whittenburg et al. |
| 4,528,975 A | 7/1985 | Wang |
| 4,591,698 A | 5/1986 | Chang |
| 4,622,231 A | 11/1986 | Swartley |
| 4,625,097 A | 11/1986 | Miwa |
| 4,670,282 A | 6/1987 | Onishi et al. |
| 4,700,685 A | 10/1987 | Miller |
| 4,728,762 A | 3/1988 | Roth et al. |
| 4,771,162 A | 9/1988 | Schatz |
| 4,829,158 A | 5/1989 | Burnham |
| 4,848,217 A | 7/1989 | Koziol |
| 4,889,972 A | 12/1989 | Chang |
| 4,995,313 A | 2/1991 | Delau et al. |
| 5,000,085 A | 3/1991 | Archer |
| 5,008,508 A | 4/1991 | Skerker et al. |
| 5,012,071 A | 4/1991 | Henke |
| 5,029,519 A | 7/1991 | Boyen |
| 5,031,519 A | 7/1991 | Toida et al. |
| 5,036,179 A | 7/1991 | Westerberg et al. |
| 5,048,400 A | 9/1991 | Ueda et al. |
| 5,067,396 A | 11/1991 | Sorensen et al. |
| 5,092,229 A | 3/1992 | Chen |
| 5,097,753 A | 3/1992 | Naft |
| 5,105,725 A | 4/1992 | Haglund |
| 5,205,274 A | 4/1993 | Smith et al. |
| 5,251,542 A | 10/1993 | Itoh |
| 5,280,749 A | 1/1994 | Smit |
| 5,329,919 A | 7/1994 | Chang |
| 5,355,777 A | 10/1994 | Chen et al. |
| 5,416,950 A | 5/1995 | Dornbush et al. |
| 5,445,061 A | 8/1995 | Barradas |
| 5,445,081 A | 8/1995 | Kunczynski |
| 5,466,912 A | 11/1995 | Dornbush et al. |
| 5,485,780 A | 1/1996 | Koether et al. |
| 5,513,558 A | 5/1996 | Erickson et al. |
| 5,526,734 A * | 6/1996 | Harrison ............ A47J 37/0641 126/21 A |
| 5,528,734 A | 6/1996 | Sanchez |
| 5,549,039 A | 8/1996 | Ito et al. |
| 5,567,458 A | 10/1996 | Wu |
| 5,588,352 A | 12/1996 | Harrison |
| 5,590,583 A | 1/1997 | Harrison |
| 5,615,607 A | 4/1997 | Delaquis et al. |
| 5,619,983 A | 4/1997 | Smith |
| 5,632,403 A | 5/1997 | Deng |
| 5,649,476 A | 7/1997 | Montagnino et al. |
| 5,676,044 A | 10/1997 | Lara, Jr. |
| 5,699,722 A | 12/1997 | Erickson et al. |
| 5,740,721 A | 4/1998 | Bizard et al. |
| 5,768,976 A | 6/1998 | Suk |
| 5,839,357 A | 11/1998 | Ha et al. |
| 5,865,104 A | 2/1999 | Sham et al. |
| 5,896,808 A | 4/1999 | Graur |
| 5,932,130 A | 8/1999 | Taino |
| 5,957,038 A | 9/1999 | Shimazaki |
| 5,967,021 A | 10/1999 | Yung |
| 5,970,858 A | 10/1999 | Boehm et al. |
| 6,006,939 A | 12/1999 | Wai |
| 6,014,986 A | 1/2000 | Baumgarten |
| 6,016,797 A | 1/2000 | Nowicke, Jr. |
| 6,019,029 A | 2/2000 | Chan |
| 6,023,050 A | 2/2000 | Moli |
| 6,060,698 A | 5/2000 | Petrides et al. |
| 6,066,837 A | 5/2000 | McCormick et al. |
| 6,067,896 A | 5/2000 | Elorza |
| 6,070,518 A | 6/2000 | Kao |
| 6,082,249 A | 7/2000 | Su |
| 6,083,543 A | 7/2000 | Kim et al. |
| 6,097,016 A | 8/2000 | Hirata et al. |
| 6,103,291 A | 8/2000 | Fernandez Tapia |
| 6,104,004 A | 8/2000 | Ragland et al. |
| 6,105,808 A | 8/2000 | Mendonca |
| 6,116,151 A | 9/2000 | Fickert et al. |
| 6,125,737 A | 10/2000 | Chang |
| 6,135,012 A | 10/2000 | Kao |
| 6,135,013 A | 10/2000 | Barrena |
| 6,158,606 A | 12/2000 | Oliver |
| 6,173,643 B1 | 1/2001 | Qian et al. |
| 6,178,876 B1 | 1/2001 | Kao |
| 6,191,393 B1 | 2/2001 | Park |
| 6,201,217 B1 | 3/2001 | Moon et al. |
| 6,242,025 B1 | 6/2001 | Lesky et al. |
| 6,252,206 B1 | 6/2001 | Leukhardt, III et al. |
| 6,255,630 B1 | 7/2001 | Barnes et al. |
| 6,257,124 B1 | 7/2001 | Chen |
| 6,262,396 B1 | 7/2001 | Witt et al. |
| 6,267,046 B1 | 7/2001 | Wanat |
| 6,268,592 B1 | 7/2001 | Hu et al. |
| 6,269,737 B1 | 8/2001 | Rigney et al. |
| 6,271,504 B1 | 8/2001 | Barritt |
| 6,283,014 B1 | 9/2001 | Ng et al. |
| 6,283,015 B1 | 9/2001 | Kwon et al. |
| 6,320,166 B1 | 11/2001 | Park |
| 6,355,914 B1 | 3/2002 | Stockley |

(56) References Cited

U.S. PATENT DOCUMENTS

| | | |
|---|---|---|
| 6,384,381 B2 | 5/2002 | Witt et al. |
| 6,393,969 B1 | 5/2002 | Kim |
| D458,078 S | 6/2002 | Lin |
| 6,399,925 B1 | 6/2002 | Pickering et al. |
| 6,414,254 B1 | 7/2002 | McNair |
| 6,425,320 B1 | 7/2002 | Chameroy et al. |
| 6,443,053 B1 | 9/2002 | Rossi |
| 6,450,085 B1 | 9/2002 | Riesselman |
| 6,450,361 B1 | 9/2002 | Mendelson et al. |
| 6,454,225 B1 | 9/2002 | Jaworski |
| 6,455,085 B1 | 9/2002 | Duta |
| 6,467,645 B2 | 10/2002 | Park |
| 6,486,453 B1 | 11/2002 | Bales et al. |
| 6,494,337 B1 | 12/2002 | Moroni |
| 6,505,545 B2 | 1/2003 | Kennedy et al. |
| 6,509,550 B1 | 1/2003 | Li |
| 6,513,420 B1 | 2/2003 | Park |
| 6,523,459 B1 | 2/2003 | Chameroy et al. |
| 6,528,772 B1 | 3/2003 | Graves et al. |
| 6,540,097 B1 | 4/2003 | Beck et al. |
| 6,545,252 B2 | 4/2003 | Wang |
| 6,552,309 B1 | 4/2003 | Kish et al. |
| 6,559,427 B1 | 5/2003 | Barnes et al. |
| 6,565,903 B2 | 5/2003 | Ng et al. |
| 6,568,314 B1 | 5/2003 | Stepanova |
| 6,573,483 B1 | 6/2003 | Decobert et al. |
| 6,602,530 B1 | 8/2003 | Weber et al. |
| 6,603,099 B2 | 8/2003 | Gouthiere |
| 6,604,453 B2 | 8/2003 | Niese |
| 6,615,706 B1 | 9/2003 | Wu |
| 6,615,708 B1 | 9/2003 | Lin |
| 6,617,554 B2 | 9/2003 | Moon et al. |
| 6,631,824 B2 | 10/2003 | Park |
| 6,648,162 B1 | 11/2003 | Wooderson et al. |
| 6,657,167 B2 | 12/2003 | Loveless |
| 6,669,047 B1 | 12/2003 | Wooderson et al. |
| 6,695,319 B1 | 2/2004 | Anota et al. |
| D487,212 S | 3/2004 | Park |
| 6,698,337 B1 | 3/2004 | Park |
| 6,703,061 B2 | 3/2004 | Kennedy et al. |
| 6,705,209 B2 | 3/2004 | Yang et al. |
| 6,723,963 B2 | 4/2004 | Ronda |
| 6,730,881 B1 | 5/2004 | Arntz et al. |
| 6,730,882 B2 | 5/2004 | Atkinson |
| 6,730,889 B1 | 5/2004 | Jones-Lawlor |
| 6,732,636 B1 | 5/2004 | Germano |
| 6,736,131 B2 | 5/2004 | Yamamoto et al. |
| 6,740,855 B1 | 5/2004 | Decobert et al. |
| 6,742,445 B2 | 6/2004 | Backus et al. |
| 6,747,250 B1 | 6/2004 | Cha |
| 6,755,319 B2 | 6/2004 | Park |
| 6,758,132 B1 | 7/2004 | Kuo et al. |
| 6,777,651 B1 | 8/2004 | Boyer |
| 6,782,805 B2 | 8/2004 | Backus et al. |
| 6,782,806 B2 | 8/2004 | Backus et al. |
| 6,802,429 B1 | 10/2004 | Wildman |
| 6,809,297 B2 | 10/2004 | Moon et al. |
| 6,812,433 B1 | 11/2004 | Barritt |
| 6,815,644 B1 | 11/2004 | Muegge et al. |
| 6,831,254 B2 | 12/2004 | Barritt |
| 6,833,534 B2 | 12/2004 | Bellassai et al. |
| 6,837,150 B2 | 1/2005 | Backus et al. |
| 6,841,762 B2 | 1/2005 | Suzuki |
| 6,845,707 B1 | 1/2005 | Xu et al. |
| 6,846,504 B1 | 1/2005 | Yarnell |
| 6,851,351 B2 | 2/2005 | Payen et al. |
| 6,872,921 B1 | 3/2005 | Decobert et al. |
| 6,874,408 B2 | 4/2005 | Backus et al. |
| 6,877,633 B2 | 4/2005 | Niese |
| 6,903,310 B1 | 6/2005 | Lee |
| 6,917,017 B2 | 7/2005 | Moon et al. |
| 6,930,286 B2 | 8/2005 | Kim |
| 6,933,477 B2 | 8/2005 | Becker et al. |
| 6,935,223 B2 | 8/2005 | Kobayashi |
| 6,936,795 B1 | 8/2005 | Moon et al. |
| 6,936,801 B1 | 8/2005 | Head |
| 6,941,857 B2 | 9/2005 | McLemore |
| 6,965,094 B1 | 11/2005 | Friedman |
| 6,972,397 B2 | 12/2005 | Ha |
| 7,009,147 B1 | 3/2006 | Schulte |
| 7,012,220 B2 | 3/2006 | Boyer et al. |
| 7,012,221 B2 | 3/2006 | Li |
| 7,021,203 B2 | 4/2006 | Backus et al. |
| 7,021,204 B2 | 4/2006 | Backus et al. |
| 7,024,104 B2 | 4/2006 | Moore, Jr. et al. |
| 7,045,745 B2 | 5/2006 | Kim |
| 7,053,337 B2 | 5/2006 | Ragan et al. |
| 7,060,941 B1 | 6/2006 | Embury et al. |
| 7,060,943 B2 | 6/2006 | Hwang |
| 7,081,601 B2 | 7/2006 | Boyer et al. |
| 7,082,871 B2 | 8/2006 | Schultz |
| 7,086,326 B2 | 8/2006 | Yokoyama |
| 7,087,873 B2 | 8/2006 | Hayakawa et al. |
| 7,091,454 B2 | 8/2006 | Cho et al. |
| 7,105,778 B1 * | 9/2006 | DeLong .............. A47J 37/0635 |
| | | 99/357 |
| 7,105,780 B2 | 9/2006 | De Longhi |
| 7,126,088 B2 | 10/2006 | Horton et al. |
| 7,148,451 B2 | 12/2006 | Miyake et al. |
| 7,154,069 B1 | 12/2006 | Gordon |
| 7,156,087 B1 | 1/2007 | Churchill et al. |
| 7,157,675 B2 | 1/2007 | Imura |
| 7,166,822 B1 | 1/2007 | Chang et al. |
| 7,171,923 B2 | 2/2007 | Hayakawa et al. |
| 7,208,701 B2 | 4/2007 | Fraccon et al. |
| 7,208,702 B2 | 4/2007 | Choi |
| 7,238,921 B2 | 7/2007 | Beesley et al. |
| 7,250,587 B2 | 7/2007 | Ely et al. |
| 7,250,588 B2 | 7/2007 | Ely et al. |
| 7,261,101 B2 | 8/2007 | Kim |
| 7,276,677 B1 | 10/2007 | Shelton |
| 7,285,751 B2 | 10/2007 | Li et al. |
| 7,304,271 B2 | 12/2007 | Cho et al. |
| 7,317,173 B2 | 1/2008 | Bartelick et al. |
| 7,322,279 B2 | 1/2008 | Cartigny et al. |
| 7,322,280 B2 | 1/2008 | Seurat Guiochet et al. |
| 7,325,481 B2 | 2/2008 | Helm |
| 7,368,688 B2 | 5/2008 | Kim et al. |
| 7,373,874 B2 | 5/2008 | Seurat Guiochet et al. |
| 7,377,208 B2 | 5/2008 | Ho et al. |
| 7,389,721 B2 | 6/2008 | Wanat |
| 7,411,159 B2 | 8/2008 | Oosterling |
| 7,412,922 B2 | 8/2008 | McLemore |
| 7,418,960 B2 | 9/2008 | Saksena |
| 7,451,691 B2 | 11/2008 | Robertson |
| 7,451,692 B2 | 11/2008 | Baraille et al. |
| 7,468,495 B2 | 12/2008 | Carbone et al. |
| 7,523,696 B2 | 4/2009 | Seurat Guiochet et al. |
| 7,530,302 B2 | 5/2009 | Stephanou |
| 7,537,004 B2 | 5/2009 | Reay |
| 7,565,862 B2 | 7/2009 | Cartigny et al. |
| 7,605,349 B2 | 10/2009 | Gaynor et al. |
| D604,098 S | 11/2009 | Hamlin |
| 7,619,186 B2 | 11/2009 | Cavada et al. |
| 7,624,674 B2 | 12/2009 | Chameroy et al. |
| 7,637,206 B2 | 12/2009 | Seurat Guiochet et al. |
| 7,669,521 B2 | 3/2010 | Cartigny et al. |
| 7,669,591 B2 | 3/2010 | Fossati et al. |
| 7,677,160 B2 | 3/2010 | Tippmann, Sr. et al. |
| 7,703,385 B2 | 4/2010 | Seurat Guiochet et al. |
| 7,718,928 B2 | 5/2010 | He et al. |
| 7,726,508 B2 | 6/2010 | Hasegawa |
| 7,745,763 B2 | 6/2010 | Fraccon et al. |
| 7,759,615 B2 | 7/2010 | Ando et al. |
| 7,762,420 B2 | 7/2010 | Auwarter et al. |
| 7,766,003 B2 | 8/2010 | Kim |
| 7,775,390 B2 | 8/2010 | De Bastos Reis Portugal et al. |
| 7,800,022 B2 | 9/2010 | Kim |
| 7,810,488 B2 | 10/2010 | Manganiello et al. |
| 7,838,799 B2 | 11/2010 | Freedman |
| 7,856,875 B2 | 12/2010 | Jeon et al. |
| 7,875,836 B2 | 1/2011 | Imura et al. |
| 7,915,568 B2 | 3/2011 | Wang |
| D635,393 S | 4/2011 | Nakatani |

(56) References Cited

U.S. PATENT DOCUMENTS

| | | | |
|---|---|---|---|
| 7,921,768 B2 | 4/2011 | Fernandez et al. |
| 7,935,914 B2 | 5/2011 | Imura |
| 7,943,888 B2 | 5/2011 | Barnes et al. |
| 7,964,824 B2 | 6/2011 | Moon |
| 7,968,824 B2 | 6/2011 | Lee et al. |
| 7,980,171 B2 | 7/2011 | Groll |
| 8,006,684 B2 | 8/2011 | Lee et al. |
| 8,006,685 B2 | 8/2011 | Bolton et al. |
| 8,011,293 B2 | 9/2011 | Mcfadden et al. |
| 8,042,533 B2 | 10/2011 | Dobie et al. |
| 8,080,766 B2 | 12/2011 | Frock et al. |
| 8,096,436 B2 | 1/2012 | Rhetat et al. |
| 8,096,440 B2 | 1/2012 | Rhetat et al. |
| 8,152,083 B2 | 4/2012 | Bower et al. |
| 8,166,871 B2 | 5/2012 | Veltrop et al. |
| 8,205,543 B2 | 6/2012 | Rhetat et al. |
| 8,247,751 B2 | 8/2012 | Jagannathan |
| 8,258,435 B2 | 9/2012 | Bonuso et al. |
| 8,267,008 B2 | 9/2012 | Yasuhara |
| D669,730 S | 10/2012 | Mandil |
| 8,276,507 B1 | 10/2012 | Walker |
| 8,286,548 B2 | 10/2012 | Krishnan et al. |
| 8,299,404 B2 | 10/2012 | Van Der Weij |
| 8,302,800 B2 | 11/2012 | Hasegawa |
| 8,304,695 B2 | 11/2012 | Bonuso et al. |
| 8,330,083 B2 | 12/2012 | Moon et al. |
| 8,338,757 B2 | 12/2012 | Isoda et al. |
| 8,369,695 B2 | 2/2013 | Lee et al. |
| 8,378,265 B2 | 2/2013 | Greenwood et al. |
| 8,381,712 B1 | 2/2013 | Simms, II |
| 8,393,262 B1 | 3/2013 | Molayem |
| 8,420,983 B2 | 4/2013 | Ohashi et al. |
| 8,461,488 B2 | 6/2013 | Jeong et al. |
| 8,481,488 B2 | 7/2013 | Carter |
| 8,517,006 B2 | 8/2013 | Frock et al. |
| 8,517,205 B2 | 8/2013 | Thelen |
| 8,525,081 B2 | 9/2013 | Colburn et al. |
| 8,544,381 B2 | 10/2013 | Cartigny et al. |
| 8,546,731 B2 | 10/2013 | Pellerin et al. |
| 8,561,525 B2 | 10/2013 | Bauchot et al. |
| 8,578,293 B2 | 11/2013 | Breunig et al. |
| 8,581,137 B2 | 11/2013 | Egenter |
| 8,601,939 B2 | 12/2013 | Saksena et al. |
| 8,604,394 B2 | 12/2013 | Wu et al. |
| 8,618,447 B2 | 12/2013 | De'Longhi |
| 8,637,797 B2 | 1/2014 | Imura |
| D699,514 S | 2/2014 | Lovley, II et al. |
| 8,640,908 B2 | 2/2014 | Yang et al. |
| 8,674,270 B2 | 3/2014 | Anderson et al. |
| 8,689,680 B2 | 4/2014 | Park |
| 8,695,487 B2 | 4/2014 | Sakane et al. |
| 8,709,905 B2 | 4/2014 | Crayfourd |
| 8,714,391 B2 | 5/2014 | Milanesi |
| 8,726,792 B2 | 5/2014 | Shealy et al. |
| 8,733,574 B2 | 5/2014 | Heidrich et al. |
| D707,078 S | 6/2014 | Rivera et al. |
| 8,739,690 B2 | 6/2014 | Chameroy et al. |
| 8,747,933 B1 | 6/2014 | Mcginn |
| 8,766,144 B2 | 7/2014 | Mcloughlin et al. |
| 8,777,038 B2 | 7/2014 | Wen |
| 8,783,498 B2 | 7/2014 | Li |
| 8,783,947 B2 | 7/2014 | Ferron et al. |
| D710,647 S | 8/2014 | Mandil et al. |
| 8,800,803 B2 | 8/2014 | Stellwag |
| 8,808,772 B2 | 8/2014 | Lubrina et al. |
| 8,813,635 B2 | 8/2014 | Dragan |
| 8,813,989 B2 | 8/2014 | Hoffmann et al. |
| 8,820,220 B2 | 9/2014 | Thelen et al. |
| 8,840,908 B2 | 9/2014 | Reed et al. |
| 8,847,129 B2 | 9/2014 | Kim et al. |
| 8,869,829 B2 | 10/2014 | Hasegawa |
| 8,887,939 B2 | 11/2014 | Chameroy et al. |
| D719,398 S | 12/2014 | Deters |
| D720,571 S | 1/2015 | Deters |
| 8,931,402 B2 | 1/2015 | Chameroy et al. |
| 8,931,659 B2 | 1/2015 | Rhetat et al. |
| 8,944,272 B2 | 2/2015 | Chameroy et al. |
| 8,944,273 B2 | 2/2015 | Chameroy et al. |
| 8,946,604 B2 | 2/2015 | Kaiser et al. |
| 8,960,081 B2 | 2/2015 | Beard et al. |
| 8,973,770 B2 | 3/2015 | He et al. |
| 8,985,372 B2 | 3/2015 | Yang et al. |
| 8,991,307 B2 | 3/2015 | Grozinger et al. |
| 8,993,934 B2 | 3/2015 | Giazzon et al. |
| D727,095 S | 4/2015 | Bak |
| 9,018,566 B2 | 4/2015 | Wang |
| 9,027,468 B2 | 5/2015 | Rhetat et al. |
| 9,035,223 B2 | 5/2015 | Noguchi et al. |
| 9,055,618 B2 | 6/2015 | Bunzel et al. |
| 9,057,526 B2 | 6/2015 | Barritt |
| 9,066,523 B2 | 6/2015 | Seitz et al. |
| 9,115,905 B2 | 8/2015 | Giazzon et al. |
| 9,119,501 B2 | 9/2015 | Xie |
| 9,125,513 B2 | 9/2015 | Kim |
| 9,127,849 B2 | 9/2015 | Kang et al. |
| 9,138,106 B2 | 9/2015 | Walker |
| 9,173,408 B2 | 11/2015 | Yamamoto et al. |
| 9,177,460 B2 | 11/2015 | Fissler |
| 9,182,126 B2 | 11/2015 | Cartwright et al. |
| 9,191,998 B2 | 11/2015 | Hegedis et al. |
| 9,220,362 B2 | 12/2015 | Eades et al. |
| 9,237,829 B2 | 1/2016 | Alet Vidal et al. |
| D749,906 S | 2/2016 | Lee |
| 9,247,842 B2 | 2/2016 | Cheung et al. |
| 9,271,595 B2 | 3/2016 | Lee |
| 9,295,354 B2 | 3/2016 | Sloot et al. |
| 9,295,355 B2 | 3/2016 | Kwag et al. |
| D754,469 S | 4/2016 | Deters |
| 9,301,644 B2 | 4/2016 | Payen et al. |
| 9,314,134 B2 | 4/2016 | Molnar |
| 9,320,381 B2 | 4/2016 | Chameroy et al. |
| 9,326,633 B2 | 5/2016 | Lin |
| 9,339,145 B1 | 5/2016 | Owczarzak |
| 9,341,382 B2 | 5/2016 | Kim |
| 9,345,358 B2 | 5/2016 | Zhang et al. |
| 9,351,495 B2 | 5/2016 | Mcfadden |
| 9,353,954 B2 | 5/2016 | Linnewiel |
| 9,375,021 B2 | 6/2016 | Raghavan et al. |
| 9,414,713 B2 | 8/2016 | Jinzhao |
| 9,433,036 B2 | 8/2016 | Kurtimoto et al. |
| 9,439,530 B2 | 9/2016 | Logan et al. |
| D769,058 S | 10/2016 | Lee |
| 9,456,713 B2 * | 10/2016 | Backaert ............ A47J 27/0806 |
| 9,470,423 B2 | 10/2016 | Jacob et al. |
| 9,474,412 B2 | 10/2016 | Fung et al. |
| D772,648 S | 11/2016 | Palermo |
| 9,480,364 B2 | 11/2016 | Mckee et al. |
| D774,350 S | 12/2016 | Mandil |
| D774,356 S | 12/2016 | Maiorana et al. |
| 9,526,367 B2 | 12/2016 | Anota et al. |
| 9,545,168 B2 | 1/2017 | Gabara |
| 9,565,963 B2 | 2/2017 | Jeon et al. |
| 9,565,964 B2 | 2/2017 | Yang et al. |
| 9,585,509 B2 | 3/2017 | Wassmus et al. |
| 9,596,954 B2 | 3/2017 | Park |
| 9,615,408 B2 | 4/2017 | Metz et al. |
| 9,615,688 B2 | 4/2017 | Shibuya et al. |
| 9,615,691 B2 | 4/2017 | Xiao |
| 9,615,692 B2 | 4/2017 | Hoffmann et al. |
| 9,615,694 B2 | 4/2017 | Yoshidome |
| 9,629,499 B2 | 4/2017 | Kim |
| 9,629,500 B2 | 4/2017 | Chance |
| 9,636,618 B2 | 5/2017 | Fung et al. |
| 9,642,487 B1 | 5/2017 | Mcginn |
| 9,648,975 B2 | 5/2017 | Imura |
| 9,648,985 B2 | 5/2017 | Huang et al. |
| 9,675,197 B2 | 6/2017 | Schobloch et al. |
| 9,681,770 B2 | 6/2017 | Backaert et al. |
| 9,681,773 B2 | 6/2017 | Mckee et al. |
| 9,683,747 B2 | 6/2017 | Raghavan et al. |
| 9,700,172 B2 | 7/2017 | Tanaka et al. |
| 9,706,870 B2 | 7/2017 | Hoehn et al. |
| 9,706,871 B2 | 7/2017 | Matthijs |
| 9,717,363 B2 | 8/2017 | Pan |

(56) References Cited

U.S. PATENT DOCUMENTS

| | | |
|---|---|---|
| 9,717,364 B2 | 8/2017 | Sladecek |
| 9,737,936 B2 | 8/2017 | Linglin et al. |
| 9,743,794 B2 | 8/2017 | Shibuya et al. |
| 9,750,089 B2 | 8/2017 | Wiedemann et al. |
| 9,756,980 B1 | 9/2017 | Li et al. |
| 9,756,981 B2 | 9/2017 | Fung |
| 9,763,531 B2 | 9/2017 | Baraille et al. |
| D801,106 S | 10/2017 | Mirchandani et al. |
| 9,775,461 B2 | 10/2017 | Yang et al. |
| 9,788,678 B2 | 10/2017 | Abe et al. |
| 9,795,250 B2 | 10/2017 | Huang |
| 9,801,487 B2 | 10/2017 | Park et al. |
| 9,801,491 B2 | 10/2017 | Cohade et al. |
| 9,814,355 B2 | 11/2017 | Winter et al. |
| 9,841,261 B2 | 12/2017 | Raghavan et al. |
| 9,854,931 B2 | 1/2018 | Rocklinger et al. |
| 9,854,932 B2 | 1/2018 | Tiruvallur |
| 9,854,941 B2 | 1/2018 | Bonaccorso |
| 9,861,231 B2 | 1/2018 | Kim |
| 9,867,234 B2 | 1/2018 | Thomann et al. |
| 9,872,581 B2 | 1/2018 | Braden et al. |
| 9,872,582 B2 | 1/2018 | Song et al. |
| 9,877,610 B2 | 1/2018 | Bucher et al. |
| 9,883,768 B2 | 2/2018 | Starflinger |
| 9,888,811 B2 | 2/2018 | Zwanenburg et al. |
| 9,890,946 B2 | 2/2018 | Shibuya et al. |
| 9,895,028 B2 | 2/2018 | Gerard et al. |
| 9,900,936 B2 | 2/2018 | Imm et al. |
| 9,903,597 B2 | 2/2018 | Nishijima et al. |
| 9,907,435 B2 | 3/2018 | Kohler et al. |
| 9,909,764 B2 | 3/2018 | Bach |
| 9,924,825 B2 | 3/2018 | Zakowski et al. |
| 9,924,830 B1 | 3/2018 | Glucksman et al. |
| D815,491 S | 4/2018 | Hollinger |
| 9,930,990 B1 | 4/2018 | Gupta et al. |
| 9,936,837 B1 | 4/2018 | Granberry |
| D817,697 S | 5/2018 | Zhao |
| 9,961,721 B2 | 5/2018 | Guilleminot et al. |
| 9,961,929 B2 | 5/2018 | Olsson |
| 9,962,029 B2 | 5/2018 | Baraille et al. |
| 9,980,605 B2 | 5/2018 | De Haas et al. |
| 10,016,085 B2 | 7/2018 | Sapire |
| 10,021,889 B2 | 7/2018 | Vinett |
| 10,022,015 B2 | 7/2018 | Marco et al. |
| 10,022,021 B2 | 7/2018 | Sudhir |
| 10,034,578 B2 | 7/2018 | Ahmed |
| D824,717 S | 8/2018 | Allen |
| D826,638 S | 8/2018 | Zhang |
| 10,045,651 B2 | 8/2018 | Huang |
| 10,047,961 B2 | 8/2018 | Choi |
| 10,051,986 B2 | 8/2018 | Schultz et al. |
| 10,051,995 B2 | 8/2018 | Buckley et al. |
| 10,054,317 B2 | 8/2018 | Franzolin |
| 10,057,946 B2 | 8/2018 | Mills et al. |
| 10,058,210 B2 | 8/2018 | Palermo |
| 10,060,632 B2 | 8/2018 | Lim et al. |
| 10,064,518 B2 | 9/2018 | Xiao et al. |
| 10,076,206 B2 | 9/2018 | Chameroy et al. |
| D832,023 S | 10/2018 | Barberi et al. |
| D832,030 S | 10/2018 | Veldeman |
| 10,088,371 B2 | 10/2018 | Kaiser et al. |
| 10,092,128 B2 | 10/2018 | Seitz et al. |
| 10,094,576 B2 | 10/2018 | Kim et al. |
| 10,098,354 B2 | 10/2018 | Faraldi et al. |
| D833,204 S | 11/2018 | Lee |
| 10,117,546 B2 | 11/2018 | Le Grand |
| 10,119,708 B2 | 11/2018 | Bartelick et al. |
| 10,123,556 B2 | 11/2018 | Distaso et al. |
| 10,123,656 B2 | 11/2018 | Shanmugam |
| 10,125,978 B2 | 11/2018 | Shibuya et al. |
| 10,130,205 B2 | 11/2018 | Fung et al. |
| D834,889 S | 12/2018 | Moon et al. |
| 10,143,324 B2 | 12/2018 | Kataoka et al. |
| 10,143,327 B2 | 12/2018 | Freeman et al. |
| 10,154,750 B2 | 12/2018 | Allemand et al. |
| D838,548 S | 1/2019 | Schutte |
| 10,172,494 B2 | 1/2019 | Long |
| 10,178,924 B2 | 1/2019 | French et al. |
| 10,194,769 B2 | 2/2019 | Kodden |
| 10,208,964 B2 | 2/2019 | Cupp et al. |
| D842,649 S | 3/2019 | Mishan |
| 10,231,291 B2 | 3/2019 | Kim |
| 10,231,292 B2 | 3/2019 | Kim et al. |
| 10,231,565 B2 | 3/2019 | Song et al. |
| 10,231,574 B2 | 3/2019 | Strang |
| 10,244,883 B2 | 4/2019 | Chameroy et al. |
| 10,253,989 B2 | 4/2019 | Helm et al. |
| 10,258,049 B2 | 4/2019 | Engstrom |
| 10,260,755 B2 | 4/2019 | Bach |
| 10,260,758 B2 | 4/2019 | Colozzo et al. |
| 10,260,759 B2 | 4/2019 | Colozzo et al. |
| 10,271,686 B2 | 4/2019 | Roy |
| 10,274,206 B2 | 4/2019 | Chen |
| 10,278,241 B2 | 4/2019 | Shibuya et al. |
| 10,278,532 B2 | 5/2019 | Metz |
| 10,281,159 B2 | 5/2019 | Park et al. |
| 10,288,311 B2 | 5/2019 | Cho et al. |
| 10,295,192 B2 | 5/2019 | Yoshimura et al. |
| 10,299,621 B1 | 5/2019 | Bourgeois et al. |
| 10,327,587 B2 | 6/2019 | Liao |
| 10,330,323 B2 | 6/2019 | Kim et al. |
| 10,342,375 B2 | 7/2019 | Chen |
| 10,344,988 B2 | 7/2019 | Gattei |
| 10,349,775 B2 | 7/2019 | Lego et al. |
| 10,360,812 B2 | 7/2019 | Koennings et al. |
| 10,368,403 B2 | 7/2019 | Hayashi et al. |
| 10,368,681 B2 | 8/2019 | Kataoka et al. |
| 10,376,087 B2 | 8/2019 | Cornelissen |
| 10,385,550 B2 | 8/2019 | Lu et al. |
| 10,390,656 B2 | 8/2019 | Gill et al. |
| 10,398,249 B2 | 9/2019 | Becker et al. |
| 10,405,686 B2 | 9/2019 | Patel et al. |
| 10,405,697 B2 | 9/2019 | Gill et al. |
| 10,405,698 B2 | 9/2019 | Gill et al. |
| 10,413,109 B2 | 9/2019 | Krebs et al. |
| 10,413,121 B2 | 9/2019 | Gill et al. |
| 10,413,122 B2 | 9/2019 | Gill et al. |
| 10,448,778 B2 | 10/2019 | Watson et al. |
| 10,451,290 B2 | 10/2019 | Mayberry |
| 10,463,186 B2 | 11/2019 | Di Ronco et al. |
| 10,470,609 B2 | 11/2019 | Gerard et al. |
| 10,470,614 B2 | 11/2019 | Lang et al. |
| 10,485,378 B2 | 11/2019 | Gill et al. |
| 10,492,637 B2 | 12/2019 | Abe et al. |
| 10,492,638 B2 | 12/2019 | Guegan et al. |
| 10,499,760 B2 | 12/2019 | Blond |
| 10,512,359 B2 | 12/2019 | Xu et al. |
| 10,517,306 B1 | 12/2019 | Meirav |
| 10,524,317 B2 | 12/2019 | Kondo et al. |
| 10,524,604 B2 | 1/2020 | Bjork et al. |
| 10,533,752 B2 | 1/2020 | Faraldi et al. |
| 10,561,273 B2 | 2/2020 | Patel et al. |
| 10,561,274 B2 | 2/2020 | Huang |
| 10,561,277 B1 | 2/2020 | Swayne et al. |
| 10,575,679 B1 | 3/2020 | Cheng et al. |
| 10,578,310 B2 | 3/2020 | Joo et al. |
| 10,588,445 B2 | 3/2020 | Gustavsson |
| 10,602,869 B2 | 3/2020 | Yu et al. |
| 10,638,868 B1 | 5/2020 | Straight |
| 10,638,869 B2 | 5/2020 | Kataoka et al. |
| 10,638,882 B1 | 5/2020 | He et al. |
| 10,645,765 B2 | 5/2020 | Shibuya et al. |
| 10,667,639 B2 | 6/2020 | Mederer |
| 10,674,855 B2 | 6/2020 | Rosalia et al. |
| 10,674,864 B2 | 6/2020 | Trtic |
| 10,687,650 B2 | 6/2020 | Huang et al. |
| 10,690,352 B2 | 6/2020 | Smith et al. |
| 10,694,753 B2 | 6/2020 | Reese et al. |
| 10,694,882 B2 | 6/2020 | Huang |
| 10,694,891 B2 | 6/2020 | Huang |
| 10,729,282 B2 | 8/2020 | Bonaccorso |
| 10,746,412 B1 | 8/2020 | Artt |
| 2002/0179587 A1 | 12/2002 | Hui |
| 2002/0185012 A1 | 12/2002 | Yokoyama |

(56) References Cited

U.S. PATENT DOCUMENTS

| | | |
|---|---|---|
| 2003/0034027 A1 | 2/2003 | Yamamoto et al. |
| 2003/0127447 A1 | 7/2003 | Lin |
| 2004/0035845 A1 | 2/2004 | Moon et al. |
| 2004/0045446 A1 | 3/2004 | Park |
| 2004/0055474 A1 | 3/2004 | Lekic et al. |
| 2004/0112362 A1 | 6/2004 | Bruno et al. |
| 2004/0124197 A1 | 7/2004 | Hasegawa |
| 2004/0216731 A1 | 11/2004 | Personnettaz et al. |
| 2004/0222208 A1 | 11/2004 | Ko |
| 2004/0253348 A1 | 12/2004 | Woodward et al. |
| 2005/0011370 A1 | 1/2005 | Xu et al. |
| 2005/0034716 A1 | 2/2005 | Harbin |
| 2005/0089318 A1 | 4/2005 | Lai et al. |
| 2005/0139089 A1* | 6/2005 | Seurat Guiochet ... A47J 27/092 99/403 |
| 2005/0223906 A1 | 10/2005 | Xu |
| 2005/0284305 A1 | 12/2005 | Angue |
| 2006/0081235 A1 | 4/2006 | Lundh et al. |
| 2007/0028912 A1 | 2/2007 | Gagas et al. |
| 2007/0045284 A1 | 3/2007 | Balk et al. |
| 2007/0095215 A1 | 5/2007 | Ho et al. |
| 2007/0125768 A1 | 6/2007 | Kim et al. |
| 2007/0158335 A1 | 7/2007 | Mansbery |
| 2007/0199557 A1 | 8/2007 | Von Kaenel |
| 2007/0295221 A1 | 12/2007 | Seurat Guiochet et al. |
| 2008/0022861 A1 | 1/2008 | Ferron |
| 2008/0078371 A1 | 4/2008 | Boscaino |
| 2008/0078755 A1 | 4/2008 | Jeon et al. |
| 2008/0083730 A1 | 4/2008 | Dolgov et al. |
| 2008/0095905 A1 | 4/2008 | Sells et al. |
| 2008/0099008 A1 | 5/2008 | Bolton et al. |
| 2008/0105135 A1 | 5/2008 | McFadden et al. |
| 2008/0105137 A1 | 5/2008 | Genslak et al. |
| 2008/0142498 A1 | 6/2008 | He et al. |
| 2008/0163764 A1 | 7/2008 | Payen et al. |
| 2008/0173631 A1 | 7/2008 | Gagas et al. |
| 2008/0206420 A1 | 8/2008 | McFadden |
| 2008/0213447 A1 | 9/2008 | Payen et al. |
| 2008/0216671 A1 | 9/2008 | Chen |
| 2008/0223224 A1 | 9/2008 | Martin |
| 2008/0290090 A1 | 11/2008 | Kindler et al. |
| 2008/0314258 A1 | 12/2008 | Martin |
| 2009/0011101 A1 | 1/2009 | Doherty et al. |
| 2009/0013988 A1 | 1/2009 | Kim et al. |
| 2009/0064868 A1* | 3/2009 | Cartossi ............. A47J 27/0813 99/337 |
| 2009/0095166 A1 | 4/2009 | Jian |
| 2009/0134140 A1 | 5/2009 | Van Der Weij |
| 2009/0139981 A1 | 6/2009 | Moon |
| 2009/0223380 A1 | 9/2009 | Van Aken |
| 2009/0223386 A1 | 9/2009 | Edwards |
| 2009/0250452 A1 | 10/2009 | Tse |
| 2010/0089248 A1 | 4/2010 | Jones |
| 2010/0136194 A1 | 6/2010 | Schutte |
| 2010/0147159 A1 | 6/2010 | Fossati |
| 2010/0147824 A1 | 6/2010 | Bonuso et al. |
| 2010/0206289 A1 | 8/2010 | Larsen et al. |
| 2010/0282097 A1 | 11/2010 | Schulte |
| 2010/0310733 A1 | 12/2010 | Hoffman |
| 2011/0003048 A1 | 1/2011 | Sugimoto et al. |
| 2011/0095015 A1 | 4/2011 | Kao |
| 2011/0120319 A1 | 5/2011 | Chang |
| 2011/0126719 A1 | 6/2011 | Valance |
| 2011/0146653 A1 | 6/2011 | Kitatani |
| 2011/0147376 A1 | 6/2011 | Ueda et al. |
| 2011/0168158 A1 | 7/2011 | Barkhouse |
| 2011/0248020 A1 | 10/2011 | Yuan |
| 2011/0268153 A1 | 11/2011 | He et al. |
| 2012/0003364 A1 | 1/2012 | Kling et al. |
| 2012/0009317 A1 | 1/2012 | Mclemore |
| 2012/0012584 A1 | 1/2012 | Chameroy et al. |
| 2012/0024164 A1 | 2/2012 | Park et al. |
| 2012/0024169 A1 | 2/2012 | Hsu |
| 2012/0040067 A1 | 2/2012 | Baraille et al. |
| 2012/0048843 A1 | 3/2012 | Feng et al. |
| 2012/0125313 A1 | 5/2012 | Van Der Weij |
| 2012/0174797 A1 | 7/2012 | Froza |
| 2012/0181363 A1 | 7/2012 | Huang |
| 2012/0192722 A1 | 8/2012 | Foster |
| 2012/0192726 A1 | 8/2012 | Clearman et al. |
| 2012/0217236 A1 | 8/2012 | Takagi |
| 2012/0217252 A1 | 8/2012 | Jung |
| 2012/0222665 A1 | 9/2012 | Ahmed |
| 2012/0222865 A1 | 9/2012 | Larson et al. |
| 2012/0318149 A1 | 12/2012 | Ahmed |
| 2013/0019759 A1* | 1/2013 | Tumenbatur ........ A47J 27/0813 126/374.1 |
| 2013/0061765 A1 | 3/2013 | Reinhart |
| 2013/0074702 A1 | 3/2013 | Difante |
| 2013/0092145 A1 | 4/2013 | Murphy et al. |
| 2013/0104875 A1 | 5/2013 | Schultz et al. |
| 2013/0156906 A1 | 6/2013 | Raghavan et al. |
| 2013/0180413 A1 | 7/2013 | Tjerkgaast et al. |
| 2013/0180986 A1 | 7/2013 | He et al. |
| 2013/0196038 A1 | 8/2013 | Liu |
| 2013/0236614 A1 | 9/2013 | Schandel et al. |
| 2013/0255509 A1 | 10/2013 | He et al. |
| 2013/0276643 A1 | 10/2013 | Krolick et al. |
| 2013/0278643 A1 | 10/2013 | Otsuka et al. |
| 2013/0298781 A1 | 11/2013 | Ganuza et al. |
| 2013/0305933 A1 | 11/2013 | Heidrich et al. |
| 2013/0333685 A1 | 12/2013 | Jeong et al. |
| 2014/0021191 A1 | 1/2014 | Moon et al. |
| 2014/0044851 A1 | 2/2014 | Kennedy |
| 2014/0083306 A1 | 3/2014 | Lee |
| 2014/0083992 A1 | 3/2014 | Linnewiel |
| 2014/0102315 A1 | 4/2014 | Park |
| 2014/0157994 A1 | 6/2014 | Ryan et al. |
| 2014/0175085 A1 | 6/2014 | Yang et al. |
| 2014/0199454 A1 | 7/2014 | Storek et al. |
| 2014/0199459 A1 | 7/2014 | Jackson et al. |
| 2014/0201688 A1 | 7/2014 | Guilleminot et al. |
| 2014/0220196 A1 | 8/2014 | Veloo |
| 2014/0220198 A1 | 8/2014 | Konuklar |
| 2014/0227411 A1 | 8/2014 | Popeil et al. |
| 2014/0245898 A1 | 9/2014 | Froza |
| 2014/0246419 A1 | 9/2014 | Li |
| 2014/0251158 A1 | 9/2014 | Yang et al. |
| 2014/0251162 A1 | 9/2014 | Zhou |
| 2014/0318385 A1 | 10/2014 | Kim |
| 2014/0318386 A1 | 10/2014 | Kim |
| 2014/0318387 A1 | 10/2014 | Kim |
| 2014/0318388 A1 | 10/2014 | Kim |
| 2014/0318389 A1 | 10/2014 | Kim |
| 2014/0322417 A1 | 10/2014 | Kim |
| 2014/0348987 A1 | 11/2014 | Cheng et al. |
| 2014/0353316 A1 | 12/2014 | Lin |
| 2014/0360384 A1 | 12/2014 | Kim |
| 2014/0366746 A1 | 12/2014 | Tsai |
| 2014/0370176 A1 | 12/2014 | Imura et al. |
| 2014/0373729 A1 | 12/2014 | Kim et al. |
| 2014/0377417 A1 | 12/2014 | Martinez |
| 2015/0000535 A1 | 1/2015 | Yoshidome et al. |
| 2015/0028022 A1 | 1/2015 | Moon et al. |
| 2015/0040775 A1 | 2/2015 | Shieh |
| 2015/0059595 A1 | 3/2015 | Rand et al. |
| 2015/0083107 A1 | 3/2015 | Busch et al. |
| 2015/0122137 A1 | 5/2015 | Chang |
| 2015/0136769 A1 | 5/2015 | Quinn et al. |
| 2015/0173551 A1 | 6/2015 | Carbone et al. |
| 2015/0192289 A1 | 7/2015 | Gattei et al. |
| 2015/0201788 A1 | 7/2015 | Douma et al. |
| 2015/0201806 A1 | 7/2015 | Yoshidome |
| 2015/0208845 A1 | 7/2015 | Robbins et al. |
| 2015/0208858 A1 | 7/2015 | Robbins et al. |
| 2015/0223627 A1 | 8/2015 | Li et al. |
| 2015/0226438 A1 | 8/2015 | Ozyurt et al. |
| 2015/0250187 A1 | 9/2015 | Sakane et al. |
| 2015/0257208 A1 | 9/2015 | Li et al. |
| 2015/0292750 A1 | 10/2015 | Delrue et al. |
| 2015/0305093 A1 | 10/2015 | Smith et al. |
| 2015/0312964 A1 | 10/2015 | Sorenson et al. |
| 2015/0313399 A1 | 11/2015 | Park |
| 2015/0351578 A1 | 12/2015 | Song et al. |

(56) References Cited

U.S. PATENT DOCUMENTS

| | | |
|---|---|---|
| 2015/0354827 A1 | 12/2015 | Faraldi et al. |
| 2015/0366399 A1 | 12/2015 | Lee |
| 2015/0366402 A1 | 12/2015 | Wu et al. |
| 2016/0007644 A1 | 1/2016 | Hack et al. |
| 2016/0007789 A1 | 1/2016 | Tiruvallur |
| 2016/0029829 A1 | 2/2016 | Klein |
| 2016/0033141 A1 | 2/2016 | Rizzuto |
| 2016/0037955 A1 | 2/2016 | Kim |
| 2016/0045067 A1 | 2/2016 | Liao |
| 2016/0051077 A1 | 2/2016 | Sloot et al. |
| 2016/0051078 A1 | 2/2016 | Jenkins et al. |
| 2016/0051086 A1 | 2/2016 | Longhi |
| 2016/0066738 A1 | 3/2016 | Shibuya et al. |
| 2016/0073814 A1 | 3/2016 | Kiriishi et al. |
| 2016/0081509 A1 | 3/2016 | Delrue et al. |
| 2016/0100707 A1 | 4/2016 | Huang |
| 2016/0100713 A1 | 4/2016 | De Haas et al. |
| 2016/0113432 A1 | 4/2016 | Cornelissen |
| 2016/0113442 A1 | 4/2016 | De Haas et al. |
| 2016/0120363 A1 | 5/2016 | Zwanenburg et al. |
| 2016/0120364 A1 | 5/2016 | De Haas et al. |
| 2016/0123660 A1 | 5/2016 | Peng |
| 2016/0150906 A1 | 6/2016 | Lee et al. |
| 2016/0165676 A1 | 6/2016 | Imm et al. |
| 2016/0174749 A1 | 6/2016 | Eades et al. |
| 2016/0174764 A1 | 6/2016 | Xiao |
| 2016/0174771 A1 | 6/2016 | Benoit et al. |
| 2016/0183722 A1 | 6/2016 | Fisher |
| 2016/0192808 A1 | 7/2016 | Van Der Burg et al. |
| 2016/0198882 A1 | 7/2016 | Linglin |
| 2016/0198883 A1 | 7/2016 | Wang et al. |
| 2016/0206131 A1 | 7/2016 | Chien |
| 2016/0206139 A1 | 7/2016 | Johnson |
| 2016/0206140 A1 | 7/2016 | Johnson et al. |
| 2016/0219653 A1 | 7/2016 | Kim et al. |
| 2016/0220057 A1 | 8/2016 | Smith et al. |
| 2016/0235078 A1 | 8/2016 | Farina et al. |
| 2016/0235239 A1 | 8/2016 | Patadia |
| 2016/0253080 A1 | 9/2016 | Ban et al. |
| 2016/0270596 A1 | 9/2016 | Allemand et al. |
| 2016/0278563 A1 | 9/2016 | Choudhary |
| 2016/0278565 A1 | 9/2016 | Chameroy et al. |
| 2016/0281994 A1 | 9/2016 | Nuessler |
| 2016/0309940 A1 | 10/2016 | Valance et al. |
| 2016/0309956 A1 | 10/2016 | Glucksman |
| 2016/0316525 A1 | 10/2016 | Vainionpaa |
| 2016/0316968 A1 | 11/2016 | Linglin |
| 2016/0324359 A1 | 11/2016 | Aboujassoum et al. |
| 2016/0327280 A1 | 11/2016 | Smith et al. |
| 2016/0345766 A1 | 12/2016 | Sapire |
| 2016/0353913 A1 | 12/2016 | Chameroy et al. |
| 2016/0353914 A1 | 12/2016 | Chameroy et al. |
| 2016/0353915 A1 | 12/2016 | Chameroy et al. |
| 2016/0353916 A1 | 12/2016 | Chameroy et al. |
| 2016/0360922 A1 | 12/2016 | Xiao et al. |
| 2016/0367061 A1 | 12/2016 | Chou |
| 2016/0374510 A1 | 12/2016 | Albizuri Landazabal |
| 2017/0000293 A1 | 1/2017 | Sladecek et al. |
| 2017/0016623 A1 | 1/2017 | Rabie et al. |
| 2017/0020334 A1 | 1/2017 | Sorenson et al. |
| 2017/0055770 A1 | 3/2017 | Case |
| 2017/0065127 A1 | 3/2017 | Bonaccorso |
| 2017/0071034 A1 | 3/2017 | Metz |
| 2017/0079475 A1 | 3/2017 | Buckley et al. |
| 2017/0089590 A1 | 3/2017 | Bruin-Slot et al. |
| 2017/0095105 A1 | 4/2017 | Clark et al. |
| 2017/0099977 A1 | 4/2017 | Liu |
| 2017/0099984 A1 | 4/2017 | Koetz |
| 2017/0099990 A1 | 4/2017 | Magnouloux et al. |
| 2017/0099995 A1 | 4/2017 | Magnouloux |
| 2017/0119192 A1 | 5/2017 | Sanserverino |
| 2017/0127871 A1 | 5/2017 | Leung |
| 2017/0172335 A1 | 6/2017 | Colas et al. |
| 2017/0181564 A1 | 6/2017 | He et al. |
| 2017/0199658 A1 | 7/2017 | Stoufer et al. |
| 2017/0224157 A1 | 8/2017 | Rummel et al. |
| 2017/0231257 A1 | 8/2017 | Thul et al. |
| 2017/0231415 A1 | 8/2017 | Cheng et al. |
| 2017/0231430 A1 | 8/2017 | Moon et al. |
| 2017/0245674 A1 | 8/2017 | Imura |
| 2017/0245683 A1 | 8/2017 | Chen et al. |
| 2017/0245686 A1 | 8/2017 | Man |
| 2017/0251872 A1 | 9/2017 | Li et al. |
| 2017/0251874 A1 | 9/2017 | Sladecek |
| 2017/0258268 A1 | 9/2017 | Kazanas et al. |
| 2017/0276378 A1 | 9/2017 | Faraldi et al. |
| 2017/0280914 A1 | 10/2017 | Kumar et al. |
| 2017/0290452 A1* | 10/2017 | Guillaume .......... A47J 27/0802 |
| 2017/0295993 A1 | 10/2017 | Li et al. |
| 2017/0303740 A1 | 10/2017 | Bonaccorso |
| 2017/0319006 A1 | 11/2017 | Niizumi |
| 2017/0332823 A1 | 11/2017 | Sanseverino |
| 2017/0343221 A1 | 11/2017 | Swayne et al. |
| 2017/0360238 A1 | 12/2017 | Bogazzi |
| 2017/0360254 A1 | 12/2017 | Muhr et al. |
| 2017/0360255 A1 | 12/2017 | Karau |
| 2017/0367514 A1 | 12/2017 | In 'T Groen et al. |
| 2017/0370595 A1 | 12/2017 | Yang et al. |
| 2018/0000285 A1 | 1/2018 | Backus et al. |
| 2018/0007738 A1 | 1/2018 | Knappenberger et al. |
| 2018/0007744 A1 | 1/2018 | Nonaka et al. |
| 2018/0014683 A1 | 1/2018 | Glucksman |
| 2018/0028017 A1 | 2/2018 | Wu |
| 2018/0035698 A1 | 2/2018 | Mcnerney et al. |
| 2018/0070596 A1 | 3/2018 | Kim et al. |
| 2018/0073739 A1 | 3/2018 | Dumenil |
| 2018/0078089 A1 | 3/2018 | Sauer et al. |
| 2018/0103796 A1 | 4/2018 | Park |
| 2018/0110355 A1 | 4/2018 | Huang et al. |
| 2018/0110373 A1 | 4/2018 | Zhang et al. |
| 2018/0116264 A1 | 5/2018 | De Winter et al. |
| 2018/0116438 A1 | 5/2018 | He et al. |
| 2018/0125293 A1 | 5/2018 | Mcnerney et al. |
| 2018/0125294 A1 | 5/2018 | Conte et al. |
| 2018/0132648 A1 | 5/2018 | Furlanetto et al. |
| 2018/0140126 A1 | 5/2018 | Van Dillen |
| 2018/0143086 A1 | 5/2018 | Stoufer et al. |
| 2018/0146812 A1 | 5/2018 | Choi |
| 2018/0153329 A1 | 6/2018 | Glucksman et al. |
| 2018/0160840 A1 | 6/2018 | De' Longhi |
| 2018/0160849 A1 | 6/2018 | Hebert, Jr. et al. |
| 2018/0177322 A1 | 6/2018 | Kim |
| 2018/0177343 A1 | 6/2018 | Bonaccorso |
| 2018/0184843 A1 | 7/2018 | Kim et al. |
| 2018/0184848 A1 | 7/2018 | De' Longhi |
| 2018/0192825 A1 | 7/2018 | Popeil et al. |
| 2018/0199615 A1 | 7/2018 | Zhang et al. |
| 2018/0199756 A1 | 7/2018 | Huang |
| 2018/0206672 A1 | 7/2018 | Grace et al. |
| 2018/0206677 A1 | 7/2018 | Ivarsson et al. |
| 2018/0213965 A1 | 8/2018 | Li |
| 2018/0220498 A1 | 8/2018 | Jeon et al. |
| 2018/0220842 A1 | 8/2018 | Delrue et al. |
| 2018/0228318 A1 | 8/2018 | Zwanenburg et al. |
| 2018/0235396 A1 | 8/2018 | Schonenberger |
| 2018/0238560 A1 | 8/2018 | Deng et al. |
| 2018/0255967 A1 | 9/2018 | Haas et al. |
| 2018/0255971 A1 | 9/2018 | Moon et al. |
| 2018/0263084 A1 | 9/2018 | Yoshino et al. |
| 2018/0263402 A1 | 9/2018 | Li |
| 2018/0266697 A1 | 9/2018 | Dash et al. |
| 2018/0270915 A1 | 9/2018 | Koetz |
| 2018/0271321 A1 | 9/2018 | Delrue et al. |
| 2018/0271322 A1 | 9/2018 | Thai et al. |
| 2018/0271323 A1 | 9/2018 | Zhang et al. |
| 2018/0279832 A1 | 10/2018 | Ohta et al. |
| 2018/0289212 A1 | 10/2018 | Sladecek et al. |
| 2018/0296019 A1 | 10/2018 | Kim et al. |
| 2018/0299138 A1 | 10/2018 | Faraldi et al. |
| 2018/0303285 A1 | 10/2018 | Cheng |
| 2018/0317691 A1 | 11/2018 | Huang |
| 2018/0317692 A1 | 11/2018 | Huang |
| 2018/0317693 A1 | 11/2018 | Huang |
| 2018/0325311 A1 | 11/2018 | Feldman et al. |

(56) References Cited

U.S. PATENT DOCUMENTS

| | | |
|---|---|---|
| 2018/0325313 A1 | 11/2018 | De'Longhi et al. |
| 2018/0325318 A1 | 11/2018 | De' Longhi et al. |
| 2018/0325322 A1 | 11/2018 | De'Longhi et al. |
| 2018/0328645 A1 | 11/2018 | Wang et al. |
| 2018/0332993 A1 | 11/2018 | Cho et al. |
| 2018/0332994 A1 | 11/2018 | Hasegawa |
| 2018/0332999 A1 | 11/2018 | Nie |
| 2018/0333004 A1 | 11/2018 | De' Longhi et al. |
| 2018/0333005 A1 | 11/2018 | Fritz et al. |
| 2018/0338636 A1 | 11/2018 | Ceccoli |
| 2018/0340695 A1 | 11/2018 | Park et al. |
| 2018/0344085 A1 | 12/2018 | Dutter |
| 2018/0347829 A1 | 12/2018 | Martini et al. |
| 2018/0353007 A1 | 12/2018 | Eberhart et al. |
| 2018/0353010 A1 | 12/2018 | Delrue et al. |
| 2018/0359823 A1 | 12/2018 | Shin et al. |
| 2018/0363915 A1 | 12/2018 | Bu |
| 2018/0368615 A1 | 12/2018 | Luo et al. |
| 2019/0000267 A1 | 1/2019 | Li et al. |
| 2019/0003718 A1 | 1/2019 | Lee et al. |
| 2019/0008310 A1 | 1/2019 | Kim et al. |
| 2019/0008316 A1 | 1/2019 | Kim et al. |
| 2019/0014940 A1 | 1/2019 | Cheung et al. |
| 2019/0014943 A1 | 1/2019 | Gill et al. |
| 2019/0021142 A1 | 1/2019 | Mizuta et al. |
| 2019/0021537 A1 | 1/2019 | Park |
| 2019/0021546 A1 | 1/2019 | Tan et al. |
| 2019/0024904 A1 | 1/2019 | Ueda et al. |
| 2019/0029459 A1 | 1/2019 | Gao et al. |
| 2019/0045964 A1 | 2/2019 | Gill et al. |
| 2019/0045973 A1 | 2/2019 | Gill et al. |
| 2019/0053521 A1 | 2/2019 | Tian et al. |
| 2019/0053655 A1 | 2/2019 | Panasik et al. |
| 2019/0059627 A1 | 2/2019 | Kitatani et al. |
| 2019/0059628 A1 | 2/2019 | Liu et al. |
| 2019/0059647 A1 | 2/2019 | Floessholzer |
| 2019/0069706 A1 | 3/2019 | Kim et al. |
| 2019/0069719 A1 | 3/2019 | Huang et al. |
| 2019/0075956 A1 | 3/2019 | Bang et al. |
| 2019/0075971 A1 | 3/2019 | Noca et al. |
| 2019/0082876 A1 | 3/2019 | Shi et al. |
| 2019/0086075 A1 | 3/2019 | Albert |
| 2019/0099039 A1 | 4/2019 | Li et al. |
| 2019/0110629 A1 | 4/2019 | Truong et al. |
| 2019/0110638 A1 | 4/2019 | Li et al. |
| 2019/0110640 A1 | 4/2019 | Te Velde et al. |
| 2019/0117005 A1 | 4/2019 | Kettavong et al. |
| 2019/0120504 A1 | 4/2019 | Lee et al. |
| 2019/0133364 A1 | 5/2019 | Tian et al. |
| 2019/0137112 A1 | 5/2019 | Lego et al. |
| 2019/0142215 A1 | 5/2019 | Popeil et al. |
| 2019/0142217 A1 | 5/2019 | Sladecek |
| 2019/0142220 A1 | 5/2019 | Shirali et al. |
| 2019/0167028 A1 | 6/2019 | Wang et al. |
| 2019/0167038 A1 | 6/2019 | DeLonghi et al. |
| 2019/0170361 A1 | 6/2019 | Ha et al. |
| 2019/0174944 A1 | 6/2019 | Luo et al. |
| 2019/0174945 A1 | 6/2019 | Oti |
| 2019/0203944 A1 | 7/2019 | Cho et al. |
| 2019/0215916 A1 | 7/2019 | Yang et al. |
| 2019/0223658 A1 | 7/2019 | He |
| 2019/0231125 A1 | 8/2019 | Gill et al. |
| 2019/0231126 A1 | 8/2019 | Gill et al. |
| 2019/0231127 A1 | 8/2019 | Gill et al. |
| 2019/0231128 A1 | 8/2019 | Gill et al. |
| 2019/0231129 A1 | 8/2019 | Gill et al. |
| 2019/0231130 A1 | 8/2019 | Gill et al. |
| 2019/0231131 A1 | 8/2019 | Gill et al. |
| 2019/0231132 A1 | 8/2019 | Gill et al. |
| 2019/0231133 A1 | 8/2019 | Gill et al. |
| 2019/0231134 A1 | 8/2019 | Gill et al. |
| 2019/0231135 A1 | 8/2019 | Gill et al. |
| 2019/0231136 A1 | 8/2019 | Gill et al. |
| 2019/0231137 A1 | 8/2019 | Gill et al. |
| 2019/0231138 A1 | 8/2019 | Gill et al. |
| 2019/0231139 A1 | 8/2019 | Gill et al. |
| 2019/0231140 A1 | 8/2019 | Gill et al. |
| 2019/0231141 A1 | 8/2019 | Gill et al. |
| 2019/0231142 A1 | 8/2019 | Gill et al. |
| 2019/0231143 A1 | 8/2019 | Gill et al. |
| 2019/0239518 A1 | 8/2019 | Mckee et al. |
| 2019/0246829 A1 | 8/2019 | Zhou et al. |
| 2019/0246830 A1 | 8/2019 | Ametepe et al. |
| 2019/0246835 A1 | 8/2019 | Tsai |
| 2019/0254473 A1 | 8/2019 | Anthony et al. |
| 2019/0254474 A1 | 8/2019 | Anthony et al. |
| 2019/0254476 A1 | 8/2019 | Anthony et al. |
| 2019/0269272 A1 | 9/2019 | Itzkowitz |
| 2019/0269276 A1 | 9/2019 | Gvili |
| 2019/0274461 A1 | 9/2019 | Nichols |
| 2019/0274462 A1 | 9/2019 | Moon |
| 2019/0282021 A1 | 9/2019 | Dion et al. |
| 2019/0282029 A1 | 9/2019 | Goldberg |
| 2019/0290062 A1 | 9/2019 | Prieto et al. |
| 2019/0290072 A1 | 9/2019 | Prieto et al. |
| 2019/0298100 A1 | 10/2019 | Li et al. |
| 2019/0309955 A1 | 10/2019 | Castillo et al. |
| 2019/0309956 A1 | 10/2019 | Buschman et al. |
| 2019/0313832 A1 | 10/2019 | Lee et al. |
| 2019/0313833 A1 | 10/2019 | Li et al. |
| 2019/0313844 A1 | 10/2019 | Nadendla et al. |
| 2019/0316783 A1 | 10/2019 | Lee et al. |
| 2019/0327979 A1 | 10/2019 | Yang et al. |
| 2019/0328169 A1 | 10/2019 | Fogacci |
| 2019/0328175 A1 | 10/2019 | Bancroft |
| 2019/0335934 A1 | 11/2019 | Delrue et al. |
| 2019/0374058 A1 | 12/2019 | Blond et al. |
| 2019/0374064 A1 | 12/2019 | Gill et al. |
| 2019/0380524 A1 | 12/2019 | Guegan et al. |
| 2019/0381654 A1 | 12/2019 | Oleynik |
| 2019/0387913 A1 | 12/2019 | Lee et al. |
| 2019/0387921 A1 | 12/2019 | Lemberger et al. |
| 2019/0387922 A1 | 12/2019 | Jin et al. |
| 2019/0387923 A1 | 12/2019 | Anthony et al. |
| 2020/0000262 A1 | 1/2020 | Delrue et al. |
| 2020/0008601 A1 | 1/2020 | Cao |
| 2020/0008616 A1 | 1/2020 | Moon |
| 2020/0018475 A1 | 1/2020 | Sim et al. |
| 2020/0029721 A1 | 1/2020 | Kang et al. |
| 2020/0029731 A1 | 1/2020 | Hunt |
| 2020/0033009 A1 | 1/2020 | Lee et al. |
| 2020/0046157 A1 | 2/2020 | Leung |
| 2020/0053842 A1 | 2/2020 | Jeon et al. |
| 2020/0054024 A1 | 2/2020 | Sun et al. |
| 2020/0060472 A1 | 2/2020 | Gill et al. |
| 2020/0060473 A1 | 2/2020 | Gill et al. |
| 2020/0069113 A1 | 3/2020 | Anthony et al. |
| 2020/0080726 A1 | 3/2020 | Polster |
| 2020/0085235 A1 | 3/2020 | He et al. |
| 2020/0088415 A1 | 3/2020 | Lee et al. |
| 2020/0088443 A1 | 3/2020 | Williams et al. |
| 2020/0093329 A1 | 3/2020 | Glucksman |
| 2020/0113380 A1 | 4/2020 | Lu |
| 2020/0121129 A1 | 4/2020 | Wittig |
| 2020/0128995 A1 | 4/2020 | Patel et al. |
| 2020/0128996 A1 | 4/2020 | Qin et al. |
| 2020/0128997 A1 | 4/2020 | Qin et al. |
| 2020/0128998 A1 | 4/2020 | Qin et al. |
| 2020/0138043 A1 | 5/2020 | Hoerter |
| 2020/0138229 A1 | 5/2020 | Kweon et al. |
| 2020/0138239 A1 | 5/2020 | Gromowski et al. |
| 2020/0146496 A1 | 5/2020 | Patadia |
| 2020/0146497 A1 | 5/2020 | Shi et al. |
| 2020/0170437 A1 | 6/2020 | Anthony et al. |
| 2020/0170438 A1 | 6/2020 | Freymiller et al. |
| 2020/0178583 A1 | 6/2020 | Chen et al. |
| 2020/0182485 A1 | 6/2020 | Ball et al. |
| 2020/0187315 A1 | 6/2020 | Carcano et al. |
| 2020/0187697 A1 | 6/2020 | Stewart et al. |
| 2020/0187698 A1 | 6/2020 | Peng et al. |
| 2020/0187710 A1 | 6/2020 | Guo et al. |
| 2020/0187712 A1 | 6/2020 | Gill et al. |
| 2020/0191404 A1 | 6/2020 | Song |
| 2020/0205245 A1 | 6/2020 | Ma et al. |

(56) References Cited

U.S. PATENT DOCUMENTS

| | | | |
|---|---|---|---|
| 2020/0205595 A1 | 7/2020 | He | |
| 2020/0214500 A1 | 7/2020 | Popeil et al. | |
| 2020/0221900 A1 | 7/2020 | Itzkowitz | |
| 2020/0229637 A1 | 7/2020 | Han et al. | |
| 2020/0229638 A1 | 7/2020 | Lu | |
| 2020/0229640 A1 | 7/2020 | Han et al. | |
| 2020/0240647 A1 | 7/2020 | Itzkowitz et al. | |
| 2020/0253420 A1 | 8/2020 | He et al. | |
| 2020/0260907 A1 | 8/2020 | Lu et al. | |
| 2020/0268189 A1 | 8/2020 | Anthony | |
| 2020/0278116 A1 | 9/2020 | Kobayashi et al. | |
| 2020/0329908 A1 | 10/2020 | Chen | |
| 2020/0329909 A1 | 10/2020 | Conrad et al. | |
| 2020/0337497 A1 | 10/2020 | Anthony et al. | |
| 2020/0405086 A1 | 12/2020 | Dos Santos et al. | |
| 2021/0000292 A1 | 1/2021 | Siu et al. | |
| 2021/0000296 A1 | 1/2021 | Kennedy et al. | |
| 2021/0137298 A1* | 5/2021 | Zakowski | A47J 36/06 |
| 2021/0137299 A1 | 5/2021 | Moon et al. | |

FOREIGN PATENT DOCUMENTS

| | | |
|---|---|---|
| CN | 1218653 A | 6/1999 |
| CN | 2358794 Y | 1/2000 |
| CN | 2389593 Y | 8/2000 |
| CN | 2450993 Y | 10/2001 |
| CN | 2469839 Y | 1/2002 |
| CN | 2479871 Y | 3/2002 |
| CN | 1139352 C | 2/2004 |
| CN | 1148142 C | 5/2004 |
| CN | 1158963 C | 7/2004 |
| CN | 2719176 Y | 8/2005 |
| CN | 1820685 A | 8/2006 |
| CN | 1883351 A | 12/2006 |
| CN | 2855256 Y | 1/2007 |
| CN | 2904903 Y | 5/2007 |
| CN | 1981682 A | 6/2007 |
| CN | 1985727 A | 6/2007 |
| CN | 1989884 A | 7/2007 |
| CN | 100998476 A | 7/2007 |
| CN | 101023842 A | 8/2007 |
| CN | 101053485 A | 10/2007 |
| CN | 200987595 Y | 12/2007 |
| CN | 101099635 A | 1/2008 |
| CN | 101108064 A | 1/2008 |
| CN | 101112291 A | 1/2008 |
| CN | 101112292 A | 1/2008 |
| CN | 101112293 A | 1/2008 |
| CN | 101142448 A | 3/2008 |
| CN | 101185556 A | 5/2008 |
| CN | 100401957 C | 7/2008 |
| CN | 101209179 A | 7/2008 |
| CN | 101209180 A | 7/2008 |
| CN | 201079267 Y | 7/2008 |
| CN | 100425186 C | 10/2008 |
| CN | 100428906 C | 10/2008 |
| CN | 101273834 A | 10/2008 |
| CN | 201139427 Y | 10/2008 |
| CN | 101322614 A | 12/2008 |
| CN | 201197609 Y | 2/2009 |
| CN | 100464682 C | 3/2009 |
| CN | 100469289 C | 3/2009 |
| CN | 201207144 Y | 3/2009 |
| CN | 101432608 A | 5/2009 |
| CN | 101438929 A | 5/2009 |
| CN | 100496350 C | 6/2009 |
| CN | 100522018 C | 8/2009 |
| CN | 100531628 C | 8/2009 |
| CN | 100534363 C | 9/2009 |
| CN | 101518409 A | 9/2009 |
| CN | 100559999 C | 11/2009 |
| CN | 201365839 Y | 12/2009 |
| CN | 100588351 C | 2/2010 |
| CN | 101669761 A | 3/2010 |
| CN | 101766439 A | 7/2010 |
| CN | 101766443 A | 7/2010 |
| CN | 101791190 A | 8/2010 |
| CN | 101828856 A | 9/2010 |
| CN | 101856086 A | 10/2010 |
| CN | 201602600 U | 10/2010 |
| CN | 201624512 U | 11/2010 |
| CN | 101936550 A | 1/2011 |
| CN | 101940273 A | 1/2011 |
| CN | 101420893 B | 2/2011 |
| CN | 101977536 A | 2/2011 |
| CN | 201888709 U | 7/2011 |
| CN | 201929758 U | 8/2011 |
| CN | 201948771 U | 8/2011 |
| CN | 102178443 A | 9/2011 |
| CN | 102178445 A | 9/2011 |
| CN | 102178464 A | 9/2011 |
| CN | 201958652 U | 9/2011 |
| CN | 201996364 U | 10/2011 |
| CN | 101305890 B | 11/2011 |
| CN | 102240164 A | 11/2011 |
| CN | 102307500 A | 1/2012 |
| CN | 102313306 A | 2/2012 |
| CN | 102349791 A | 2/2012 |
| CN | 202151310 U | 2/2012 |
| CN | 102368936 A | 3/2012 |
| CN | 202184614 U | 4/2012 |
| CN | 101692958 B | 5/2012 |
| CN | 202207075 U | 5/2012 |
| CN | 202234720 U | 5/2012 |
| CN | 202234761 U | 5/2012 |
| CN | 202312830 U | 7/2012 |
| CN | 202312886 U | 7/2012 |
| CN | 102670079 A | 9/2012 |
| CN | 202408428 U | 9/2012 |
| CN | 202408455 U | 9/2012 |
| CN | 102755120 A | 10/2012 |
| CN | 102824120 A | 12/2012 |
| CN | 202619362 U | 12/2012 |
| CN | 102100481 B | 1/2013 |
| CN | 102883641 A | 1/2013 |
| CN | 202636678 U | 1/2013 |
| CN | 202698888 U | 1/2013 |
| CN | 103006045 A | 4/2013 |
| CN | 103006092 A | 4/2013 |
| CN | 202858889 U | 4/2013 |
| CN | 103142128 A | 6/2013 |
| CN | 103142151 A | 6/2013 |
| CN | 103169371 A | 6/2013 |
| CN | 103179884 A | 6/2013 |
| CN | 202960194 U | 6/2013 |
| CN | 202981682 U | 6/2013 |
| CN | 203000535 U | 6/2013 |
| CN | 103188947 A | 7/2013 |
| CN | 103188970 A | 7/2013 |
| CN | 103220947 A | 7/2013 |
| CN | 103222807 A | 7/2013 |
| CN | 203041954 U | 7/2013 |
| CN | 203041955 U | 7/2013 |
| CN | 102342739 B | 8/2013 |
| CN | 203122175 U | 8/2013 |
| CN | 103299132 A | 9/2013 |
| CN | 203195497 U | 9/2013 |
| CN | 203195499 U | 9/2013 |
| CN | 103375826 A | 10/2013 |
| CN | 203234602 U | 10/2013 |
| CN | 203234613 U | 10/2013 |
| CN | 102319018 B | 11/2013 |
| CN | 203302862 U | 11/2013 |
| CN | 203302892 U | 11/2013 |
| CN | 103445669 A | 12/2013 |
| CN | 102397005 B | 1/2014 |
| CN | 103491830 A | 1/2014 |
| CN | 203407931 U | 1/2014 |
| CN | 103649643 A | 3/2014 |
| CN | 203483269 U | 3/2014 |
| CN | 103750730 A | 4/2014 |
| CN | 203539138 U | 4/2014 |
| CN | 203597771 U | 5/2014 |
| CN | 203597772 U | 5/2014 |

(56) References Cited

FOREIGN PATENT DOCUMENTS

| | | | |
|---|---|---|---|
| CN | 203615383 U | 5/2014 |
| CN | 203634023 U | 6/2014 |
| CN | 203647141 U | 6/2014 |
| CN | 203662545 U | 6/2014 |
| CN | 103892696 A | 7/2014 |
| CN | 103948308 A | 7/2014 |
| CN | 203693372 U | 7/2014 |
| CN | 203723888 U | 7/2014 |
| CN | 104000478 A | 8/2014 |
| CN | 203762926 U | 8/2014 |
| CN | 203776718 U | 8/2014 |
| CN | 203776719 U | 8/2014 |
| CN | 203776729 U | 8/2014 |
| CN | 203789747 U | 8/2014 |
| CN | 203828675 U | 9/2014 |
| CN | 104068757 B | 10/2014 |
| CN | 203873601 U | 10/2014 |
| CN | 203873602 U | 10/2014 |
| CN | 203885286 U | 10/2014 |
| CN | 203885342 U | 10/2014 |
| CN | 104138200 A | 11/2014 |
| CN | 203914511 U | 11/2014 |
| CN | 203953373 U | 11/2014 |
| CN | 203970073 U | 12/2014 |
| CN | 203970160 U | 12/2014 |
| CN | 203987492 U | 12/2014 |
| CN | 203987520 U | 12/2014 |
| CN | 203987550 U | 12/2014 |
| CN | 203987551 U | 12/2014 |
| CN | 204015964 U | 12/2014 |
| CN | 204016055 U | 12/2014 |
| CN | 204016056 U | 12/2014 |
| CN | 204049362 U | 12/2014 |
| CN | 204091768 U | 1/2015 |
| CN | 104323708 A | 2/2015 |
| CN | 104337407 A | 2/2015 |
| CN | 104367182 A | 2/2015 |
| CN | 204133165 U | 2/2015 |
| CN | 204133291 U | 2/2015 |
| CN | 204158183 U | 2/2015 |
| CN | 104433841 A | 3/2015 |
| CN | 204192406 U | 3/2015 |
| CN | 104490294 A | 4/2015 |
| CN | 102917623 B | 5/2015 |
| CN | 104586233 A | 5/2015 |
| CN | 104613515 A | 5/2015 |
| CN | 104622274 A | 5/2015 |
| CN | 104676681 A | 6/2015 |
| CN | 104688019 A | 6/2015 |
| CN | 104706212 A | 6/2015 |
| CN | 103284618 B | 7/2015 |
| CN | 104754992 A | 7/2015 |
| CN | 104757872 A | 7/2015 |
| CN | 204427799 | 7/2015 |
| CN | 204427801 U | 7/2015 |
| CN | 204467861 U | 7/2015 |
| CN | 204500391 U | 7/2015 |
| CN | 104814665 A | 8/2015 |
| CN | 104856561 A | 8/2015 |
| CN | 104856563 A | 8/2015 |
| CN | 204520386 U | 8/2015 |
| CN | 204580991 U | 8/2015 |
| CN | 104873098 A | 9/2015 |
| CN | 104887063 A | 9/2015 |
| CN | 204636063 U | 9/2015 |
| CN | 104983318 A | 10/2015 |
| CN | 104997394 A | 10/2015 |
| CN | 204697804 U | 10/2015 |
| CN | 105011741 A | 11/2015 |
| CN | 105030035 A | 11/2015 |
| CN | 105054772 B | 11/2015 |
| CN | 105054773 B | 11/2015 |
| CN | 204734374 U | 11/2015 |
| CN | 204743846 U | 11/2015 |
| CN | 204765165 U | 11/2015 |
| CN | 204765167 U | 11/2015 |
| CN | 204765168 U | 11/2015 |
| CN | 204765197 U | 11/2015 |
| CN | 204797615 U | 11/2015 |
| CN | 204797616 U | 11/2015 |
| CN | 103813738 B | 12/2015 |
| CN | 105105624 A | 12/2015 |
| CN | 105105626 A | 12/2015 |
| CN | 105167591 B | 12/2015 |
| CN | 105167592 A | 12/2015 |
| CN | 105193301 A | 12/2015 |
| CN | 204813499 U | 12/2015 |
| CN | 204839219 U | 12/2015 |
| CN | 204889693 U | 12/2015 |
| CN | 105212693 B | 1/2016 |
| CN | 105212730 A | 1/2016 |
| CN | 105231802 A | 1/2016 |
| CN | 105231811 A | 1/2016 |
| CN | 105231812 A | 1/2016 |
| CN | 105231813 A | 1/2016 |
| CN | 105266565 A | 1/2016 |
| CN | 105266577 A | 1/2016 |
| CN | 204995259 U | 1/2016 |
| CN | 105286491 A | 2/2016 |
| CN | 105286496 A | 2/2016 |
| CN | 105286498 A | 2/2016 |
| CN | 105286627 A | 2/2016 |
| CN | 105326332 A | 2/2016 |
| CN | 105342454 A | 2/2016 |
| CN | 205018872 U | 2/2016 |
| CN | 205018878 U | 2/2016 |
| CN | 105380512 A | 3/2016 |
| CN | 105380513 A | 3/2016 |
| CN | 105380514 A | 3/2016 |
| CN | 105411378 A | 3/2016 |
| CN | 105411379 A | 3/2016 |
| CN | 105433778 A | 3/2016 |
| CN | 105433779 A | 3/2016 |
| CN | 105451610 A | 3/2016 |
| CN | 205053851 U | 3/2016 |
| CN | 105455628 A | 4/2016 |
| CN | 105455664 A | 4/2016 |
| CN | 105455671 A | 4/2016 |
| CN | 105476461 A | 4/2016 |
| CN | 105476464 A | 4/2016 |
| CN | 105476472 A | 4/2016 |
| CN | 105476491 A | 4/2016 |
| CN | 105496184 A | 4/2016 |
| CN | 105496185 A | 4/2016 |
| CN | 105496224 A | 4/2016 |
| CN | 205126014 U | 4/2016 |
| CN | 105534269 A | 5/2016 |
| CN | 105559571 A | 5/2016 |
| CN | 105595792 A | 5/2016 |
| CN | 105595802 A | 5/2016 |
| CN | 105595803 A | 5/2016 |
| CN | 205197727 U | 5/2016 |
| CN | 205214967 U | 5/2016 |
| CN | 205215045 U | 5/2016 |
| CN | 102440681 B | 6/2016 |
| CN | 102783908 B | 6/2016 |
| CN | 103648337 B | 6/2016 |
| CN | 105615638 A | 6/2016 |
| CN | 105615639 A | 6/2016 |
| CN | 105615686 A | 6/2016 |
| CN | 105640299 A | 6/2016 |
| CN | 105640302 A | 6/2016 |
| CN | 105640309 A | 6/2016 |
| CN | 105640351 A | 6/2016 |
| CN | 105662112 A | 6/2016 |
| CN | 105662125 A | 6/2016 |
| CN | 105662126 A | 6/2016 |
| CN | 105662127 A | 6/2016 |
| CN | 105708312 A | 6/2016 |
| CN | 205286098 U | 6/2016 |
| CN | 205322075 U | 6/2016 |
| CN | 104605727 B | 7/2016 |
| CN | 105725730 A | 7/2016 |
| CN | 105725829 A | 7/2016 |

(56) References Cited

FOREIGN PATENT DOCUMENTS

| | | |
|---|---|---|
| CN | 105768844 A | 7/2016 |
| CN | 105768859 A | 7/2016 |
| CN | 105768860 A | 7/2016 |
| CN | 103908166 B | 8/2016 |
| CN | 105816023 A | 8/2016 |
| CN | 105832176 A | 8/2016 |
| CN | 105852667 A | 8/2016 |
| CN | 105852668 A | 8/2016 |
| CN | 105902144 A | 8/2016 |
| CN | 105902150 A | 8/2016 |
| CN | 205410811 U | 8/2016 |
| CN | 205425108 U | 8/2016 |
| CN | 205433281 U | 8/2016 |
| CN | 205433317 U | 8/2016 |
| CN | 205433320 U | 8/2016 |
| CN | 205493513 U | 8/2016 |
| CN | 205493586 U | 8/2016 |
| CN | 205493593 U | 8/2016 |
| CN | 105919411 A | 9/2016 |
| CN | 105919417 A | 9/2016 |
| CN | 105935244 A | 9/2016 |
| CN | 105935258 A | 9/2016 |
| CN | 105972653 A | 9/2016 |
| CN | 205568641 U | 9/2016 |
| CN | 205568772 U | 9/2016 |
| CN | 205597052 U | 9/2016 |
| CN | 105982529 A | 10/2016 |
| CN | 105982532 A | 10/2016 |
| CN | 105996737 A | 10/2016 |
| CN | 105996748 A | 10/2016 |
| CN | 105996752 A | 10/2016 |
| CN | 105996753 A | 10/2016 |
| CN | 106037448 A | 10/2016 |
| CN | 106037457 A | 10/2016 |
| CN | 106037458 A | 10/2016 |
| CN | 106073481 A | 11/2016 |
| CN | 106073517 A | 11/2016 |
| CN | 106073519 A | 11/2016 |
| CN | 106108627 A | 11/2016 |
| CN | 106108630 A | 11/2016 |
| CN | 106108631 A | 11/2016 |
| CN | 106108697 B | 11/2016 |
| CN | 106166030 A | 11/2016 |
| CN | 205671926 U | 11/2016 |
| CN | 205671927 U | 11/2016 |
| CN | 106175412 A | 12/2016 |
| CN | 106175476 A | 12/2016 |
| CN | 106175477 A | 12/2016 |
| CN | 106213979 A | 12/2016 |
| CN | 106235878 A | 12/2016 |
| CN | 106235892 A | 12/2016 |
| CN | 106235893 A | 12/2016 |
| CN | 205831638 U | 12/2016 |
| CN | 205831665 U | 12/2016 |
| CN | 106264085 A | 1/2017 |
| CN | 106264095 A | 1/2017 |
| CN | 106292340 | 1/2017 |
| CN | 106343895 A | 1/2017 |
| CN | 205849309 U | 1/2017 |
| CN | 205860134 U | 1/2017 |
| CN | 106377158 A | 2/2017 |
| CN | 106377159 A | 2/2017 |
| CN | 106377165 A | 2/2017 |
| CN | 106388565 A | 2/2017 |
| CN | 106388572 A | 2/2017 |
| CN | 106419486 A | 2/2017 |
| CN | 106419521 A | 2/2017 |
| CN | 106419524 A | 2/2017 |
| CN | 106419618 B | 2/2017 |
| CN | 106419620 A | 2/2017 |
| CN | 205923803 U | 2/2017 |
| CN | 102805554 B | 3/2017 |
| CN | 106473623 A | 3/2017 |
| CN | 106490967 A | 3/2017 |
| CN | 106510449 A | 3/2017 |
| CN | 206007050 U | 3/2017 |
| CN | 206026097 U | 3/2017 |
| CN | 206026100 U | 3/2017 |
| CN | 206044349 U | 3/2017 |
| CN | 206044409 U | 3/2017 |
| CN | 106551617 A | 4/2017 |
| CN | 106575469 A | 4/2017 |
| CN | 106580074 A | 4/2017 |
| CN | 206062888 U | 4/2017 |
| CN | 206062947 U | 4/2017 |
| CN | 206102391 U | 4/2017 |
| CN | 206119969 U | 4/2017 |
| CN | 206119971 U | 4/2017 |
| CN | 106618154 A | 5/2017 |
| CN | 106618156 A | 5/2017 |
| CN | 106667244 A | 5/2017 |
| CN | 106691171 A | 5/2017 |
| CN | 206166699 U | 5/2017 |
| CN | 206166710 U | 5/2017 |
| CN | 206166711 U | 5/2017 |
| CN | 206166726 U | 5/2017 |
| CN | 206183062 U | 5/2017 |
| CN | 106802584 A | 6/2017 |
| CN | 106805744 A | 6/2017 |
| CN | 106805746 A | 6/2017 |
| CN | 106805747 A | 6/2017 |
| CN | 106805749 A | 6/2017 |
| CN | 106805750 A | 6/2017 |
| CN | 106805752 A | 6/2017 |
| CN | 106820951 A | 6/2017 |
| CN | 106820954 A | 6/2017 |
| CN | 106821017 A | 6/2017 |
| CN | 106852641 A | 6/2017 |
| CN | 106859298 A | 6/2017 |
| CN | 106889875 | 6/2017 |
| CN | 106889876 A | 6/2017 |
| CN | 106901591 A | 6/2017 |
| CN | 106901592 A | 6/2017 |
| CN | 206239100 U | 6/2017 |
| CN | 206252365 U | 6/2017 |
| CN | 206261486 U | 6/2017 |
| CN | 206261487 U | 6/2017 |
| CN | 206284788 U | 6/2017 |
| CN | 206284794 U | 6/2017 |
| CN | 106913201 A | 7/2017 |
| CN | 106923655 A | 7/2017 |
| CN | 106943000 A | 7/2017 |
| CN | 106943002 A | 7/2017 |
| CN | 106955017 A | 7/2017 |
| CN | 106974548 A | 7/2017 |
| CN | 106983360 A | 7/2017 |
| CN | 206303774 U | 7/2017 |
| CN | 206324671 U | 7/2017 |
| CN | 106993928 A | 8/2017 |
| CN | 106998961 A | 8/2017 |
| CN | 107019418 A | 8/2017 |
| CN | 107019419 A | 8/2017 |
| CN | 107019420 A | 8/2017 |
| CN | 107019423 A | 8/2017 |
| CN | 107048976 A | 8/2017 |
| CN | 107048991 A | 8/2017 |
| CN | 107048993 A | 8/2017 |
| CN | 107049054 A | 8/2017 |
| CN | 107049058 A | 8/2017 |
| CN | 107065634 B | 8/2017 |
| CN | 107105914 A | 8/2017 |
| CN | 206371913 U | 8/2017 |
| CN | 206371926 U | 8/2017 |
| CN | 206371930 U | 8/2017 |
| CN | 206371931 U | 8/2017 |
| CN | 206381064 U | 8/2017 |
| CN | 206414178 U | 8/2017 |
| CN | 104334066 B | 9/2017 |
| CN | 107136910 A | 9/2017 |
| CN | 107136911 A | 9/2017 |
| CN | 107149395 A | 9/2017 |
| CN | 107149398 A | 9/2017 |
| CN | 107684357 A | 9/2017 |
| CN | 206453694 U | 9/2017 |

(56) References Cited

FOREIGN PATENT DOCUMENTS

| | | |
|---|---|---|
| CN | 206469994 U | 9/2017 |
| CN | 206518479 U | 9/2017 |
| CN | 105142473 B | 10/2017 |
| CN | 107224188 A | 10/2017 |
| CN | 107224197 A | 10/2017 |
| CN | 107232962 A | 10/2017 |
| CN | 107259978 A | 10/2017 |
| CN | 107290094 A | 10/2017 |
| CN | 107296485 A | 10/2017 |
| CN | 107296486 A | 10/2017 |
| CN | 107296487 A | 10/2017 |
| CN | 107296488 A | 10/2017 |
| CN | 107296489 A | 10/2017 |
| CN | 107296490 A | 10/2017 |
| CN | 107296493 A | 10/2017 |
| CN | 107296494 A | 10/2017 |
| CN | 206560353 U | 10/2017 |
| CN | 206560354 U | 10/2017 |
| CN | 206560359 U | 10/2017 |
| CN | 206560361 U | 10/2017 |
| CN | 104643954 B | 11/2017 |
| CN | 107307729 A | 11/2017 |
| CN | 107307730 A | 11/2017 |
| CN | 107334388 A | 11/2017 |
| CN | 107361637 A | 11/2017 |
| CN | 107397431 A | 11/2017 |
| CN | 206603656 U | 11/2017 |
| CN | 107411540 A | 12/2017 |
| CN | 107411542 A | 12/2017 |
| CN | 107432668 A | 12/2017 |
| CN | 107440490 A | 12/2017 |
| CN | 107468052 A | 12/2017 |
| CN | 107495849 A | 12/2017 |
| CN | 107495856 A | 12/2017 |
| CN | 107510356 A | 12/2017 |
| CN | 107510379 A | 12/2017 |
| CN | 206687606 U | 12/2017 |
| CN | 206687631 U | 12/2017 |
| CN | 206700038 U | 12/2017 |
| CN | 206777230 U | 12/2017 |
| CN | 206807803 U | 12/2017 |
| CN | 206807804 U | 12/2017 |
| CN | 106213986 B | 1/2018 |
| CN | 107550250 A | 1/2018 |
| CN | 107550258 A | 1/2018 |
| CN | 107595153 A | 1/2018 |
| CN | 107616686 A | 1/2018 |
| CN | 206867128 U | 1/2018 |
| CN | 107647763 A | 2/2018 |
| CN | 107647769 A | 2/2018 |
| CN | 107647771 A | 2/2018 |
| CN | 107647772 A | 2/2018 |
| CN | 107647773 A | 2/2018 |
| CN | 107647777 A | 2/2018 |
| CN | 107660996 A | 2/2018 |
| CN | 107660997 A | 2/2018 |
| CN | 107684336 A | 2/2018 |
| CN | 107684337 A | 2/2018 |
| CN | 107684338 A | 2/2018 |
| CN | 107684339 A | 2/2018 |
| CN | 107684340 A | 2/2018 |
| CN | 107684341 A | 2/2018 |
| CN | 107684342 A | 2/2018 |
| CN | 107692806 A | 2/2018 |
| CN | 107702838 A | 2/2018 |
| CN | 107713732 A | 2/2018 |
| CN | 107713733 A | 2/2018 |
| CN | 107713734 A | 2/2018 |
| CN | 107713774 A | 2/2018 |
| CN | 107726388 A | 2/2018 |
| CN | 106419522 B | 3/2018 |
| CN | 107752726 A | 3/2018 |
| CN | 107752748 A | 3/2018 |
| CN | 107752751 A | 3/2018 |
| CN | 107752752 | 3/2018 |
| CN | 107752788 A | 3/2018 |
| CN | 107773021 A | 3/2018 |
| CN | 107773026 A | 3/2018 |
| CN | 107773029 A | 3/2018 |
| CN | 107773090 A | 3/2018 |
| CN | 107788820 A | 3/2018 |
| CN | 107788827 A | 3/2018 |
| CN | 107811499 A | 3/2018 |
| CN | 107811517 A | 3/2018 |
| CN | 107811518 A | 3/2018 |
| CN | 107822492 A | 3/2018 |
| CN | 107822494 A | 3/2018 |
| CN | 107822496 A | 3/2018 |
| CN | 107822524 A | 3/2018 |
| CN | 107836981 A | 3/2018 |
| CN | 107836986 A | 3/2018 |
| CN | 107836988 A | 3/2018 |
| CN | 207084680 U | 3/2018 |
| CN | 207101150 U | 3/2018 |
| CN | 107874584 A | 4/2018 |
| CN | 107874599 A | 4/2018 |
| CN | 107874601 A | 4/2018 |
| CN | 107874602 A | 4/2018 |
| CN | 107898351 A | 4/2018 |
| CN | 107928388 A | 4/2018 |
| CN | 107928395 A | 4/2018 |
| CN | 107951369 A | 4/2018 |
| CN | 107951376 A | 4/2018 |
| CN | 107951407 A | 4/2018 |
| CN | 207202762 U | 4/2018 |
| CN | 207253261 U | 4/2018 |
| CN | 107969907 A | 5/2018 |
| CN | 107969908 A | 5/2018 |
| CN | 107981713 A | 5/2018 |
| CN | 107997571 A | 5/2018 |
| CN | 108013742 A | 5/2018 |
| CN | 108013743 A | 5/2018 |
| CN | 108030404 A | 5/2018 |
| CN | 108041976 A | 5/2018 |
| CN | 108056670 A | 5/2018 |
| CN | 108078373 A | 5/2018 |
| CN | 207355971 U | 5/2018 |
| CN | 108095570 A | 6/2018 |
| CN | 108113501 A | 6/2018 |
| CN | 108143256 A | 6/2018 |
| CN | 108143259 A | 6/2018 |
| CN | 108143260 A | 6/2018 |
| CN | 108143261 A | 6/2018 |
| CN | 108143262 A | 6/2018 |
| CN | 108143263 A | 6/2018 |
| CN | 108143264 A | 6/2018 |
| CN | 108158418 A | 6/2018 |
| CN | 108158429 A | 6/2018 |
| CN | 108201338 A | 6/2018 |
| CN | 108209547 A | 6/2018 |
| CN | 207429001 U | 6/2018 |
| CN | 207492655 U | 6/2018 |
| CN | 207506440 U | 6/2018 |
| CN | 104207651 B | 7/2018 |
| CN | 106175423 A | 7/2018 |
| CN | 108244994 A | 7/2018 |
| CN | 108244995 A | 7/2018 |
| CN | 108244997 A | 7/2018 |
| CN | 108244998 A | 7/2018 |
| CN | 108244999 A | 7/2018 |
| CN | 108245000 A | 7/2018 |
| CN | 108245032 A | 7/2018 |
| CN | 108261055 A | 7/2018 |
| CN | 108261056 A | 7/2018 |
| CN | 108261061 A | 7/2018 |
| CN | 108272336 A | 7/2018 |
| CN | 108272338 A | 7/2018 |
| CN | 108294615 A | 7/2018 |
| CN | 108294616 A | 7/2018 |
| CN | 108294640 A | 7/2018 |
| CN | 108309035 A | 7/2018 |
| CN | 108324096 A | 7/2018 |
| CN | 207575048 U | 7/2018 |
| CN | 207604862 U | 7/2018 |

(56) References Cited

FOREIGN PATENT DOCUMENTS

| | | | |
|---|---|---|---|
| CN | 207627123 U | 7/2018 |
| CN | 207627136 U | 7/2018 |
| CN | 207640235 U | 7/2018 |
| CN | 106388570 B | 8/2018 |
| CN | 106419517 B | 8/2018 |
| CN | 108354444 A | 8/2018 |
| CN | 108354466 A | 8/2018 |
| CN | 108378678 A | 8/2018 |
| CN | 108378690 A | 8/2018 |
| CN | 108402888 A | 8/2018 |
| CN | 108402889 A | 8/2018 |
| CN | 108402891 A | 8/2018 |
| CN | 108402920 A | 8/2018 |
| CN | 108420304 A | 8/2018 |
| CN | 108433517 A | 8/2018 |
| CN | 108433529 A | 8/2018 |
| CN | 108451351 A | 8/2018 |
| CN | 108451388 A | 8/2018 |
| CN | 108464732 A | 8/2018 |
| CN | 207745052 U | 8/2018 |
| CN | 207754989 U | 8/2018 |
| CN | 207755036 U | 8/2018 |
| CN | 106539491 B | 9/2018 |
| CN | 107019415 B | 9/2018 |
| CN | 107019416 B | 9/2018 |
| CN | 108477987 A | 9/2018 |
| CN | 108497908 A | 9/2018 |
| CN | 108497914 A | 9/2018 |
| CN | 108497918 A | 9/2018 |
| CN | 108497942 A | 9/2018 |
| CN | 108523645 A | 9/2018 |
| CN | 108523647 A | 9/2018 |
| CN | 108523649 A | 9/2018 |
| CN | 108542272 A | 9/2018 |
| CN | 108552969 A | 9/2018 |
| CN | 108552989 A | 9/2018 |
| CN | 108567309 A | 9/2018 |
| CN | 108567321 A | 9/2018 |
| CN | 108567322 A | 9/2018 |
| CN | 108577514 A | 9/2018 |
| CN | 108577580 A | 9/2018 |
| CN | 207804077 U | 9/2018 |
| CN | 207804095 U | 9/2018 |
| CN | 207855533 U | 9/2018 |
| CN | 207855579 U | 9/2018 |
| CN | 106264094 B | 10/2018 |
| CN | 108606627 A | 10/2018 |
| CN | 108618592 A | 10/2018 |
| CN | 108618593 A | 10/2018 |
| CN | 108618594 A | 10/2018 |
| CN | 108618595 A | 10/2018 |
| CN | 108618597 A | 10/2018 |
| CN | 108618651 A | 10/2018 |
| CN | 108634771 A | 10/2018 |
| CN | 108634777 A | 10/2018 |
| CN | 108634807 A | 10/2018 |
| CN | 108652431 A | 10/2018 |
| CN | 108652432 A | 10/2018 |
| CN | 108670021 A | 10/2018 |
| CN | 108670023 A | 10/2018 |
| CN | 108670048 A | 10/2018 |
| CN | 108703644 A | 10/2018 |
| CN | 108703645 A | 10/2018 |
| CN | 108703675 A | 10/2018 |
| CN | 207940738 U | 10/2018 |
| CN | 207940739 U | 10/2018 |
| CN | 207940743 U | 10/2018 |
| CN | 207940754 U | 10/2018 |
| CN | 106580073 B | 11/2018 |
| CN | 108720548 A | 11/2018 |
| CN | 108720577 A | 11/2018 |
| CN | 108720581 A | 11/2018 |
| CN | 108720584 A | 11/2018 |
| CN | 108720585 A | 11/2018 |
| CN | 108720586 A | 11/2018 |
| CN | 108720633 A | 11/2018 |
| CN | 108720650 A | 11/2018 |
| CN | 108732958 A | 11/2018 |
| CN | 108771466 A | 11/2018 |
| CN | 108771488 A | 11/2018 |
| CN | 108771489 A | 11/2018 |
| CN | 108784323 A | 11/2018 |
| CN | 108784324 A | 11/2018 |
| CN | 108784330 A | 11/2018 |
| CN | 108784401 A | 11/2018 |
| CN | 108814274 A | 11/2018 |
| CN | 108836104 A | 11/2018 |
| CN | 108836105 A | 11/2018 |
| CN | 108836107 A | 11/2018 |
| CN | 108836108 A | 11/2018 |
| CN | 108836131 A | 11/2018 |
| CN | 108851966 A | 11/2018 |
| CN | 108851969 A | 11/2018 |
| CN | 108888087 A | 11/2018 |
| CN | 108888099 A | 11/2018 |
| CN | 108903620 A | 11/2018 |
| CN | 108903621 A | 11/2018 |
| CN | 208031026 U | 11/2018 |
| CN | 208031027 U | 11/2018 |
| CN | 208031028 U | 11/2018 |
| CN | 208081098 U | 11/2018 |
| CN | 208081104 U | 11/2018 |
| CN | 208081108 U | 11/2018 |
| CN | 106419520 B | 12/2018 |
| CN | 106419526 B | 12/2018 |
| CN | 108926239 A | 12/2018 |
| CN | 108926249 A | 12/2018 |
| CN | 108937520 A | 12/2018 |
| CN | 108937525 A | 12/2018 |
| CN | 108937556 A | 12/2018 |
| CN | 108937558 A | 12/2018 |
| CN | 108937559 A | 12/2018 |
| CN | 108937560 A | 12/2018 |
| CN | 108937629 A | 12/2018 |
| CN | 108955959 A | 12/2018 |
| CN | 108968659 A | 12/2018 |
| CN | 108968660 A | 12/2018 |
| CN | 108968662 A | 12/2018 |
| CN | 108968663 A | 12/2018 |
| CN | 108968667 A | 12/2018 |
| CN | 108968668 A | 12/2018 |
| CN | 108968669 A | 12/2018 |
| CN | 108991918 A | 12/2018 |
| CN | 108991919 A | 12/2018 |
| CN | 109008595 A | 12/2018 |
| CN | 109008597 A | 12/2018 |
| CN | 109008598 A | 12/2018 |
| CN | 109008663 A | 12/2018 |
| CN | 109008669 A | 12/2018 |
| CN | 109077624 A | 12/2018 |
| CN | 208192913 U | 12/2018 |
| CN | 208192914 U | 12/2018 |
| CN | 208192915 U | 12/2018 |
| CN | 208192916 U | 12/2018 |
| CN | 208192917 U | 12/2018 |
| CN | 208192920 U | 12/2018 |
| CN | 208192921 U | 12/2018 |
| CN | 208211922 U | 12/2018 |
| CN | 208228802 U | 12/2018 |
| CN | 208259529 U | 12/2018 |
| CN | 106562666 B | 1/2019 |
| CN | 106606293 B | 1/2019 |
| CN | 106724784 B | 1/2019 |
| CN | 106820956 B | 1/2019 |
| CN | 106820957 B | 1/2019 |
| CN | 107019417 B | 1/2019 |
| CN | 109106231 A | 1/2019 |
| CN | 109247837 A | 1/2019 |
| CN | 109276159 A | 1/2019 |
| CN | 208300842 U | 1/2019 |
| CN | 208319025 U | 1/2019 |
| CN | 208319027 U | 1/2019 |
| CN | 208371607 U | 1/2019 |
| CN | 208435215 U | 1/2019 |

(56) References Cited

FOREIGN PATENT DOCUMENTS

| | | |
|---|---|---|
| CN | 109363520 A | 2/2019 |
| CN | 208463763 U | 2/2019 |
| CN | 208510802 U | 2/2019 |
| CN | 106388566 B | 3/2019 |
| CN | 107174116 B | 3/2019 |
| CN | 107174117 B | 3/2019 |
| CN | 109393956 A | 3/2019 |
| CN | 109393957 A | 3/2019 |
| CN | 109393958 A | 3/2019 |
| CN | 109394005 A | 3/2019 |
| CN | 109419298 A | 3/2019 |
| CN | 109419319 A | 3/2019 |
| CN | 109419327 A | 3/2019 |
| CN | 109419328 A | 3/2019 |
| CN | 109419329 A | 3/2019 |
| CN | 109419330 A | 3/2019 |
| CN | 109419331 A | 3/2019 |
| CN | 109419332 A | 3/2019 |
| CN | 109419333 A | 3/2019 |
| CN | 109419334 A | 3/2019 |
| CN | 109419335 A | 3/2019 |
| CN | 109419336 A | 3/2019 |
| CN | 109427506 A | 3/2019 |
| CN | 109431233 A | 3/2019 |
| CN | 109431254 A | 3/2019 |
| CN | 109431255 A | 3/2019 |
| CN | 109431257 A | 3/2019 |
| CN | 109431258 A | 3/2019 |
| CN | 109452851 A | 3/2019 |
| CN | 109452852 A | 3/2019 |
| CN | 109452854 A | 3/2019 |
| CN | 109452857 A | 3/2019 |
| CN | 109452875 A | 3/2019 |
| CN | 109459181 A | 3/2019 |
| CN | 109463998 A | 3/2019 |
| CN | 109463999 A | 3/2019 |
| CN | 109464000 A | 3/2019 |
| CN | 109464001 A | 3/2019 |
| CN | 109480604 A | 3/2019 |
| CN | 109480605 A | 3/2019 |
| CN | 109480614 A | 3/2019 |
| CN | 109497826 A | 3/2019 |
| CN | 109497827 A | 3/2019 |
| CN | 109512275 A | 3/2019 |
| CN | 109512276 A | 3/2019 |
| CN | 109527982 A | 3/2019 |
| CN | 109527983 A | 3/2019 |
| CN | 208551168 U | 3/2019 |
| CN | 208551408 U | 3/2019 |
| CN | 208610644 U | 3/2019 |
| CN | 208610659 U | 3/2019 |
| CN | 208625445 U | 3/2019 |
| CN | 109549449 A | 4/2019 |
| CN | 109549466 A | 4/2019 |
| CN | 109549468 A | 4/2019 |
| CN | 109549469 A | 4/2019 |
| CN | 109549470 A | 4/2019 |
| CN | 109556147 A | 4/2019 |
| CN | 109567553 A | 4/2019 |
| CN | 109567575 A | 4/2019 |
| CN | 109567576 A | 4/2019 |
| CN | 109567577 A | 4/2019 |
| CN | 109567579 A | 4/2019 |
| CN | 109567582 A | 4/2019 |
| CN | 109567583 A | 4/2019 |
| CN | 109567610 A | 4/2019 |
| CN | 109567612 A | 4/2019 |
| CN | 109567619 A | 4/2019 |
| CN | 109588972 A | 4/2019 |
| CN | 109588973 A | 4/2019 |
| CN | 109589011 A | 4/2019 |
| CN | 109602265 A | 4/2019 |
| CN | 109602274 A | 4/2019 |
| CN | 109605463 A | 4/2019 |
| CN | 109619970 A | 4/2019 |
| CN | 109662607 A | 4/2019 |
| CN | 109674341 A | 4/2019 |
| CN | 109674342 A | 4/2019 |
| CN | 109674357 A | 4/2019 |
| CN | 109681927 A | 4/2019 |
| CN | 109691855 A | 4/2019 |
| CN | 109691858 A | 4/2019 |
| CN | 109691863 A | 4/2019 |
| CN | 109691875 A | 4/2019 |
| CN | 109691878 A | 4/2019 |
| CN | 109691880 A | 4/2019 |
| CN | 109691882 A | 4/2019 |
| CN | 109691905 A | 4/2019 |
| CN | 109694242 A | 4/2019 |
| CN | 109696196 A | 4/2019 |
| CN | 208709591 U | 4/2019 |
| CN | 208740748 U | 4/2019 |
| CN | 208755746 U | 4/2019 |
| CN | 208755752 U | 4/2019 |
| CN | 208755753 U | 4/2019 |
| CN | 208755759 U | 4/2019 |
| CN | 208784365 U | 4/2019 |
| CN | 109744849 A | 5/2019 |
| CN | 109793430 A | 5/2019 |
| CN | 109820432 A | 5/2019 |
| CN | 208808155 U | 5/2019 |
| CN | 208837695 U | 5/2019 |
| CN | 208851291 U | 5/2019 |
| CN | 208864113 U | 5/2019 |
| CN | 208909747 U | 5/2019 |
| CN | 208909882 U | 5/2019 |
| CN | 208909883 U | 5/2019 |
| CN | 105640308 A | 6/2019 |
| CN | 105996805 B | 6/2019 |
| CN | 109870938 A | 6/2019 |
| CN | 109875418 A | 6/2019 |
| CN | 109892967 A | 6/2019 |
| CN | 208941868 U | 6/2019 |
| CN | 208973499 U | 6/2019 |
| CN | 208973501 U | 6/2019 |
| CN | 208973502 U | 6/2019 |
| CN | 208973503 U | 6/2019 |
| CN | 208973504 U | 6/2019 |
| CN | 208973507 U | 6/2019 |
| CN | 208988575 U | 6/2019 |
| CN | 209003634 U | 6/2019 |
| CN | 109953636 A | 7/2019 |
| CN | 109953642 A | 7/2019 |
| CN | 109965667 A | 7/2019 |
| CN | 109965672 A | 7/2019 |
| CN | 109965682 A | 7/2019 |
| CN | 109965683 A | 7/2019 |
| CN | 109965684 A | 7/2019 |
| CN | 109965688 A | 7/2019 |
| CN | 109965689 A | 7/2019 |
| CN | 109965691 A | 7/2019 |
| CN | 109965692 A | 7/2019 |
| CN | 109965710 A | 7/2019 |
| CN | 109984561 A | 7/2019 |
| CN | 109984563 A | 7/2019 |
| CN | 109984574 A | 7/2019 |
| CN | 109984576 A | 7/2019 |
| CN | 109984577 A | 7/2019 |
| CN | 109984578 A | 7/2019 |
| CN | 109984580 A | 7/2019 |
| CN | 109984581 A | 7/2019 |
| CN | 109984582 A | 7/2019 |
| CN | 109984583 A | 7/2019 |
| CN | 109984585 A | 7/2019 |
| CN | 109984586 A | 7/2019 |
| CN | 109984587 A | 7/2019 |
| CN | 109984588 A | 7/2019 |
| CN | 109984589 A | 7/2019 |
| CN | 109984590 A | 7/2019 |
| CN | 109984591 A | 7/2019 |
| CN | 109984592 A | 7/2019 |
| CN | 109984594 A | 7/2019 |
| CN | 109984595 A | 7/2019 |
| CN | 109984623 A | 7/2019 |

(56) References Cited

FOREIGN PATENT DOCUMENTS

| | | | |
|---|---|---|---|
| CN | 109986453 A | 7/2019 |
| CN | 109996475 A | 7/2019 |
| CN | 109998370 A | 7/2019 |
| CN | 109998371 A | 7/2019 |
| CN | 109998385 A | 7/2019 |
| CN | 110013163 A | 7/2019 |
| CN | 110013181 A | 7/2019 |
| CN | 110025214 A | 7/2019 |
| CN | 110025215 A | 7/2019 |
| CN | 110037535 A | 7/2019 |
| CN | 110056916 A | 7/2019 |
| CN | 110063650 A | 7/2019 |
| CN | 110063671 A | 7/2019 |
| CN | 209058897 U | 7/2019 |
| CN | 209090836 U | 7/2019 |
| CN | 209090929 U | 7/2019 |
| CN | 209090938 U | 7/2019 |
| CN | 209090939 U | 7/2019 |
| CN | 209090943 U | 7/2019 |
| CN | 209090950 U | 7/2019 |
| CN | 209090955 U | 7/2019 |
| CN | 209090956 U | 7/2019 |
| CN | 209090957 U | 7/2019 |
| CN | 209136189 U | 7/2019 |
| CN | 209136190 U | 7/2019 |
| CN | 110074647 A | 8/2019 |
| CN | 110074685 A | 8/2019 |
| CN | 110074690 A | 8/2019 |
| CN | 110089931 A | 8/2019 |
| CN | 110089932 A | 8/2019 |
| CN | 110101301 A | 8/2019 |
| CN | 110101303 A | 8/2019 |
| CN | 110101304 A | 8/2019 |
| CN | 110101319 A | 8/2019 |
| CN | 110115500 A | 8/2019 |
| CN | 110123118 A | 8/2019 |
| CN | 110123132 A | 8/2019 |
| CN | 110123133 A | 8/2019 |
| CN | 110123134 A | 8/2019 |
| CN | 110123137 A | 8/2019 |
| CN | 110141104 A | 8/2019 |
| CN | 110141110 A | 8/2019 |
| CN | 110141111 A | 8/2019 |
| CN | 110141112 A | 8/2019 |
| CN | 110150957 A | 8/2019 |
| CN | 209202775 U | 8/2019 |
| CN | 209220022 U | 8/2019 |
| CN | 209252407 U | 8/2019 |
| CN | 209269447 U | 8/2019 |
| CN | 209285276 U | 8/2019 |
| CN | 209300780 U | 8/2019 |
| CN | 209315656 U | 8/2019 |
| CN | 209315657 U | 8/2019 |
| CN | 110192764 A | 9/2019 |
| CN | 110192765 A | 9/2019 |
| CN | 110192766 A | 9/2019 |
| CN | 110192767 A | 9/2019 |
| CN | 110192768 A | 9/2019 |
| CN | 110200471 A | 9/2019 |
| CN | 110200472 A | 9/2019 |
| CN | 110200493 A | 9/2019 |
| CN | 110200494 A | 9/2019 |
| CN | 110200495 A | 9/2019 |
| CN | 110200516 A | 9/2019 |
| CN | 110213984 A | 9/2019 |
| CN | 110236363 A | 9/2019 |
| CN | 110236364 A | 9/2019 |
| CN | 110236379 A | 9/2019 |
| CN | 110250904 A | 9/2019 |
| CN | 110250905 A | 9/2019 |
| CN | 110250920 A | 9/2019 |
| CN | 110269506 A | 9/2019 |
| CN | 110269507 A | 9/2019 |
| CN | 110269508 A | 9/2019 |
| CN | 110279291 A | 9/2019 |
| CN | 110279292 A | 9/2019 |
| CN | 110279308 A | 9/2019 |
| CN | 110279317 A | 9/2019 |
| CN | 209360444 U | 9/2019 |
| CN | 209360464 U | 9/2019 |
| CN | 209436923 U | 9/2019 |
| CN | 209436924 U | 9/2019 |
| CN | 209436925 U | 9/2019 |
| CN | 209436942 U | 9/2019 |
| CN | 209437002 U | 9/2019 |
| CN | 110292303 A | 10/2019 |
| CN | 110292304 A | 10/2019 |
| CN | 110301814 A | 10/2019 |
| CN | 110301815 A | 10/2019 |
| CN | 110313805 A | 10/2019 |
| CN | 110313810 A | 10/2019 |
| CN | 110313811 A | 10/2019 |
| CN | 110313812 A | 10/2019 |
| CN | 110313813 A | 10/2019 |
| CN | 110313814 A | 10/2019 |
| CN | 110313816 A | 10/2019 |
| CN | 110313817 A | 10/2019 |
| CN | 110313818 A | 10/2019 |
| CN | 110313819 A | 10/2019 |
| CN | 110326958 A | 10/2019 |
| CN | 110338639 A | 10/2019 |
| CN | 110338647 A | 10/2019 |
| CN | 110353467 A | 10/2019 |
| CN | 110353469 A | 10/2019 |
| CN | 110353497 A | 10/2019 |
| CN | 110367838 A | 10/2019 |
| CN | 110384387 A | 10/2019 |
| CN | 110384389 A | 10/2019 |
| CN | 209450331 U | 10/2019 |
| CN | 209518760 U | 10/2019 |
| CN | 209518767 U | 10/2019 |
| CN | 209528876 U | 10/2019 |
| CN | 209547775 U | 10/2019 |
| CN | 110393437 A | 11/2019 |
| CN | 110403454 A | 11/2019 |
| CN | 110403455 A | 11/2019 |
| CN | 110403457 A | 11/2019 |
| CN | 110403458 A | 11/2019 |
| CN | 110419942 A | 11/2019 |
| CN | 110419943 A | 11/2019 |
| CN | 110430793 A | 11/2019 |
| CN | 110432763 A | 11/2019 |
| CN | 110432764 A | 11/2019 |
| CN | 110432765 A | 11/2019 |
| CN | 110448164 A | 11/2019 |
| CN | 110448165 A | 11/2019 |
| CN | 110448189 A | 11/2019 |
| CN | 110464199 A | 11/2019 |
| CN | 110464200 A | 11/2019 |
| CN | 110464212 A | 11/2019 |
| CN | 110475493 A | 11/2019 |
| CN | 110477742 A | 11/2019 |
| CN | 110477743 A | 11/2019 |
| CN | 110477762 A | 11/2019 |
| CN | 110477764 A | 11/2019 |
| CN | 110495774 A | 11/2019 |
| CN | 110507152 A | 11/2019 |
| CN | 110507166 A | 11/2019 |
| CN | 110507168 A | 11/2019 |
| CN | 110507170 A | 11/2019 |
| CN | 110507171 A | 11/2019 |
| CN | 110507176 A | 11/2019 |
| CN | 110507181 A | 11/2019 |
| CN | 110507198 A | 11/2019 |
| CN | 110507199 A | 11/2019 |
| CN | 110520022 A | 11/2019 |
| CN | 209564018 U | 11/2019 |
| CN | 209610822 U | 11/2019 |
| CN | 209610824 U | 11/2019 |
| CN | 209610827 U | 11/2019 |
| CN | 209629508 U | 11/2019 |
| CN | 209644658 U | 11/2019 |
| CN | 110522315 A | 12/2019 |
| CN | 110537836 A | 12/2019 |

(56) References Cited

FOREIGN PATENT DOCUMENTS

| | | | |
|---|---|---|---|
| CN | 110537849 A | 12/2019 |
| CN | 110547657 A | 12/2019 |
| CN | 110547674 A | 12/2019 |
| CN | 110547675 A | 12/2019 |
| CN | 110547694 A | 12/2019 |
| CN | 110558827 A | 12/2019 |
| CN | 110558832 A | 12/2019 |
| CN | 110558858 A | 12/2019 |
| CN | 110558861 A | 12/2019 |
| CN | 110575049 A | 12/2019 |
| CN | 110575062 A | 12/2019 |
| CN | 110575077 A | 12/2019 |
| CN | 110575083 A | 12/2019 |
| CN | 110584329 A | 12/2019 |
| CN | 110584470 A | 12/2019 |
| CN | 110584472 A | 12/2019 |
| CN | 110604465 A | 12/2019 |
| CN | 110604469 A | 12/2019 |
| CN | 110613306 A | 12/2019 |
| CN | 110613311 A | 12/2019 |
| CN | 110613316 A | 12/2019 |
| CN | 110613323 A | 12/2019 |
| CN | 110613324 A | 12/2019 |
| CN | 110613326 A | 12/2019 |
| CN | 110613327 A | 12/2019 |
| CN | 110613329 A | 12/2019 |
| CN | 110613331 A | 12/2019 |
| CN | 110613365 A | 12/2019 |
| CN | 110613366 A | 12/2019 |
| CN | 110623519 A | 12/2019 |
| CN | 110623533 A | 12/2019 |
| CN | 110623534 A | 12/2019 |
| CN | 110623535 A | 12/2019 |
| CN | 110623551 A | 12/2019 |
| CN | 110623572 A | 12/2019 |
| CN | 209733609 U | 12/2019 |
| CN | 209750794 U | 12/2019 |
| CN | 209770158 U | 12/2019 |
| CN | 209826266 U | 12/2019 |
| CN | 209826275 U | 12/2019 |
| CN | 209863297 U | 12/2019 |
| CN | 209863352 U | 12/2019 |
| CN | 209863353 U | 12/2019 |
| CN | 209863354 U | 12/2019 |
| CN | 209863355 U | 12/2019 |
| CN | 209863450 U | 12/2019 |
| CN | 110638322 A | 1/2020 |
| CN | 110652172 A | 1/2020 |
| CN | 110652188 A | 1/2020 |
| CN | 110652191 A | 1/2020 |
| CN | 110652192 A | 1/2020 |
| CN | 110652193 A | 1/2020 |
| CN | 110652196 A | 1/2020 |
| CN | 110652197 A | 1/2020 |
| CN | 110652211 A | 1/2020 |
| CN | 110652217 A | 1/2020 |
| CN | 110663725 A | 1/2020 |
| CN | 110664235 A | 1/2020 |
| CN | 110664236 A | 1/2020 |
| CN | 110664237 A | 1/2020 |
| CN | 110664239 A | 1/2020 |
| CN | 110680203 A | 1/2020 |
| CN | 110680206 A | 1/2020 |
| CN | 110693316 A | 1/2020 |
| CN | 110710864 A | 1/2020 |
| CN | 110710892 A | 1/2020 |
| CN | 110720826 A | 1/2020 |
| CN | 209995969 U | 1/2020 |
| CN | 107773030 B | 2/2020 |
| CN | 110742492 A | 2/2020 |
| CN | 110742500 A | 2/2020 |
| CN | 110754924 A | 2/2020 |
| CN | 110754925 A | 2/2020 |
| CN | 110754926 A | 2/2020 |
| CN | 110754927 A | 2/2020 |
| CN | 110754929 A | 2/2020 |
| CN | 110754930 A | 2/2020 |
| CN | 110754931 A | 2/2020 |
| CN | 110754932 A | 2/2020 |
| CN | 110754933 A | 2/2020 |
| CN | 110772114 A | 2/2020 |
| CN | 110772115 A | 2/2020 |
| CN | 110772125 A | 2/2020 |
| CN | 110786730 A | 2/2020 |
| CN | 110786731 A | 2/2020 |
| CN | 110786732 A | 2/2020 |
| CN | 110786733 A | 2/2020 |
| CN | 110786749 A | 2/2020 |
| CN | 110801144 A | 2/2020 |
| CN | 110801145 A | 2/2020 |
| CN | 110801148 A | 2/2020 |
| CN | 110801149 A | 2/2020 |
| CN | 110801150 A | 2/2020 |
| CN | 110811282 A | 2/2020 |
| CN | 110811294 A | 2/2020 |
| CN | 110811295 A | 2/2020 |
| CN | 110811313 A | 2/2020 |
| CN | 110811315 A | 2/2020 |
| CN | 110811316 A | 2/2020 |
| CN | 110811318 A | 2/2020 |
| CN | 110811343 A | 2/2020 |
| CN | 110833316 A | 2/2020 |
| CN | 110840216 A | 2/2020 |
| CN | 110840237 A | 2/2020 |
| CN | 110840238 A | 2/2020 |
| CN | 110840239 A | 2/2020 |
| CN | 110840240 A | 2/2020 |
| CN | 110840241 A | 2/2020 |
| CN | 110840242 A | 2/2020 |
| CN | 110840243 A | 2/2020 |
| CN | 110840245 A | 2/2020 |
| CN | 110840269 A | 2/2020 |
| CN | 110868894 A | 3/2020 |
| CN | 110876559 A | 3/2020 |
| CN | 110876567 A | 3/2020 |
| CN | 210124638 U | 3/2020 |
| CN | 210169803 U | 3/2020 |
| CN | 210185391 U | 3/2020 |
| CN | 110960112 A | 4/2020 |
| CN | 111000430 A | 4/2020 |
| CN | 111012203 A | 4/2020 |
| CN | 111053458 A | 4/2020 |
| CN | 210227842 U | 4/2020 |
| CN | 210227855 U | 4/2020 |
| CN | 210276928 U | 4/2020 |
| CN | 210300635 U | 4/2020 |
| CN | 210300732 U | 4/2020 |
| CN | 210300733 U | 4/2020 |
| CN | 210383667 U | 4/2020 |
| CN | 210408053 U | 4/2020 |
| CN | 210408158 U | 4/2020 |
| CN | 111184453 A | 5/2020 |
| CN | 210433346 U | 5/2020 |
| CN | 210493785 U | 5/2020 |
| CN | 210493795 U | 5/2020 |
| CN | 210540823 U | 5/2020 |
| CN | 210540971 U | 5/2020 |
| CN | 210540972 U | 5/2020 |
| CN | 210540973 U | 5/2020 |
| CN | 210540974 U | 5/2020 |
| CN | 210540981 U | 5/2020 |
| CN | 210582243 U | 5/2020 |
| CN | 111214101 A | 6/2020 |
| CN | 111214102 A | 6/2020 |
| CN | 111214131 A | 6/2020 |
| CN | 111227668 A | 6/2020 |
| CN | 111227671 A | 6/2020 |
| CN | 111248768 A | 6/2020 |
| CN | 111248771 A | 6/2020 |
| CN | 111297215 A | 6/2020 |
| CN | 111317357 A | 6/2020 |
| CN | 210673100 U | 6/2020 |
| CN | 210697273 U | 6/2020 |
| CN | 210697274 U | 6/2020 |

(56) References Cited

FOREIGN PATENT DOCUMENTS

| | | |
|---|---|---|
| CN | 210727514 U | 6/2020 |
| CN | 210810486 U | 6/2020 |
| CN | 210810617 U | 6/2020 |
| CN | 210871141 U | 6/2020 |
| CN | 111358308 A | 7/2020 |
| CN | 111374527 A | 7/2020 |
| CN | 111381503 A | 7/2020 |
| CN | 111387837 A | 7/2020 |
| CN | 111387840 A | 7/2020 |
| CN | 111449536 A | 7/2020 |
| CN | 210961428 U | 7/2020 |
| CN | 210961465 U | 7/2020 |
| CN | 210961472 U | 7/2020 |
| CN | 210961552 U | 7/2020 |
| CN | 210961553 U | 7/2020 |
| CN | 210989805 U | 7/2020 |
| CN | 111543865 A | 8/2020 |
| CN | 211186926 U | 8/2020 |
| CN | 211212725 U | 8/2020 |
| CN | 211212750 U | 8/2020 |
| CN | 211242957 U | 8/2020 |
| CN | 211242962 U | 8/2020 |
| CN | 211269978 U | 8/2020 |
| CN | 211270194 U | 8/2020 |
| CN | 211324483 U | 8/2020 |
| CN | 211432279 U | 9/2020 |
| CN | 211432426 U | 9/2020 |
| CN | 211432435 U | 9/2020 |
| CN | 211559722 U | 9/2020 |
| CN | 211559785 U | 9/2020 |
| CN | 211582730 U | 9/2020 |
| CN | 111772499 A | 10/2020 |
| CN | 211609338 U | 10/2020 |
| CN | 211609340 U | 10/2020 |
| CN | 211609354 U | 10/2020 |
| DE | 2705168 A1 | 8/1978 |
| DE | 2753827 A1 | 6/1979 |
| DE | 102011002821 A1 | 7/2012 |
| DE | 202017102536 U1 | 8/2018 |
| EP | 1767860 A1 | 3/2007 |
| EP | 2003400 A2 | 12/2008 |
| EP | 2020574 A2 | 2/2009 |
| EP | 2910856 A1 | 8/2015 |
| EP | 2961278 A1 | 1/2016 |
| EP | 2976977 A1 | 1/2016 |
| EP | 3033978 B1 | 11/2016 |
| EP | 3165134 A1 | 5/2017 |
| EP | 2904953 B1 | 12/2018 |
| EP | 3491980 A1 | 6/2019 |
| EP | 3756515 A1 | 12/2020 |
| FR | 2409736 A1 | 6/1979 |
| GB | 2398628 A | 8/2004 |
| GB | 2479384 A | 10/2011 |
| JP | S5827524 A | 2/1983 |
| JP | H02232014 A | 9/1990 |
| JP | H09164074 A | 6/1997 |
| JP | 10028643 A | 2/1998 |
| JP | 2005147604 A | 6/2005 |
| JP | 2007007027 A | 1/2007 |
| JP | 2007222289 A | 9/2007 |
| JP | 2008018122 A | 1/2008 |
| JP | 2009291417 | 12/2009 |
| JP | 2011010786 A | 1/2011 |
| JP | 2013106850 A | 6/2013 |
| JP | 2014200627 A | 10/2014 |
| JP | 2014204770 A | 10/2014 |
| JP | 2015145778 A | 8/2015 |
| KR | 102109966 B1 | 5/2020 |
| WO | 8911773 A1 | 11/1989 |
| WO | 9837796 A1 | 9/1998 |
| WO | 9930086 | 6/1999 |
| WO | 9952328 A1 | 10/1999 |
| WO | 0044096 | 7/2000 |
| WO | 0049839 A1 | 8/2000 |
| WO | 2006122643 A1 | 11/2006 |
| WO | 2006132612 A1 | 12/2006 |
| WO | 2009043812 A1 | 4/2009 |
| WO | 2010034338 A1 | 4/2010 |
| WO | 2010034374 | 4/2010 |
| WO | 2012051508 A2 | 4/2012 |
| WO | 2015006891 A1 | 1/2015 |
| WO | 2015028940 A1 | 3/2015 |
| WO | 2015062197 A1 | 5/2015 |
| WO | 2015081549 A1 | 6/2015 |
| WO | 2016007002 A1 | 1/2016 |
| WO | 2016012908 A1 | 1/2016 |
| WO | 2016028549 A1 | 2/2016 |
| WO | 2016091063 A1 | 6/2016 |
| WO | 2016141009 A1 | 9/2016 |
| WO | 2016148492 A1 | 9/2016 |
| WO | 2016154114 A1 | 9/2016 |
| WO | 2016165198 A1 | 10/2016 |
| WO | 2016171385 A1 | 10/2016 |
| WO | 2016182975 A1 | 11/2016 |
| WO | 2016189440 | 12/2016 |
| WO | 2016193008 A1 | 12/2016 |
| WO | 2016193643 A1 | 12/2016 |
| WO | 2016199086 A1 | 12/2016 |
| WO | 2017005533 A1 | 1/2017 |
| WO | 2017039091 A1 | 3/2017 |
| WO | 2017045387 A1 | 3/2017 |
| WO | 2017049635 A1 | 3/2017 |
| WO | 2017049717 A1 | 3/2017 |
| WO | 2017050693 A2 | 3/2017 |
| WO | 2017063872 A1 | 4/2017 |
| WO | 2017072068 A1 | 5/2017 |
| WO | 2017074119 A1 | 5/2017 |
| WO | 2017076797 A1 | 5/2017 |
| WO | 2017081420 A1 | 5/2017 |
| WO | 2017085026 A1 | 5/2017 |
| WO | 2017085671 A1 | 5/2017 |
| WO | 2017085673 A1 | 5/2017 |
| WO | 2017086543 A1 | 5/2017 |
| WO | 2017092062 A1 | 6/2017 |
| WO | 2017092063 A1 | 6/2017 |
| WO | 2017094968 A1 | 6/2017 |
| WO | 2017097790 A1 | 6/2017 |
| WO | 2017104892 A1 | 6/2017 |
| WO | 2017104894 A1 | 6/2017 |
| WO | 2017104895 A1 | 6/2017 |
| WO | 2017104896 A1 | 6/2017 |
| WO | 2017104898 A1 | 6/2017 |
| WO | 2017104900 A1 | 6/2017 |
| WO | 2017105076 A2 | 6/2017 |
| WO | 2017111425 A1 | 6/2017 |
| WO | 2017121691 A1 | 7/2017 |
| WO | 2017127655 A1 | 7/2017 |
| WO | 2017144795 A1 | 8/2017 |
| WO | 2017149519 A1 | 9/2017 |
| WO | 2017152518 A1 | 9/2017 |
| WO | 2017153360 A1 | 9/2017 |
| WO | 2017158068 A1 | 9/2017 |
| WO | 2017166317 A1 | 10/2017 |
| WO | 2017177007 A1 | 10/2017 |
| WO | 2017177423 A1 | 10/2017 |
| WO | 2017178229 A1 | 10/2017 |
| WO | 2017178650 A1 | 10/2017 |
| WO | 2017178739 A1 | 10/2017 |
| WO | 2017179804 A1 | 10/2017 |
| WO | 2017191377 A1 | 11/2017 |
| WO | 2017191395 A1 | 11/2017 |
| WO | 2017195777 A1 | 11/2017 |
| WO | 2017197482 A1 | 11/2017 |
| WO | 2017198815 A1 | 11/2017 |
| WO | 2017198848 A1 | 11/2017 |
| WO | 2017201530 A1 | 11/2017 |
| WO | 2017202641 A1 | 11/2017 |
| WO | 2017209465 A1 | 12/2017 |
| WO | 2017211045 A1 | 12/2017 |
| WO | 2017213330 A2 | 12/2017 |
| WO | 2017213423 A1 | 12/2017 |
| WO | 2017215926 A1 | 12/2017 |
| WO | 2017215988 A1 | 12/2017 |
| WO | 2018004226 A1 | 1/2018 |

(56) References Cited

FOREIGN PATENT DOCUMENTS

| | | |
|---|---|---|
| WO | 2018007218 A1 | 1/2018 |
| WO | 2018014806 A1 | 1/2018 |
| WO | 2018015695 A1 | 1/2018 |
| WO | 2017077571 A1 | 2/2018 |
| WO | 2018018670 A1 | 2/2018 |
| WO | 2018023863 A1 | 2/2018 |
| WO | 2018024781 A1 | 2/2018 |
| WO | 2018024782 A1 | 2/2018 |
| WO | 2018024783 A1 | 2/2018 |
| WO | 2018026041 A1 | 2/2018 |
| WO | 2018026906 A1 | 2/2018 |
| WO | 2018026928 A1 | 2/2018 |
| WO | 2018032540 A1 | 2/2018 |
| WO | 2018032541 A1 | 2/2018 |
| WO | 2018032542 A1 | 2/2018 |
| WO | 2018032589 A1 | 2/2018 |
| WO | 2018032648 A1 | 2/2018 |
| WO | 2018037177 A1 | 3/2018 |
| WO | 2018040250 A1 | 3/2018 |
| WO | 2018041536 A1 | 3/2018 |
| WO | 2018045643 A1 | 3/2018 |
| WO | 2018050520 A1 | 3/2018 |
| WO | 2018050838 A1 | 3/2018 |
| WO | 2018058384 A1 | 4/2018 |
| WO | 2018058569 A1 | 4/2018 |
| WO | 2018058740 A1 | 4/2018 |
| WO | 2018059994 A1 | 4/2018 |
| WO | 2018060260 A1 | 4/2018 |
| WO | 2018060273 A1 | 4/2018 |
| WO | 2018060331 A1 | 4/2018 |
| WO | 2018065424 A1 | 4/2018 |
| WO | 2018068376 A1 | 4/2018 |
| WO | 2018068425 A1 | 4/2018 |
| WO | 2018068976 A1 | 4/2018 |
| WO | 2018076164 A1 | 5/2018 |
| WO | 2018076166 A1 | 5/2018 |
| WO | 2018076415 A1 | 5/2018 |
| WO | 2018082131 A1 | 5/2018 |
| WO | 2018090287 A1 | 5/2018 |
| WO | 2018093004 A1 | 5/2018 |
| WO | 2018095247 A1 | 5/2018 |
| WO | 2018095420 A1 | 5/2018 |
| WO | 2018095949 A1 | 5/2018 |
| WO | 2018120561 A1 | 5/2018 |
| WO | 2017104893 A1 | 6/2018 |
| WO | 2018099233 A1 | 6/2018 |
| WO | 2018102128 A1 | 6/2018 |
| WO | 2018104351 A1 | 6/2018 |
| WO | 2018107522 A1 | 6/2018 |
| WO | 2018107973 A1 | 6/2018 |
| WO | 2018116056 A1 | 6/2018 |
| WO | 2018116057 A1 | 6/2018 |
| WO | 2018121166 A1 | 7/2018 |
| WO | 2018121199 A1 | 7/2018 |
| WO | 2018133993 A1 | 7/2018 |
| WO | 2018137832 A1 | 8/2018 |
| WO | 2018138078 A1 | 8/2018 |
| WO | 2018140954 A1 | 8/2018 |
| WO | 2018142088 A1 | 8/2018 |
| WO | 2018146872 A1 | 8/2018 |
| WO | 2018147640 A1 | 8/2018 |
| WO | 2018157409 A1 | 9/2018 |
| WO | 2018161497 A1 | 9/2018 |
| WO | 2018165698 A1 | 9/2018 |
| WO | 2018171250 A1 | 9/2018 |
| WO | 2018189921 A1 | 10/2018 |
| WO | 2018191960 A1 | 10/2018 |
| WO | 2018197720 A1 | 11/2018 |
| WO | 2018207221 A1 | 11/2018 |
| WO | 2018212473 A1 | 11/2018 |
| WO | 2018216042 A1 | 11/2018 |
| WO | 2018220659 A1 | 12/2018 |
| WO | 2018223713 A1 | 12/2018 |
| WO | 2018227851 A1 | 12/2018 |
| WO | 2018227852 A1 | 12/2018 |
| WO | 2018227866 A1 | 12/2018 |
| WO | 2018227938 A1 | 12/2018 |
| WO | 2018233210 A1 | 12/2018 |
| WO | 2018235095 A1 | 12/2018 |
| WO | 2019015425 A1 | 1/2019 |
| WO | 2019026018 A1 | 2/2019 |
| WO | 2019032876 A1 | 2/2019 |
| WO | 2019032878 A1 | 2/2019 |
| WO | 2019061758 A1 | 4/2019 |
| WO | 2019064319 A1 | 4/2019 |
| WO | 2019066747 A1 | 4/2019 |
| WO | 2019071975 A1 | 4/2019 |
| WO | 2019080672 A1 | 5/2019 |
| WO | 2019081824 A1 | 5/2019 |
| WO | 2019081825 A1 | 5/2019 |
| WO | 2019082210 A1 | 5/2019 |
| WO | 2019085602 A1 | 5/2019 |
| WO | 2019086393 A1 | 5/2019 |
| WO | 2019091169 A1 | 5/2019 |
| WO | 2019097545 A1 | 5/2019 |
| WO | 2019104818 A1 | 6/2019 |
| WO | 2019110340 A1 | 6/2019 |
| WO | 2019111179 A1 | 6/2019 |
| WO | 2019114890 A1 | 6/2019 |
| WO | 2019128111 A1 | 7/2019 |
| WO | 2019129598 A1 | 7/2019 |
| WO | 2019130011 A1 | 7/2019 |
| WO | 2019132150 A1 | 7/2019 |
| WO | 2019136785 A1 | 7/2019 |
| WO | 2019141207 A1 | 7/2019 |
| WO | 2019141321 A1 | 7/2019 |
| WO | 2019149573 A1 | 8/2019 |
| WO | 2019153512 A1 | 8/2019 |
| WO | 2019153807 A1 | 8/2019 |
| WO | 2019183755 A1 | 10/2019 |
| WO | 2019184188 A1 | 10/2019 |
| WO | 2019185321 A1 | 10/2019 |
| WO | 2019201084 A1 | 10/2019 |
| WO | 2019207325 A1 | 10/2019 |
| WO | 2019219018 A1 | 11/2019 |
| WO | 2019227766 A1 | 12/2019 |
| WO | 2019227843 A1 | 12/2019 |
| WO | 2019229763 A1 | 12/2019 |
| WO | 2019233018 A1 | 12/2019 |
| WO | 2019237478 A1 | 12/2019 |
| WO | 2019237483 A1 | 12/2019 |
| WO | 2019237631 A1 | 12/2019 |
| WO | 2019238605 A1 | 12/2019 |
| WO | 2019238794 A1 | 12/2019 |
| WO | 2019243093 A1 | 12/2019 |
| WO | 2019243922 A1 | 12/2019 |
| WO | 2020000046 A1 | 1/2020 |
| WO | 2020000052 A1 | 1/2020 |
| WO | 2020002064 A1 | 1/2020 |
| WO | 2020010513 A1 | 1/2020 |
| WO | 2020016084 A1 | 1/2020 |
| WO | 2020016085 A1 | 1/2020 |
| WO | 2020029519 A1 | 2/2020 |
| WO | 2020029520 A1 | 2/2020 |
| WO | 2020029695 A1 | 2/2020 |
| WO | 2020030462 A1 | 2/2020 |
| WO | 2020034764 A1 | 2/2020 |
| WO | 2020034798 A1 | 2/2020 |
| WO | 2020037914 A1 | 2/2020 |
| WO | 2020038209 A1 | 2/2020 |
| WO | 2020042466 A1 | 3/2020 |
| WO | 2020052010 A1 | 3/2020 |
| WO | 2020062650 A1 | 4/2020 |
| WO | 2020062651 A1 | 4/2020 |
| WO | 2020070198 A1 | 4/2020 |
| WO | 2020071590 A1 | 4/2020 |
| WO | 2020073522 A1 | 4/2020 |
| WO | 2020074178 A1 | 4/2020 |
| WO | 2020074476 A1 | 4/2020 |
| WO | 2020078010 A1 | 4/2020 |
| WO | 2020078403 A1 | 4/2020 |
| WO | 2020078836 A1 | 4/2020 |
| WO | 2020080738 A1 | 4/2020 |
| WO | 2020082329 A1 | 4/2020 |

(56) References Cited

FOREIGN PATENT DOCUMENTS

| | | | |
|---|---|---|---|
| WO | 2020082854 A1 | 4/2020 | |
| WO | 2020087714 A1 | 5/2020 | |
| WO | 2020091531 A1 | 5/2020 | |
| WO | 2020093417 A1 | 5/2020 | |
| WO | 2020094293 A1 | 5/2020 | |
| WO | 2020098748 A1 | 5/2020 | |
| WO | 2020098749 A1 | 5/2020 | |
| WO | 2020099339 A1 | 5/2020 | |
| WO | 2020099355 A1 | 5/2020 | |
| WO | 2020108375 A1 | 6/2020 | |
| WO | 2020108917 A1 | 6/2020 | |
| WO | 2020127334 A1 | 6/2020 | |
| WO | 2020134318 A1 | 7/2020 | |
| WO | 2020148164 A1 | 7/2020 | |
| WO | 2020148187 A1 | 7/2020 | |
| WO | 2020163711 A1 | 8/2020 | |
| WO | 2020177323 A1 | 9/2020 | |
| WO | 2020184785 A1 | 9/2020 | |

OTHER PUBLICATIONS

Webster Definition, "unbiased" (Year: 2022).*
Chinese Application No. 201910557420.2 filed Aug. 9, 2018; Office Action with English translation dated Feb. 21, 2020; pp. 1-21.
Chinese Application No. 2019105630895 filed Aug. 9, 2018; Office Action with English translation dated Feb. 3, 2020; pp. 1-13.
Chinese Application No. 2019105637856 filed Feb. 8, 2019; Office Action with English translation dated Dec. 3, 2019; pp. 1-11.
Civil Action No. 19-cv-24114, U.S. District Court, Southern District of Florida; Complaint; Plaintiff *SharkNInja Operating LLC* for Compaint for Patent Infringement and Demand for Jury Trial against Defendants *Tristar Products, Inc. and Emeril Lagasse* (Entered: Oct. 4, 2019) pp. 1-194.
Civil Action No. 19-cv-24114, U.S. District Court, Southern District of Florida; Defendant Emeril Lagasse's Motion to Dismiss for Improper Venue; *SharkNinja OPerating LLC* (Plaintiff) v. *Tristart Products, Inc. and Emeril Lagasse* (Defendants); Document 24 (Entered: Nov. 29, 2019) pp. 1-6.
Civil Action No. 19-cv-24114, U.S. District Court, Southern District of Florida; Defendant Tristar Products Inc.'s Answer to Plaintiff's Complaint and Counterclaims; *SharkNinja Operating LLC* (Plaintiff) v *Emeril Lagasse* (Defandant) *and Tristar Products, Inc.* (Defendant/Counterclaim Plaintiff) v *SharkNinja OPerating LLC, Daniel R. Gibson, Cantor Colburn LLP, Pedro Lopez-Baldrich* (Counterclaim Defendants); Document 25 (Entered: Nov. 29, 2019) pp. 1-36.
First Office Action with English Translation; Chinese Application No. 201910562983.0; Action issued Jan. 2, 2020; pp. 1-17.
Hip Cooking, [online]; [retrieved on Nov. 25, 2019]; retrieved from the Internethttps://www.hippressurecooking.com/pressure-cooker-psi-faq-the-stuff-you-didnt-think-to-ask/Laura Pazzaglia, "Pressure Cooker PSI FAQ: The Stuff You Didn't Think to Ask about Pressure," Hip Cooking, Apr. 7, 2013, pp. 1-26.
International Preliminary Report on Patentability for International Application No. PCT/US18/046077, Mailed Feb. 20, 2020, 14 pages.
International Preliminary Report on Patentability for International Application No. PCT/US2018/046079, Mailed Feb. 20, 2020, 11 pages.
U.S. Appl. No. 16/059,876, filed Aug. 9, 2018; Third Party Submission Under 37 CFR 1.290 dated Feb. 20, 2020; 15 pages.
U.S. Appl. No. 16/548,562, filed Aug. 22, 2019; Third Party Submission Under 37 CFR 1.290 dated Feb. 19, 2020; 15 pages.
U.S. Appl. No. 16/357,270, filed Mar. 18, 2019; Final Office Action mailed Dec. 2, 2019; pp. 1-20.
U.S. Appl. No. 16/357,141, filed Mar. 18, 2019; Non-Final Office Action dated Jan. 28, 2020; 22 pages.
U.S. Appl. No. 16/357,238, filed Mar. 18, 2019; Non-Final Office Action dated Feb. 26, 2020; 26 pages.
U.S. Appl. No. 16/357,280, filed Mar. 18, 2019; Non-Final Office Action dated Feb. 4, 2020; pp. 1-9.
U.S. Appl. No. 16/402,029, filed May 2, 2019; Final Office Action mailed Dec. 31, 2019; pp. 1-6.
U.S. Appl. No. 16/402,023, filed May 2, 2019; Non-Final Office Action dated Feb. 27, 2020; 25 pages.
U.S. Appl. No. 16/671,709, filed Nov. 1, 2019; Non-Final Office Action dated Jan. 8, 2020; pp. 1-5.
U.S. Appl. No. 16/671,972, filed Nov. 1, 2019; Non-Final Office Action dated Dec. 18, 2019; pp. 1-5.
U.S. Appl. No. 16/357,223, filed Mar. 18, 2019; Final Office Action dated Oct. 3, 2019; 1-7 pages.
U.S. Appl. No. 16/559,174, filed Sep. 3, 2019; Non-Final Office Action dated Oct. 11, 2019; 1-10 pages.
U.S. Appl. No. 16/357,141, filed Mar. 18, 2019; Final Office Action dated Aug. 30, 2019; 20 pages.
U.S. Appl. No. 16/357,250, filed Mar. 18, 2019; Final Office Action dated Sep. 13, 2019; 1-14 pages.
U.S. Appl. No. 16/357,280, filed Mar. 18, 2019; Final Office Action dated Sep. 13, 2019; 1-11 pages.
U.S. Appl. No. 16/357,175, filed Mar. 18, 2019; Final Office Action dated Sep. 30, 2019; 1-17 pages.
U.S. Appl. No. 16/357,194, filed Mar. 18, 2019; Final Office Action dated Sep. 30, 2019; 1-17 pages.
U.S. Appl. No. 16/357,238, filed Mar. 18, 2019; Final Office Action dated Oct. 8, 2019; 1-13 pages.
U.S. Appl. No. 16/357,243, filed Mar. 18, 2019; Notice of Allowance dated Oct. 15, 2019; pp. 1-9.
U.S. Appl. No. 16/402,023, filed May 2, 2019; Final Office Action dated Oct. 28, 2019; 1-27 pages.
U.S. Appl. No. 16/548,562, filed Aug. 22, 2019; Non-Final Office Action dated Oct. 25, 2019; 1-20 pages.
Anthony et al.; Cooking Device and Components Thereof; U.S. Appl. No. 16/402,023; filed May 2, 2019.
Anthony et al.; Cooking Device and Components Thereof; U.S. Appl. No. 16/402,029, filed May 2, 2019.
Anthony et al.; Cooking Device and Components Thereof; U.S. Appl. No. 16/402,035, filed May 2, 2019.
WO2018122652A1; Jul. 5, 2018; English Abstract Only (3 Pages).
Deng et al.; Design U.S. Appl. No. 29/659,577; Filing Date: Aug. 9, 2018; Food Preparation Device, User Interface, and Parts Thereof.
Gill et al.; U.S. Appl. No. 16/059,874; Filing Date: Aug. 9, 2018; Cooking Device and Components Thereof.
Gill et al.; U.S. Appl. No. 16/059,876; Filing Date: Aug. 9, 2018; Cooking Device and Components Thereof.
Gill et al.; Design U.S. Appl. No. 29/653,847; Filing Date: Jun. 19, 2018; Air Diffuser and Air Diffuser With Food Preparation Pot.
Gill et al.; Design U.S. Appl. No. 29/659,576; Filing Date: Aug. 9, 2018; Cooking Basket.
Gill et al.; Design U.S. Appl. No. 29/659,578; Filing Date: Aug. 9, 2018; Reversible Cooking Rack.
Notification of Transmittal of the International Search Report of the International Searching Authority, or the Declaration. PCT/US2018/046077, Mailed Dec. 19, 2018, 7 pages.
Notification of Transmittal of the International Search Report of the International Searching Authority, or the Declaration; PCT/US2018/046079; Jan. 2, 2019, 7 pages.
Notification of Transmittal of the Written Opinion of the International Searching Authority, or the Declaration. PCT/US2018/046077, Mailed Dec. 19, 2018, 10 pages.
Notification of Transmittal of the Written Opinion of the International Searching Authority, or the Declaration; PCT/US2018/046079; Jan. 2, 2019, 10 pages.
U.S. Appl. No. 16/357,175, filed Mar. 18, 2019; Non-Final Office Action dated May 16, 2019; 49 pages.
U.S. Appl. No. 16/357,194, filed Mar. 18, 2019; Non-Final Office Action dated May 17, 2019; 51 pages.
U.S. Appl. No. 16/357,223, filed Mar. 1, 2019; Non-Final Office Action dated May 23, 2019; 11 pages.
U.S. Appl. No. 16/357,227, filed Mar. 18, 2019; Non-Final Office Action dated May 23, 2019; 10 pages.
U.S. Appl. No. 16/357,234, filed Mar. 18, 2019; Non-Final Office Action dated May 24, 2019; 12 pages.

(56) References Cited

OTHER PUBLICATIONS

U.S. Appl. No. 16/357,238, filed Mar. 18, 2019; Non-Final Office Action dated May 28, 2019; 32 pages.
U.S. Appl. No. 16/357,250, filed Mar. 18, 2019; Non-Final Office Action dated May 24, 2019; 18 pages.
U.S. Appl. No. 16/357,270, filed Mar. 18, 2019; Non-Final Office Action dated Jun. 14, 2019; 16 pages.
U.S. Appl. No. 16/357,271, filed Mar. 18, 2019; Non-Final OA dated May 15, 2019; 7 pages.
U.S. Appl. No. 16/357,273, filed Mar. 8, 2019; Non-Final Office Action dated May 17, 2019; 8 pages.
U.S. Appl. No. 16/357,274, filed Mar. 18, 2019; Non-Final Office Action dated May 10, 2019; 7 pages.
U.S. Appl. No. 16/357,276, filed Mar. 18, 2019; Non-Final Office Action dated May 10, 2019; 7 pages.
U.S. Appl. No. 16/357,277, filed Mar. 18, 2019; Non-Final Office Action dated May 9, 2019; 9 pages.
U.S. Appl. No. 16/357,279, filed Mar. 18, 2019; Non-Final Office Action dated May 30, 2019; 9 pages.
U.S. Appl. No. 16/357,280, filed Mar. 18, 2019; Non-Final Office Action dated May 14, 2019; 8 pages.
U.S. Appl. No. 16/402,023, filed May 2, 2019; Non-Final Office Action dated May 30, 2019; 25 pages.
U.S. Appl. No. 16/402,029, filed May 2, 2019; Non-Final Office Action dated Jun. 13, 2019; 9 pages.
U.S. Appl. No. 16/402,035, filed May 2, 2019; Non-Final Office Action dated Aug. 8, 2019; 191 pages.
U.S. Appl. No. 16/357,141, filed Mar. 18, 2019; Interview Summary dated Jun. 17, 2019; 1-3 pages.
U.S. Appl. No. 16/357,238, filed Mar. 18, 2019; Interview Summary dated Jun. 26, 2019; 1-4 pages.
U.S. Appl. No. 16/357,250, filed Mar. 18, 2019; Interview Summary dated Jun. 17, 2019; 1-4 pages.
U.S. Appl. No. 16/357,274, filed Mar. 18, 2019; Interview Summary dated Jun. 5, 2019; 1-3 pages.
U.S. Appl. No. 16/357,276, filed Mar. 18, 2019; Interview Summary dated Jun. 5, 2019; 1-4 pages.
U.S. Appl. No. 16/357,277, filed Mar. 18, 2019; Interview Summary dated Jun. 3, 2019; 1-4 pages.
U.S. Appl. No. 16/357,279, filed Mar. 18, 2019; Interview Summary dated Jun. 19, 2019; 1-4 pages.
U.S. Appl. No. 16/357,280, filed Mar. 18, 2019; Interview Summary dated Jun. 17, 2019; 1-3 pages.
U.S. Appl. No. 16/357,141, filed Mar. 18, 2019; Non-Final Office Action dated May 16, 2019; 17 pages.
U.S. Appl. No. 16/357,243, filed Mar. 18, 2019; Non-Final Office Action dated Jun. 3, 2019; 24 pages.
U.S. Appl. No. 16/357,282, filed Mar. 18, 2019; Non-Final Office Action dated Jun. 27, 2019; 19 pages.
U.S. Appl. No. 16/357,251, filed Mar. 18, 2019; Non-Final Office Action dated Aug. 1, 2019; 186 pages.
Varjabedian et al.; Design U.S. Appl. No. 29/659,571; Filing Date: Aug. 9, 2018; Food Preparation Device, User Interface, and Part Thereof.
U.S. Appl. No. 16/671,972, filed Nov. 1, 2019; Final Office Action dated Feb. 24, 2021; 59 pages.
U.S. Appl. No. 17/139,236, filed Dec. 31, 2020; Non-Final Office Action dated Mar. 8, 2021; 307 pages.
U.S. Appl. No. 17/139,283, filed Dec. 31, 2020; Non-Final Office Action dated Mar. 10, 2021; 309 pages.
U.S. Appl. No. 17/139,314, filed Dec. 31, 2020; Non-Final Office Action dated Mar. 23, 2021; 310 pages.
U.S. Appl. No. 17/139,599, filed Dec. 31, 2020; Non-Final Office Action dated Feb. 23, 2021; 9 pages.
U.S. Appl. No. 17/139,602, filed Dec. 31, 2020; Non-Final Office Action dated Feb. 22, 2021; 33 pages.
U.S. Appl. No. 17/139,572, filed Dec. 31, 2020; Non-Final Office Action mailed Mar. 11, 2021; 292 pages.
Delonghi, [online]; [retrieved on Mar. 18, 2019]; retrieved from the Internet https://www.delonghi.com/en-us/products/kitchen/kitchen-appliances/low-oil-fryer-and-multicooker/multifry-fh11631bk-0125392006?TabSegment=support#supportDeLonghi, "FH1163 FH1363 MultiFry", DeLonghi Instruction Manual, www.delonghi.com, 5712511041/05.15, pp. 1-11.
Written Opinion for International Application No. PCT/US2020/19664; International Filing Date: Feb. 25, 2020; Date of Mailing: Jun. 4, 2020; 10 pages.
Canadian Application No. 3065805 filed Dec. 31, 2019; Office Action dated Mar. 12, 2020; 6 pages.
Chinese Application No. 2019105566386 filed Jun. 25, 2019; Office Action with English Translation dated Sep. 9, 2020; 11 pages.
Chinese Application No. 201910557433.X filed Jun. 25, 2019; First Office Action with English Translation; 12 pages.
Chinese Application No. 2019105629830 filed Jun. 26, 2019; Office Action with English Translation dated Jun. 29, 2020; 18 pages.
Chinese Application No. 201910563072 filed Aug. 9, 2018; Office Action with English translation dated Mar. 9, 2020; 14 pages.
Chinese Patent Application No. 2019105638416 filed Jun. 26, 2019; Office Action with English Translation dated Nov. 3, 2020; 16 pages.
European Application No. 1921797806-1004 filed Dec. 31, 2019; European Search Report dated Apr. 1, 2020; 7 pages.
European Application No. 19218088.3-1004 filed Dec. 19, 2019; European Search Report dated Jun. 3, 2020; 7 pages.
European Application No. 19218129.5-1004 filed Dec. 19, 2019; European Search Report dated May 19, 2020; 7 pages.
European Application No. 19218218.6-1004 filed Dec. 19, 2019; European Search Report dated May 27, 2020; 6 pages.
European Application No. 19218240.0-1004 filed Dec. 19, 2019; European Search Report dated May 27, 2020; 7 pages.
European Application No. 19218251.7-1004 filed Dec. 19, 2019; European Search Report dated May 27, 2020; 7 pages.
European Application No. 19218259.0-1004 filed Dec. 19, 2019; European Search Report dated May 27, 2020; 7 pages.
International Search Report for International Application No. PCT/US2019/065662 filed Dec. 11, 2019; Date of Mailing: Mar. 25, 2020; 7 pages.
International Search Report for International Application No. PCT/US2020/017203; International Filing Date: Feb. 7, 2020; Date of Mailing: Jun. 4, 2020; 6 pages.
International Search Report for International Application No. PCT/US2020/017205; International Filing Date: Feb. 7, 2020; Date of Mailing: Jul. 16, 2020; 8 pages.
International Search Report for International Application No. PCT/US2020/019685; International Filing Date: Feb. 25, 2020; Date of Mailing: Dec. 8, 2020; 8 pages.
International Search Report for International Application No. PCT/US2020/19664; International Filing Date: Feb. 25, 2020; Date of Mailing: Jun. 4, 2020; 6 pages.
Invitation to Pay Additional Fees for International Application No. PCT/US2020/017205; International Filing Date: Feb. 7, 2020; Date of Mailing: May 19, 2020; 61 pages.
Invitation to Pay Additional Fees for International Application No. PCT/US2020/019685; International Filing Date: Feb. 25, 2020; Date of Mailing: Oct. 13, 2020; 11 pages.
Japanese Application No. 2020-030582 filed Feb. 26, 2020; Japanese Office Action with English Translation dated Dec. 8, 2020; 8 pages.
Japanese Application No. 2020-030585 filed Feb. 26, 2020; Japanese Office Action with English dated Dec. 8, 2020; 7 pages.
Japanese Application No. 2020-030586 filed Feb. 26, 2020; Japanese Office Action with English Translation dated Dec. 8, 2020; 6 pages.
Japanese Application No. 2020-030587 filed Feb. 26, 2020; Japanese Office Action with English Translation dated Dec. 8, 2020; 4 pages.
Japanese Patent Application No. 2020-030583 filed Feb. 26, 2020; Office Action with English Translation dated Nov. 10, 2020; 13 pages.
Japanese Patent Application No. 2020-030584 filed Feb. 26, 2020; Office Action with English Translation; 6 pages.
U.S. Appl. No. 16/671,709, filed Nov. 1, 2019; Non-Final Office Action dated Jul. 8, 2020; 28 pages.

(56) References Cited

OTHER PUBLICATIONS

U.S. Appl. No. 17/084,891, filed Oct. 30, 2020; Third Party Submission Under 37 CFR 1.290 dated Dec. 8, 2020; 72 pages.
U.S. Appl. No. 16/357,238, filed Mar. 18, 2019; Non-Final Office Action dated Jan. 14, 2021; 74 pages.
U.S. Appl. No. 16/357,270, filed Mar. 18, 2019; Non-Final Office Action dated Dec. 21, 2020; 32 pages.
U.S. Appl. No. 16/402,023, filed May 2, 2019; Final Office Action dated Nov. 17, 2020; 26 pages.
U.S. Appl. No. 16/402,029, filed May 2, 2019; Final Office Action dated Mar. 5, 2020; 10 pages.
U.S. Appl. No. 16/402,029, filed May 2, 2019; Non-Final Office Action dated Aug. 24, 2020; 27 pages.
U.S. Appl. No. 16/548,562, filed Aug. 22, 2019; Non-Final Office Action dated Aug. 3, 2020; 35 pages.
U.S. Appl. No. 16/559,174, filed Sep. 3, 2019; Non-Final Office Action dated Aug. 28, 2020; 58 pages.
U.S. Appl. No. 16/671,709, filed Nov. 1, 2019; Third Party Submission Under 37 CFR 1.290 dated Feb. 26, 2020; pp. 1-79.
U.S. Appl. No. 16/671,709, filed Nov. 1, 2019; Final Office Action dated Jan. 1, 2021; 29 pages.
U.S. Appl. No. 16/671,972, filed Nov. 1, 2019; Third Party Submission Under 37 CFR 1.290 dated Feb. 27, 2020; pp. 1-81.
U.S. Appl. No. 16/671,972, filed Nov. 1, 2019; Non-Final Office Action dated Jul. 31, 2020; 30 pages.
U.S. Appl. No. 16/678,628, filed Nov. 8, 2019; Non-Final Office Action dated Nov. 2, 2020; 53 pages.
U.S. Appl. No. 16/678,628, filed Nov. 8, 2019; Notice of Allowance dated Sep. 21, 2020; 9 pages.
U.S. Appl. No. 16/800,089, filed Feb. 25, 2020; Third Party Submission Under 37 CFR 1.290 dated Mar. 13, 2020; pp. 1-82.
US Application No. EUP0654US2C8 filed Mar. 18, 2019; Final Office Action dated Aug. 24, 2020; 33 pages.
U.S. Appl. No. 16/357,250, filed Mar. 18, 2019; Non-Final Office Action dated Apr. 17, 2020; 1-12 pages.
U.S. Appl. No. 16/548,562, filed Aug. 22, 2019; Final Office Action dated Mar. 9, 2020; 26 pages.
U.S. Appl. No. 16/559,174, filed Sep. 3, 2019; Final Office Action dated Mar. 12, 2020; 1-35 pages.
Written Opinion for International Application No. PCT/US2019/065662 filed Dec. 11, 2019; Date of Mailing: Mar. 25, 2020; 7 pages.
Written Opinion for International Application No. PCT/US2020/017203; International Filing Date: Feb. 7, 2020; Date of Mailing: Jun. 4, 2020; 10 pages.
Written Opinion for International Application No. PCT/US2020/017205; International Filing Date: Feb. 7, 2020; Date of Mailing: Jul. 16, 2020; 11 pages.
Written Opinion for International Application No. PCT/US2020/019685; International Filing Date: Feb. 25, 2020; Date of Mailing: Dec. 8, 2020; 12 pages.
Extended European Search Report issued in European Application No. 21166562.5, mailed on Jul. 26, 2021, 11 pages.
Chuan-Lu, Chen, "Preliminary Discussion on Heating and Abnormal Working Testing of Induction Cooker", Electronics Quality, No. 7; ISSN 1003-0107, 2007, pp. 21-23.

* cited by examiner

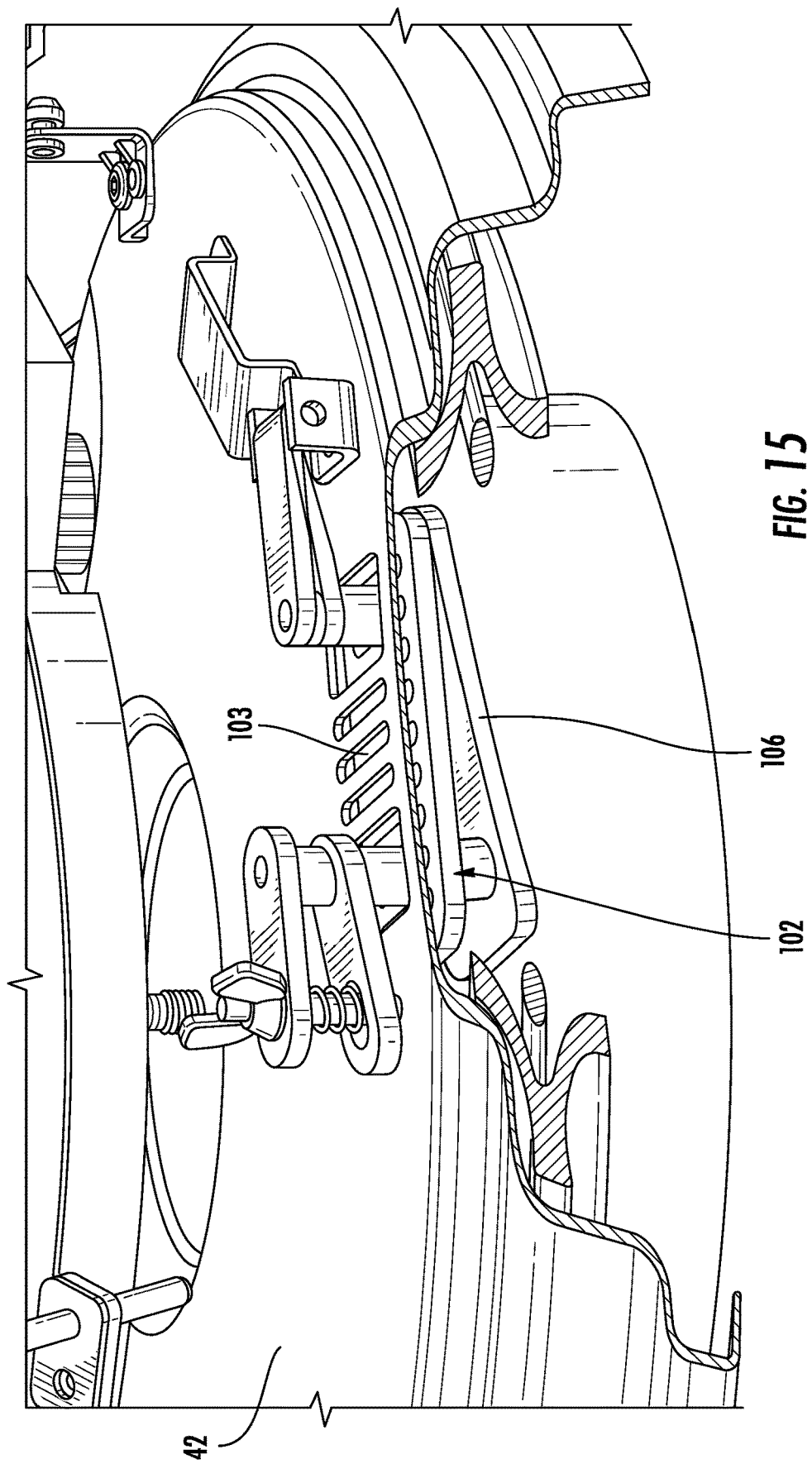

COOKING DEVICE AND COMPONENTS THEREOF

CROSS-REFERENCE TO RELATED APPLICATIONS

This application claims the benefit of U.S. Provisional Application Ser. No. 63/001,953, filed Mar. 30, 2020, which is incorporated herein by reference in its entirety.

BACKGROUND

Embodiments of the present disclosure relates generally to a cooking device and components thereof, and more specifically, to a multifunction device configured to perform the operation of a plurality of distinct cooking devices, the multifunctional cooking device optionally employing various components for cooking in the distinct cooking modes.

Conventional cooking devices, such as pressure cookers and air fryers each perform a single cooking operation, and as such, these devices employ different components and methods for cooking food items. As such, multiple devices are required to perform various cooking operations. For consumers that wish to enjoy food cooked in different ways via different operations, an accumulation of these devices can occur. Such an accumulation of cooking devices is often prohibitive from a standpoint of cost and storage space. For at least these reasons, it would be desirable to integrate the functionality of several cooking devices into a single user-friendly cooking device.

SUMMARY

According to an embodiment, a cooking system includes a housing defining a hollow chamber configured to receive food. The housing has an upper portion defining an opening to said hollow chamber. A lid is movable relative to the housing between an open position and a closed position. A lid lock is associated with at least one of the lid and the housing. The lid is configurable between a lid locked condition with the housing and a lid unlocked condition with the housing via the lid lock. At least one vent is disposed in at least one of the lid and the housing, and the at least one vent is configurable between an open vent condition and a closed vent condition via actuation of the lid lock.

In addition to one or more of the features described above, or as an alternative, in further embodiments said lid lock is manually movable to transform said lid between said lid unlocked condition and said lid locked condition.

In addition to one or more of the features described above, or as an alternative, in further embodiments said lid lock further comprises a protrusion arranged within a slot formed at an exterior of said lid, said protrusion being movable between a first position associated with said lid unlocked condition and a second position associated with said lid locked condition.

In addition to one or more of the features described above, or as an alternative, in further embodiments the cooking system is operable in a non-pressurized cooking mode when said at least one vent is in said open vent condition and the cooking system is operable in a pressurized cooking mode when said at least one vent is in said closed vent condition.

In addition to one or more of the features described above, or as an alternative, in further embodiments said at least one vent is in said open vent condition when said lid is in said lid unlocked condition and said at least one vent is in said closed vent condition when said lid is in said lid locked position.

In addition to one or more of the features described above, or as an alternative, in further embodiments said at least one vent further comprises an inlet vent and an outlet vent, wherein both said inlet vent and said outlet vent are in said open vent condition when said lid is in said lid unlocked condition and both said inlet vent and said outlet vent are in said closed vent condition when said lid is in said lid locked position.

In addition to one or more of the features described above, or as an alternative, in further embodiments said lid is further configurable at an intermediate lid locked condition with said housing.

In addition to one or more of the features described above, or as an alternative, in further embodiments said inlet vent is in said open vent condition and said outlet vent is in said closed vent condition when said lid is in said intermediate lid locked condition.

In addition to one or more of the features described above, or as an alternative, in further embodiments said lid further comprises a first portion of an engagement mechanism and said housing further comprises a second portion of said engagement mechanism, and when said lid is in said lid locked condition said first portion and said second portion of said engagement mechanism are coupled.

In addition to one or more of the features described above, or as an alternative, in further embodiments said engagement mechanism is a bayonet locking system.

In addition to one or more of the features described above, or as an alternative, in further embodiments the cooking system further comprises a user interface and a functionality of said user interface is determined in response to a position of said lid lock.

In addition to one or more of the features described above, or as an alternative, in further embodiments said user interface includes a first portion and a second portion, said first portion is energized when said lid is in said lid unlocked condition and said second portion is energized when said lid is in said lid locked condition.

According to an embodiment, a cooking system includes a housing defining a hollow chamber configured to receive food. The housing has an upper portion defining an opening to said hollow chamber A lid is movable relative to the housing between an open position and a closed position. A lid lock is associated with at least one of the lid and the housing. The lid is configurable between a lid locked condition with the housing and a lid unlocked condition with the housing via the lid lock. A user interface is located at at least one of the lid and the housing. A functionality of said user interface is determined in response to a position of said lid lock.

In addition to one or more of the features described above, or as an alternative, in further embodiments said user interface includes a first portion and a second portion, said first portion being energized when said lid is in said lid unlocked condition and said second portion being energized when said lid is in said lid locked condition.

In addition to one or more of the features described above, or as an alternative, in further embodiments said lid lock is manually movable to transform said lid between said lid unlocked condition and said lid locked condition.

In addition to one or more of the features described above, or as an alternative, in further embodiments said lid lock further comprises a protrusion arranged within a slot formed at an exterior of said lid, said protrusion being movable between a first position associated with said lid unlocked condition and a second position associated with said lid locked condition.

In addition to one or more of the features described above, or as an alternative, in further embodiments the cooking system is operable in a conductive cooking mode when said lid is in said lid locked condition and the cooking system is operable in a convective cooking mode when said lid is in said lid unlocked condition.

In addition to one or more of the features described above, or as an alternative, in further embodiments said user interface includes a first portion and a second portion, said first portion being associated with said conductive cooking mode and said second portion being associated with said convective cooking mode.

In addition to one or more of the features described above, or as an alternative, in further embodiments the cooking system is operable in a combination cooking mode when said lid is in an intermediate position between said lid locked condition and said lid unlocked condition.

In addition to one or more of the features described above, or as an alternative, in further embodiments said user interface includes a third portion associated with said combination cooking mode, said third portion being operable when said lid is in said intermediate position.

In addition to one or more of the features described above, or as an alternative, in further embodiments comprising at least one vent disposed in at least one of said lid and said housing, wherein said at least one vent is configurable between an open vent condition and a closed vent condition via actuation of said lid lock.

In addition to one or more of the features described above, or as an alternative, in further embodiments said at least one vent is in said open vent condition when said lid is in said lid unlocked condition and said at least one vent is in said closed vent condition when said lid is in said lid locked position.

In addition to one or more of the features described above, or as an alternative, in further embodiments said at least one vent further comprises an inlet vent and an outlet vent, wherein both said inlet vent and said outlet vent are in said open vent condition when said lid is in said lid unlocked condition and both said inlet vent and said outlet vent are in said closed vent condition when said lid is in said lid locked position.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 15 is a perspective view of a partially cut away lid of the cooking system according to an embodiment;

The detailed description explains embodiments of the disclosure, together with advantages and features, by way of example with reference to the drawings.

DETAILED DESCRIPTION

Figure 1:
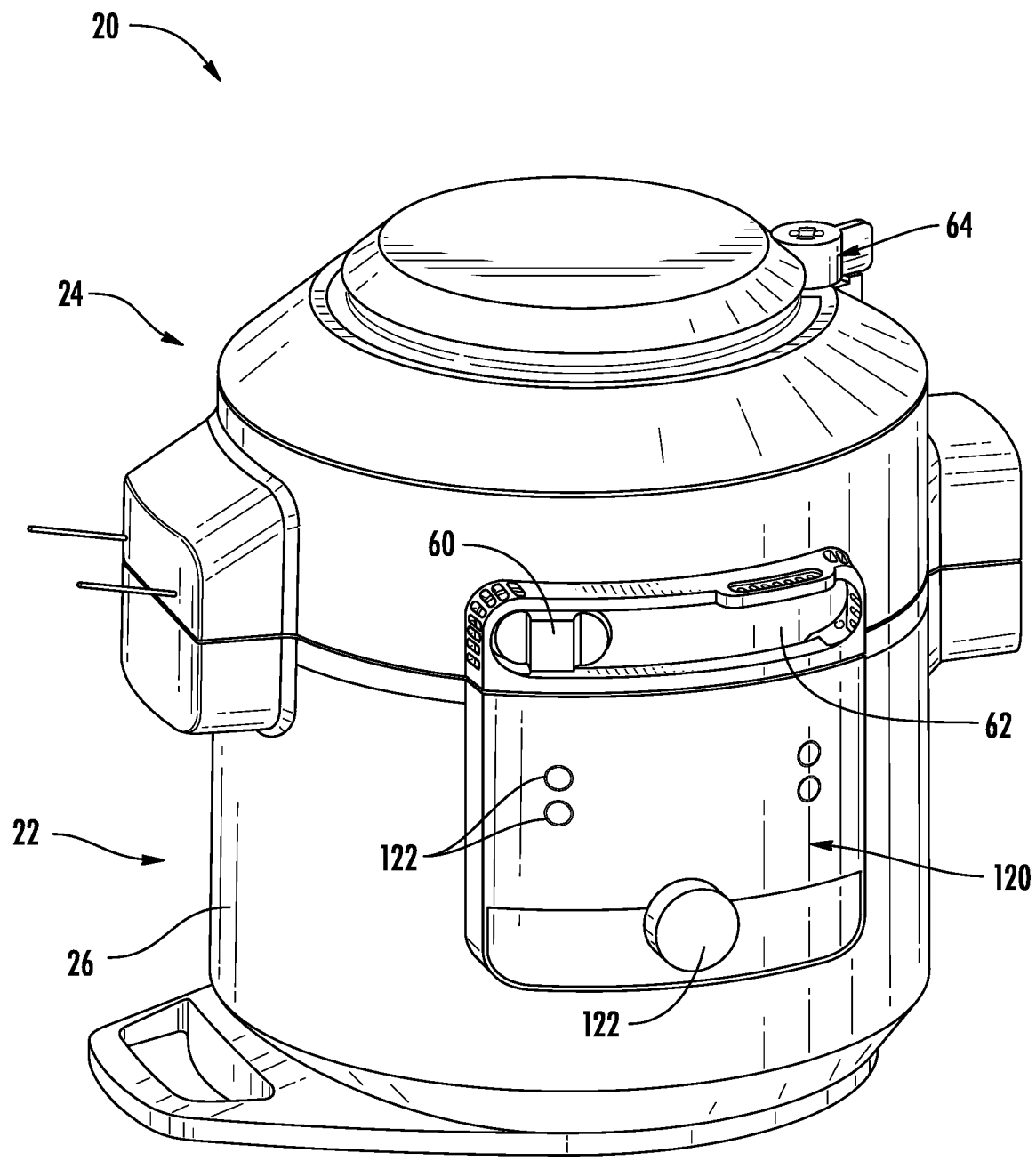
FIG. 1 is a perspective view of a cooking system according to an embodiment.
Figure 2:
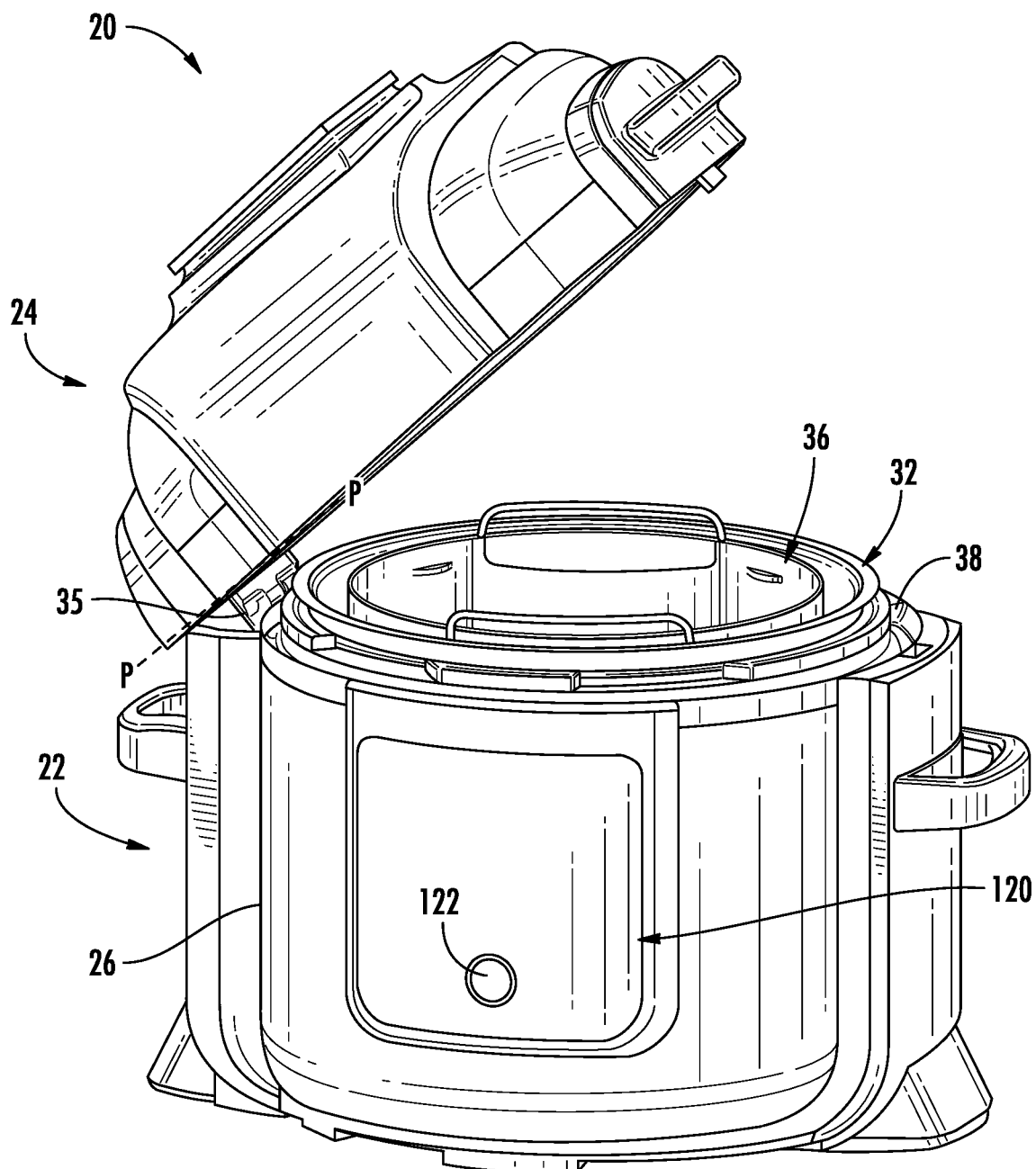
FIG. 2 is a perspective view of a cooking system having a lid in an open position according to an embodiment.
Figure 3:
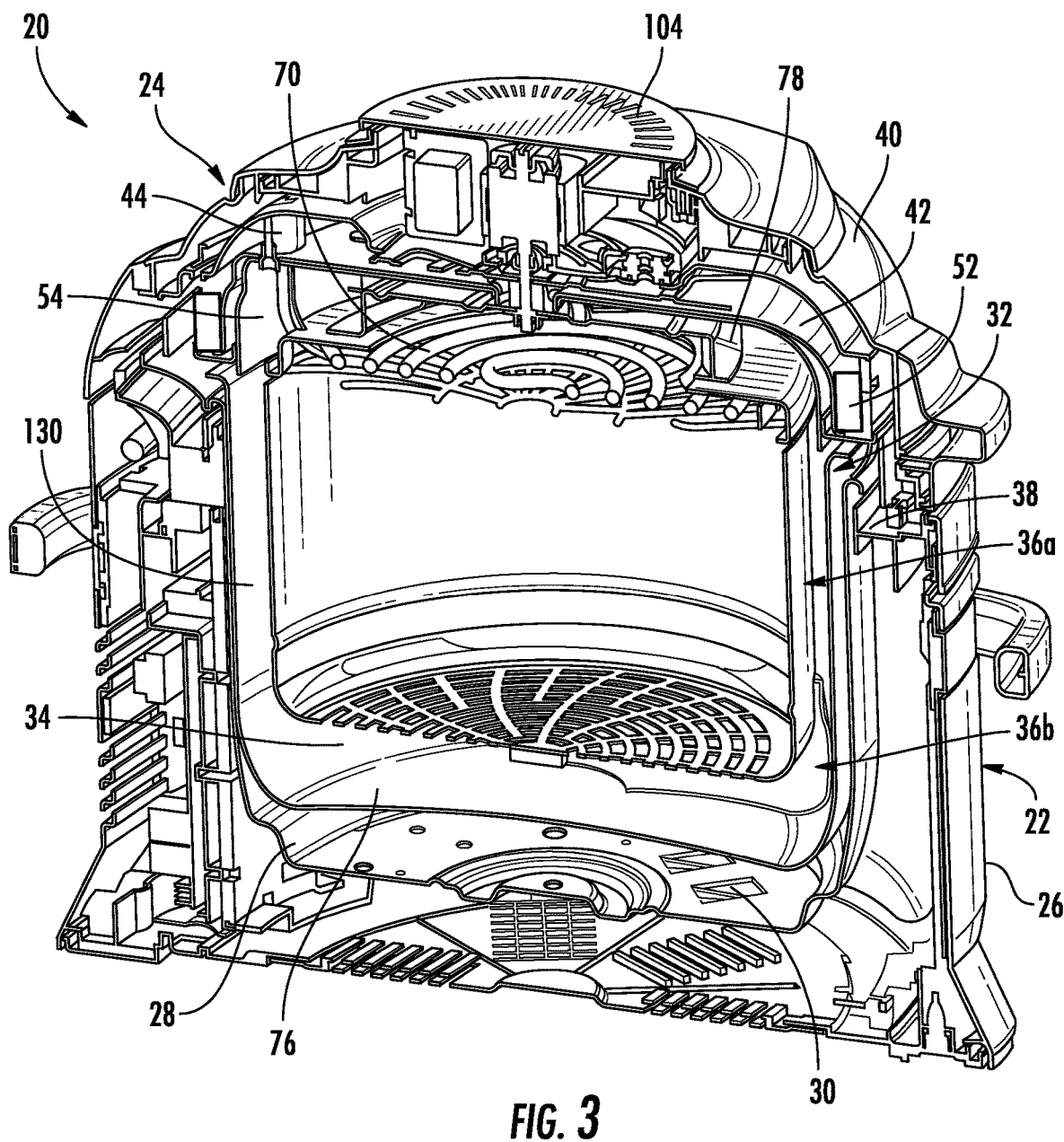
FIG. 3 is a cross-sectional view of a cooking system having a lid in a closed position according to an embodiment.

With reference now to FIGS. 1-3, an example of the cooking system 20 is illustrated. As shown, the cooking system 20 includes a base 22 and a lid 24. The base 22 includes a housing 26 made of any suitable material, such as glass, aluminum, plastic, or stainless steel for example. A liner 28 may be disposed within the hollow interior 30 of the housing 26. The liner 28 may be formed from any suitable conductive material, such as aluminum for example. In an embodiment, the liner 28 forms an interior surface of the housing 26 and thereby defines the hollow interior 30 of the housing 26. Alternatively, the liner 28 may be offset from the interior surface of the housing 26. However, it should be understood that other components of the cooking system 20, or surfaces thereof, may also define the hollow interior 30.

A cooking container 32 is receivable within the hollow interior 30 of the housing 26. Although the cooking container 32 is described herein as being removable from the housing 26 of the base 22, embodiments where the cooking container 32 is integrally formed with the housing 26 are also contemplated herein. In an embodiment, a height of the cooking container 32 is greater than the height of the hollow interior 30 of the housing 26. Accordingly, when the cooking container 32 is installed within the interior 30, an end of the container extends beyond the adjacent end surface 38 of the housing 26, as shown in FIG. 3. The cooking container 32 has an interior or cooking chamber 34 designed to receive and retain one or more consumable products, such as food products for example, therein. Examples of food products suitable for use with the cooking system 20, include but are not limited to, meats, fish, poultry, bread, rice, grains, pasta, vegetables, fruits, and dairy products, among others. The cooking container 32 may be a pot formed from a ceramic, metal, or die cast aluminum material. In an embodiment, an interior surface of the cooking container 32 includes a nano-ceramic coating and an exterior surface of the cooking container 32 includes a silicone epoxy material. However, any suitable material capable of withstanding the high temperatures required for cooking food products is contemplated herein. Further, one or more handles may be associated with the cooking container 32 to allow a user to easily grasp and manipulate the cooking container 32 relative to the housing 26.

One or more accessories, may be compatible for use with the cooking system 20. Examples of such accessories include, but are not limited to, a diffuser, a crisping insert or basket (see numeral 36 in FIGS. 2 and 3), a grill plate, and a griddle for example. In such embodiments, the accessories may be receivable within the hollow interior 30 of the housing 26, or alternatively, within the cooking chamber 34 of the cooking container 32.

Referring with more detail to the lid 24, it should be noted that the lid 24 is connectable to a surface of the cooking container 32 and/or housing 26 to close off entry to the cooking chamber 34 of the cooking container 32. Accordingly, a heating volume may be defined between the cooking chamber 34 of the cooking container 32 and the closed lid 24, such as the bottom surface of the closed lid 24, or alternatively, between the hollow interior 30 defined by the housing 26 and the closed lid 24. As used herein, the term "heating volume" describes a volume within the cooking system 20 through which a fluid may circulate during a cooking operation (to be described in detail below). In an embodiment, a diameter of the lid 24 is generally complementary to a diameter of the housing 26 such that the lid 24 covers not only the cooking container 32, but also an upper surface 38 of the housing 26.

The lid 24 is movable relative to the base 22 between an open position (FIG. 2), in which the cooking container 32 is accessible, and a closed position (FIG. 1, 3) to selectively cover the hollow interior 30 and cooking chamber 34. The lid 24 may be distinct and separable from the base 22, or alternatively, the lid 24 may be movably connected to the base 22. In the illustrated, non-limiting embodiment of FIG. 2, the lid 24 is pivotable or rotatable (via a hinge 35 for example) relative to the base 22 about a pivot axis P. However, other types or movement of the lid 24 are also within the scope of the disclosure.

One or more fastening mechanisms (not shown) may but need not be used to secure the lid 24, or a portion thereof, to the base 22 when the lid 24 is in the closed position. In an embodiment, the fastening mechanism is selectively engaged when the lid 24 is in the closed position. Alternatively, or in addition, the fastening mechanism is selectively engaged based on a selected cooking operation of the cooking system 20, such as pressure cooking for example. Any suitable type of fastening mechanism capable of withstanding the heat and pressure associated with the cooking system 20 is considered within the scope of the disclosure.

As best shown in FIG. 3, the lid 24 may include a generally convex outer lid or lid housing 40 made from any suitable material. In some embodiments, at least a portion of the material of the lid housing 40 may be substantially identical to the material of the housing 26. An inner lid liner (or sealing liner) 42 is arranged within the hollow interior 44 of the lid housing 40. Although the inner lid liner 42 is illustrated as also having a generally convex shape, embodiments where the shape of the inner lid liner 42 is different than the shape of the lid housing 40 are also within the scope of the disclosure. Further, the inner lid liner 42 can be made of any suitable material, such as glass, aluminum, plastic, or stainless steel, or any combination thereof for example. The inner lid liner 42 may but need not be made from the same material as the lid housing 40.

In an embodiment, a sealing surface 46 of the lid 24 is connectable to the upper surface 38 of the housing 26 or directly to the cooking container 32 to form a pressure-tight seal between the lid 24 and the cooking container 32 or housing 26. As a result, an inner surface 54 of the inner lid liner 42 defines a relatively upper boundary of a heating volume through which a fluid can circulate. In an embodiment, the sealing surface 46 is arranged at the end of the inner lid liner 42 adjacent to the cooking container 32. The sealing surface 46 may be formed by a portion of the inner lid liner 42 itself, or as shown in the FIGS. 4-6, a flexible/resilient gasket 50 connected to a portion of the inner lid liner 42, such as the end thereof, may define the sealing surface 46. This gasket 50 may be made of rubber, silicone, or other similar materials, and may include a flange that is received within an interior of the cooking container 32. It should be appreciated that the pressure tight seal formed between the lid 24 and the cooking container 32 or housing 26 may occur during all cooking modes, or just select cooking modes such as those modes that involve pressure or conductive cooking. In embodiments wherein the pressure tight seal is just formed in select cooking modes, this seal may not be formed in air fry or convection modes, and the lid 24 may simply rest on the upper surface of the housing 38 or cooking container 32 when the lid 24 is closed.

Figure 4:
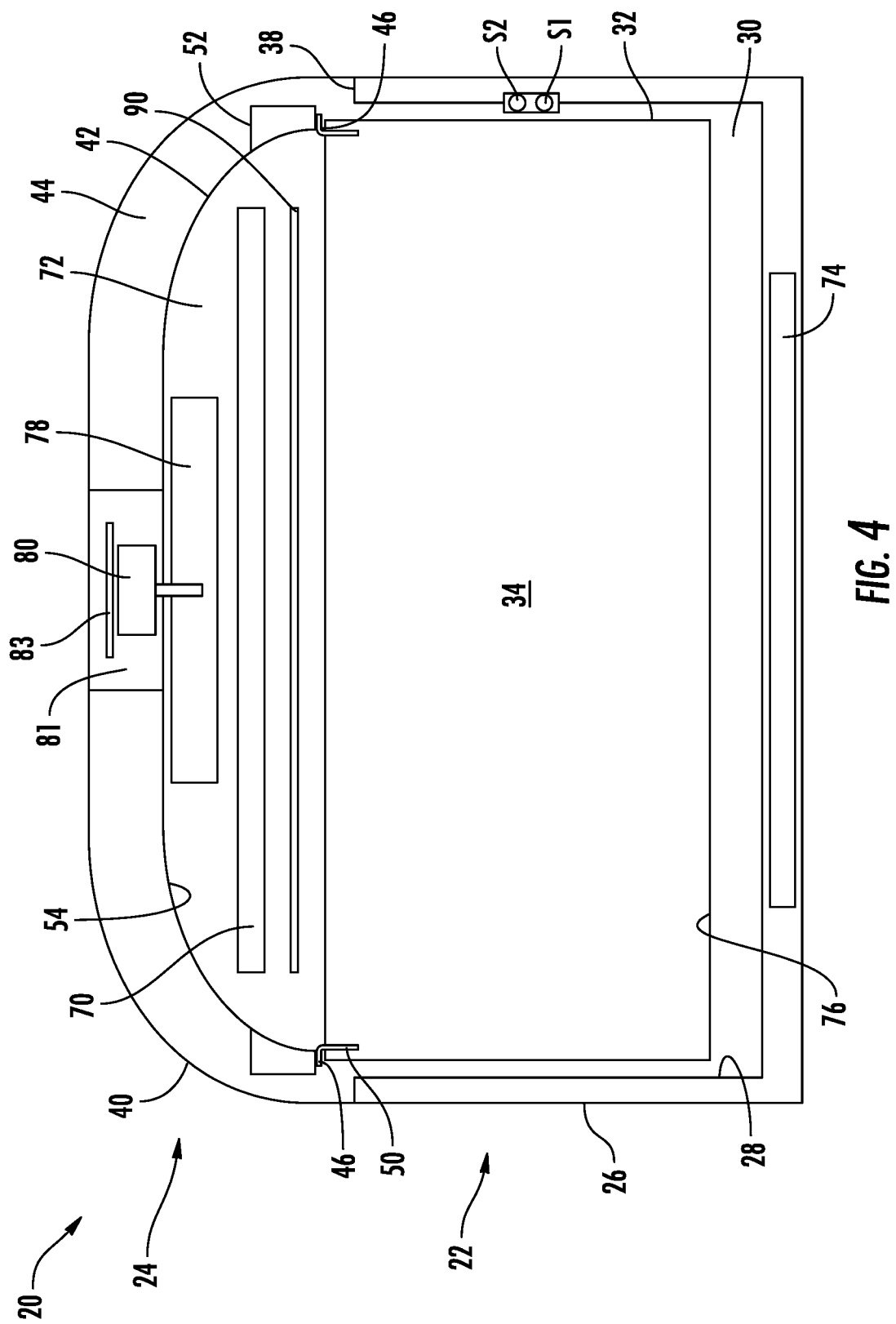
FIG. 4 is a schematic diagram of a cooking system according to an embodiment.
Figure 5:
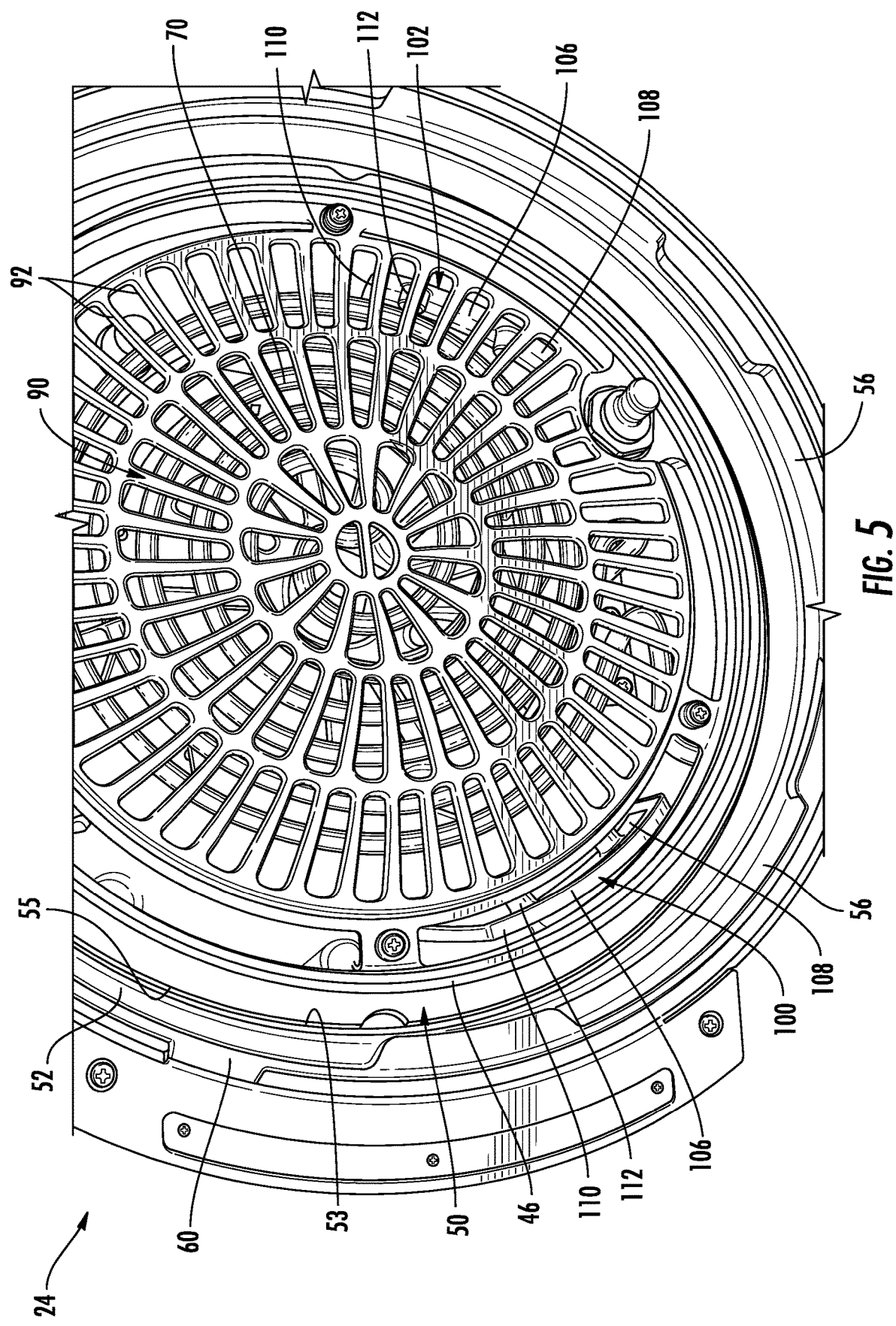
FIG. 5 is a front perspective view of an underside of a lid of a cooking system when a mode selector is in a first position according to an embodiment.
Figure 6:
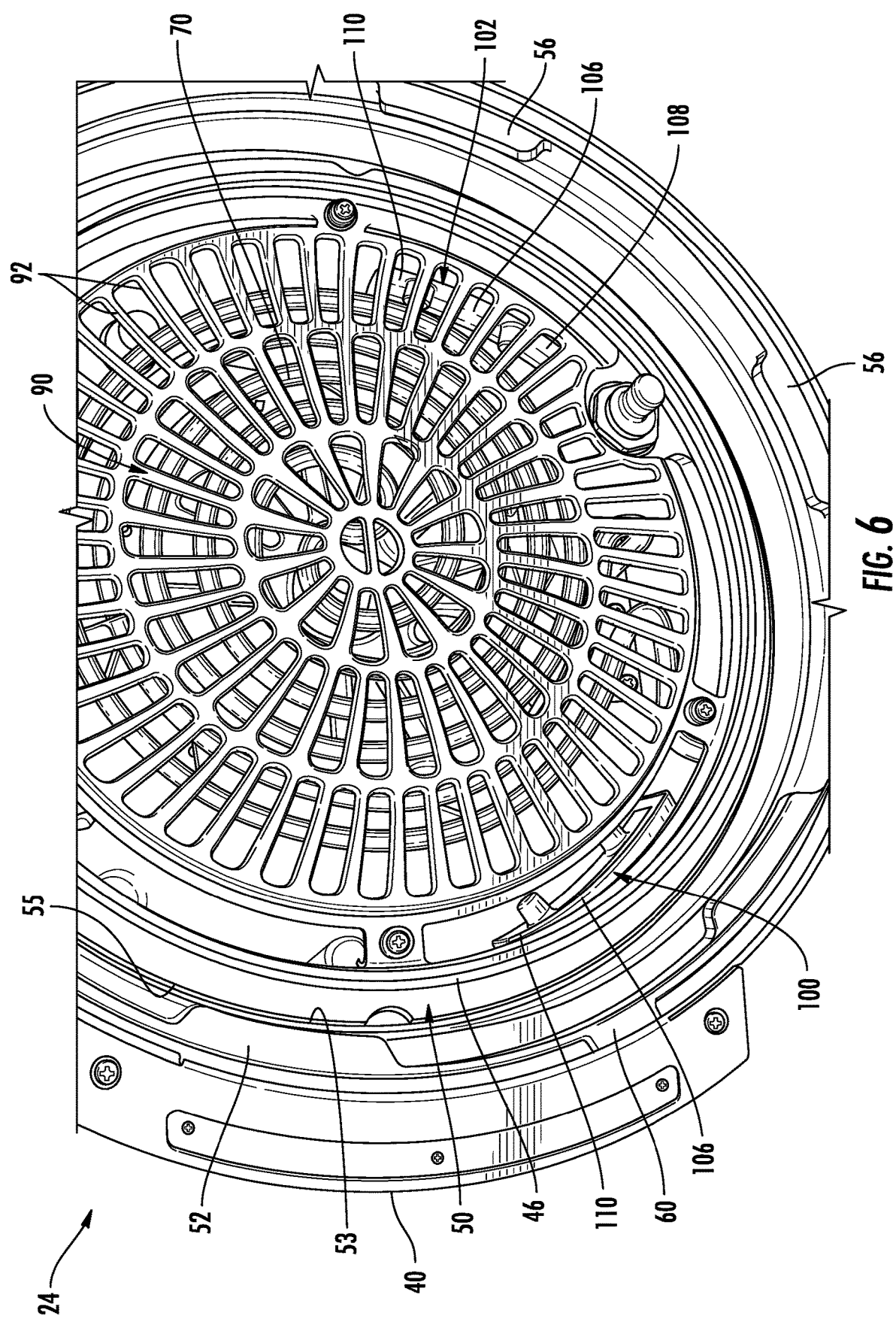
FIG. 6 is a front perspective view of an underside of a lid of a cooking system when a mode selector is in a second position according to an embodiment.
Figure 7:
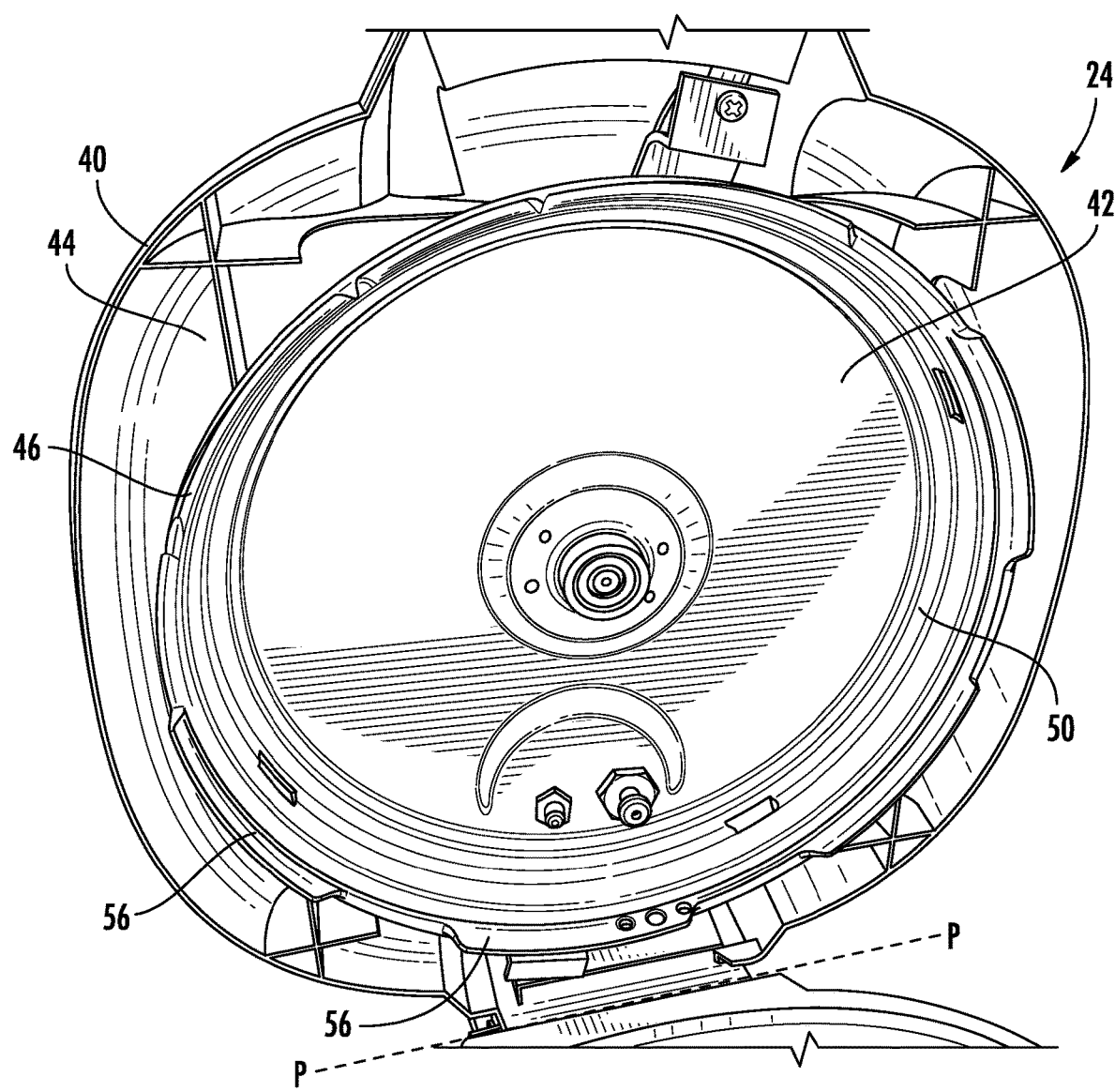
FIG. 7 is a front perspective view of an interior of a lid of a cooking system according to an embodiment.
Figure 8:
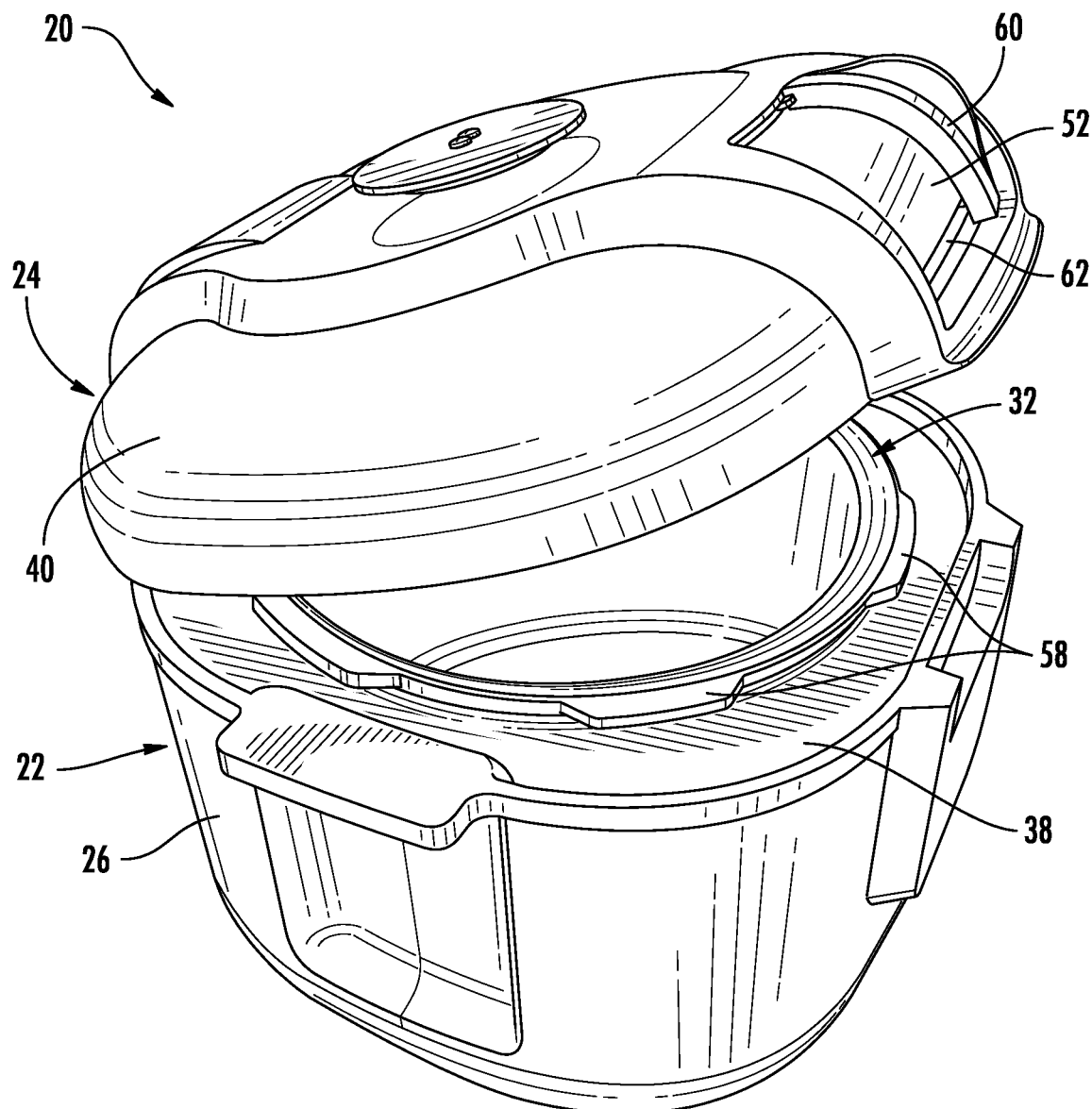
FIG. 8 is a side perspective view of a cooking system according to an embodiment.
Figure 9:
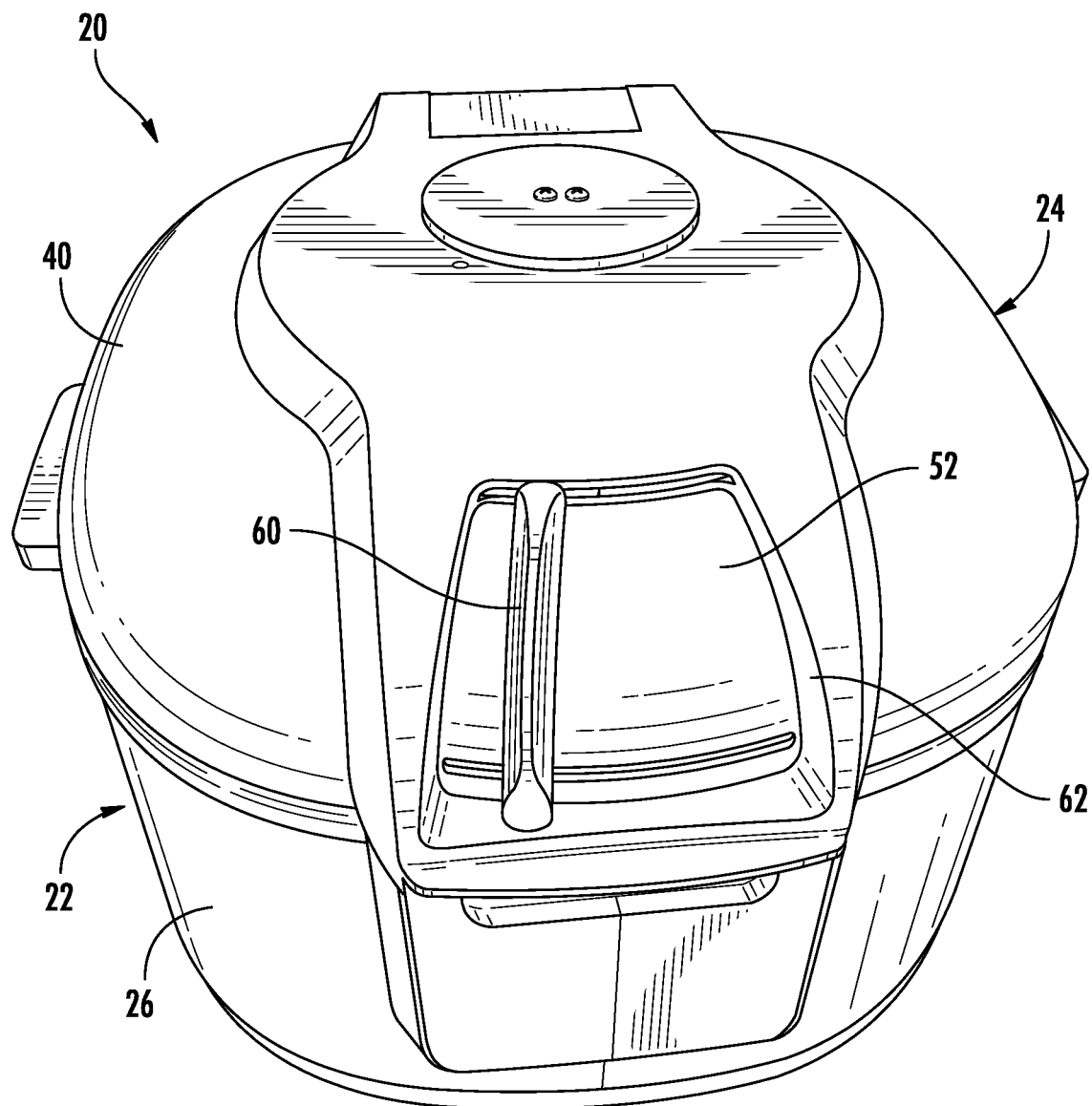
FIG. 9 is a front perspective view of a lid of the cooking system in a pressure-tight configuration according to an embodiment.
Figure 10A:
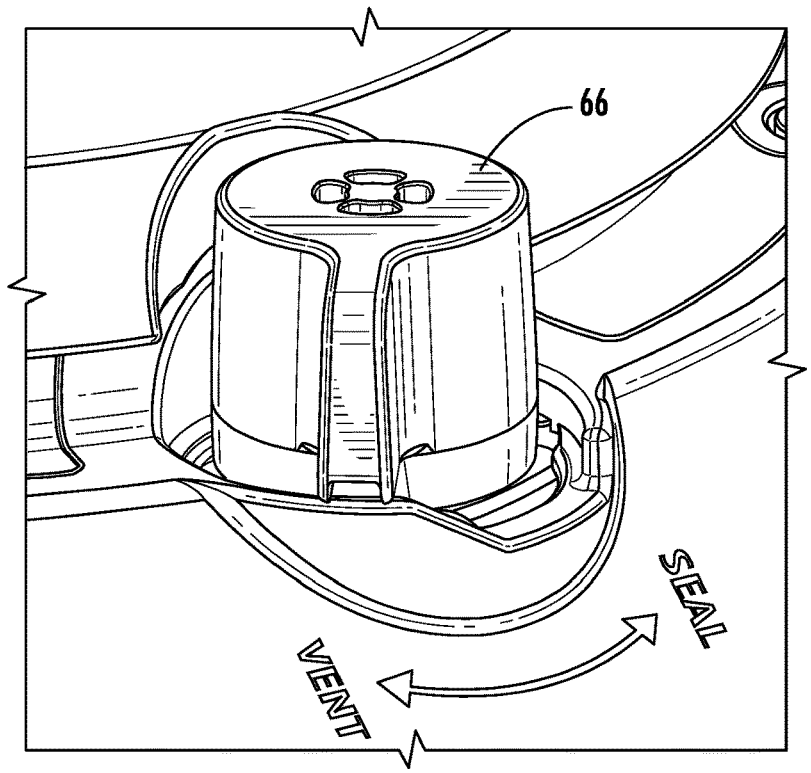
FIG. 10A is a perspective view of a pressure relief valve in an open configuration.
Figure 10B:
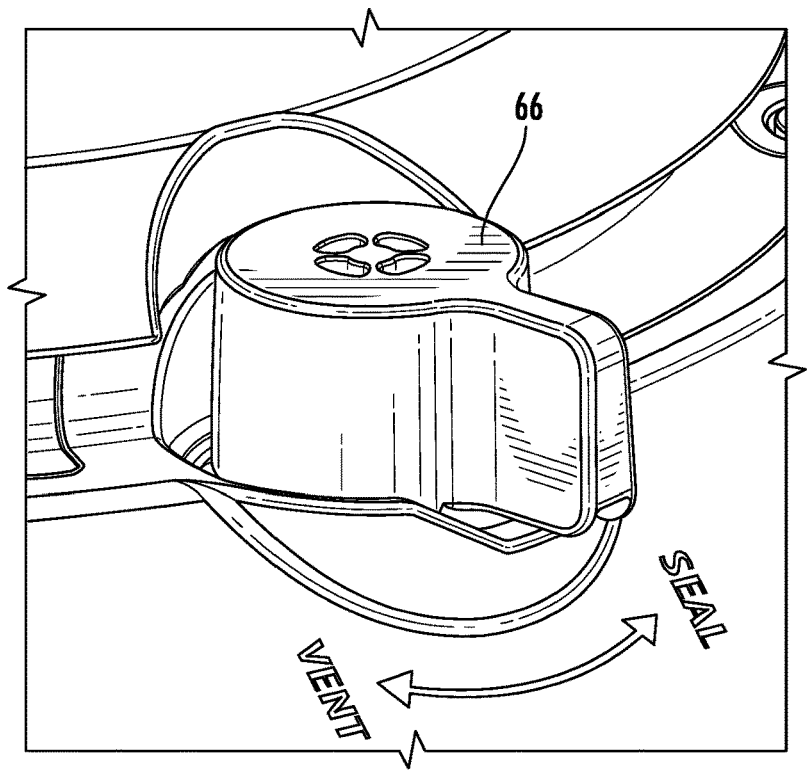
FIG. 10B is a perspective view of a pressure relief valve in a closed configuration.
Figure 11A:
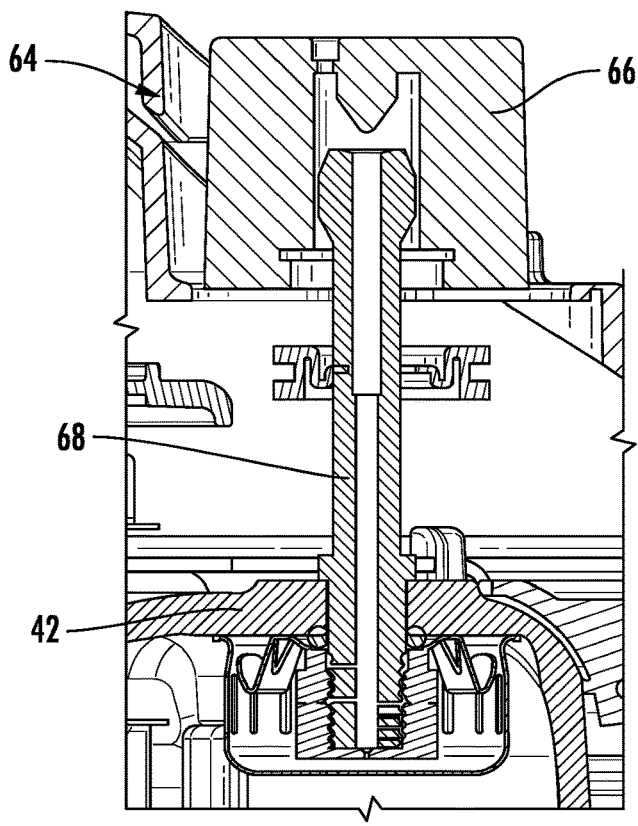
FIG. 11A is a cross-sectional view of the pressure relief valve in an open configuration according to an embodiment.
Figure 11B:
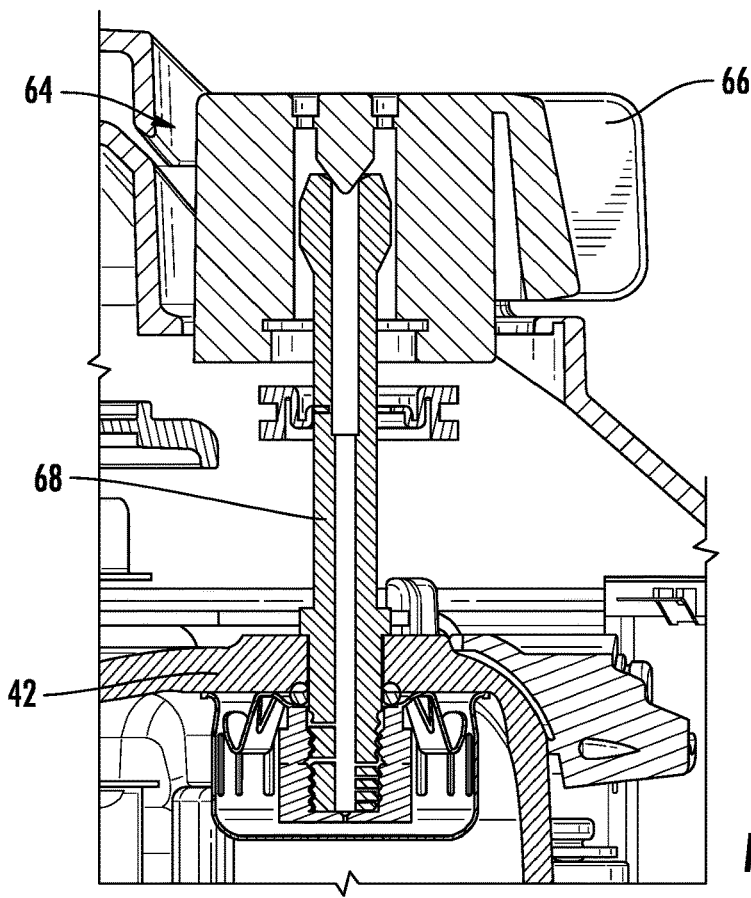
FIG. 11B is a cross-sectional view of the pressure relief valve in a closed configuration according to an embodiment.

The system 20 may also include embodiments wherein additional steps beyond simply closing the lid 24 may have to be taken in order to form the pressure tight seal. In other words, closing the lid 24 relative to the base 22 may not automatically form a pressure-tight seal there between. In such an exemplary embodiment, the lid 24 additionally includes a lid lock 52. As best shown in FIGS. 4-6, the lid lock 52 is arranged within the interior of the lid housing 40, such as generally concentrically with a portion of the inner lid liner 42 relative to a central axis of the lid 24. In the illustrated, non-limiting embodiment, the lid lock 52 has a ring shaped or annular body aligned with a bottom surface of the lid housing 40 and/or the inner lid liner 42. An inner surface 53 of the lid lock 52 may be positioned generally adjacent to or in directly contact with an exterior surface 55 of the inner lid liner 42. In an embodiment, the lid lock 52 is movable, such as rotatable about an axis relative to the lid housing 40 and the inner lid liner 42, to selectively apply a pressure to move the sealing surface 46 into engagement with the cooking container 32 to form a pressure-tight seal therebetween. However, in other embodiments, it should be understood that closing the lid 24 relative to the base 22 may form a pressure-tight press-fit connection between the sealing surface 46 and/or the cooking container 32.

Regardless of whether rotation of the lid lock 52 is required to form a pressure-tight seal, the lid lock 52 is operable as a locking mechanism that retains or lock the lid 24 in the closed position relative to the base 22. For example, as shown in FIGS. 5-8, the lid lock 52 includes a first portion of a bayonet locking system such that by rotating the lid lock 52, one or more engagement members 56 (FIGS. 5-7) formed on the lid lock 52 abut or intermesh with one or more engagement members 58 (FIG. 8) of a complementary second portion of the bayonet locking system extending from an upper portion of the housing 26 to restrict movement of the sealing surface 46 away from the cooking container 32 in response to an increased pressure within the heating volume. In other embodiments where a pressure-tight seal is formed upon closing the lid 24 relative to the base 22, another locking mechanism, distinct from the lid lock 52 may be operable to maintain the sealing surface 46 in sealing engagement with the cooking container 32 once a pressurized environment is generated.

At least a portion of or a part connected to and extending from the lid lock 52 may be accessible at an exterior surface of the cooking system 20 for manipulation by a user to selectively lock the lid 24 to the base 22 so as to form and/or maintain a pressure-tight heating volume defined between the interior surface 54 of the inner lid liner 42 and the cooking chamber 34 of the cooking container 32 (to be described in more detail below). In the illustrated, non-limiting embodiment, best shown in FIGS. 1 and 5-9, the lid lock 52 includes an outwardly extending protrusion 60, also referred to herein as a mode selector, arranged within an opening 62, for example a slot, formed at an exterior surface of the lid housing 40. In such embodiments, a user may transform the lid lock 52 between locked and unlocked configurations by translating the mode selector 60 within the opening 62 between a first position and a second position. Although the inner lid liner 42 is described herein as being stationary and the lid lock 52 is described as being movable relative to the inner lid liner 42, embodiments where the inner lid liner 42 is coupled to or formed as a unitary body with the lid lock 52, such that both the inner lid liner 42 and the lid lock 52 are movable relative to the lid housing 40 in unison are also within the scope of the disclosure.

With reference now to FIGS. 1 and 10A-11B, the lid 24 may additionally include a pressure release mechanism 64, such as a vent or valve. In embodiments where a movement of the lid 24 is restricted to maintain the pressure-tight seal, the pressure release mechanism 64 may be formed in the stationary inner lid liner 42, such as in an upper surface or side surface or the inner lid liner 42 for example. However, it should be understood that in embodiments where the inner lid liner 42 is rotatable about an axis relative to the lid housing 40, the pressure release mechanism 64 coupled to the inner lid liner 42 may be adapted to couple to the inner lid liner 42 only when in the sealed position, or alternatively, to move with the inner lid liner 42.

The pressure release mechanism 64 may be configured to automatically open to release air from within the heating volume formed between the inner lid liner 42 and the cooking container 32 when the pressure therein exceeds a predetermined threshold, such as during operation of the cooking system 20 in a first cooking mode performing a pressure cooking operation. Alternatively, or in addition, the pressure release mechanism 64 is manually operable, such as rotatable about a vertically oriented axis for example, to release air or fluid from within the heating volume. An example of a manually operable pressure release mechanism 64 is shown in FIGS. 10A-11B. In the illustrated, non-limiting embodiment, a connector 66 operably coupled to a movable portion 68 of the pressure release mechanism 64, such as a knob for example, is arranged at an exterior surface of the lid 24 for access by an operator. As the knob 66 is rotated between a first, open position (FIG. 10A) and second, closed position (FIG. 10B), the movable portion 68, such as a valve stem for example, is configured to rotate and/or translate to selectively seal or expose an opening formed in the inner lid liner 42 in fluid communication with the interior of the cooking container 32.

The cooking system 20 includes at least one heating element operable to impart heat to the heating volume during one or more of a plurality of cooking modes of the cooking system 20. In the illustrated, non-limiting embodiment, a first or upper heating element 70 is positioned generally at or above an upper extent of the cooking container 32, such as proximate a center of the interior 34 of the cooking container 32 for example. As shown, the at least one first heating element 70 is mounted within the lid 24 (and may also be referred to as lid heating element 70), and therefore completely outside of the cooking container 32, and vertically offset from the upper extent thereof. In the illustrated, non-limiting embodiment, the first heating element 70 is arranged within the interior 72 of the inner lid liner 42, such as at a position offset from an interior surface 54 of the inner lid liner 42. In the illustrated non-limiting embodiment, a second or lower or base heating element 74 is also disposed within the housing 26, generally adjacent the bottom 76 of the cooking container 32. However, it should be understood that embodiments where a heating element is arranged at another location within the base 22 and/or the lid 24 are also contemplated herein.

The at least one first and second heating element 70, 74 may be capable of performing any suitable type of heat generation. For example, a first and second heating element 70, 74 configured to heat the cooking container 32 or one or more food items located within the cooking chamber 34 of the cooking container 32 via conduction, convection, radiation, and induction are all within the scope of the disclosure. In the illustrated, non-limiting embodiment, the first heating element 70 is operable to cook food within the cooking container 32 via a non-contact cooking operation. As used herein, the term "non-contact cooking operation" includes any cooking operation where a heating element or heat source is not arranged in direct or indirect contact with a food item, such as, but not limited to, convective and radiant heating. In such embodiments, the cooking system 20 additionally includes an air movement mechanism 78, such as a fan for example, operable to circulate air within the cooking volume. The air is heated as it flows along its path of circulation, such as by flowing over a portion of the at least one first heating element 70. In such embodiments, the first heating element 70 is operable to perform a convective heating operation. Convective heating operations may also generally be referred to as "dry cooking operations," which include any cooking mode that creates a "dry cooking environment" within the container 24, such as but not limited to air frying, broiling, baking/roasting and dehydrating. To create a dry cooking environment, air and moisture are actively exhausted or vented from the cooking enclosure to outside the cooking system 20, thereby maintaining a minimum level of moisture within the container 24. Temperatures associated with the various exemplary but non-limiting convective/non-contact/dry cooking modes are between about 100° F. and 475° F. For example, temperatures associated with an air frying operation may be between about 300° F., temperatures associated with a roasting operation may be between about 250° F. and about 400° F., temperatures associated with a dehydrating operation may be between about 100° F. and about 200° F., and a broiling operation may be at a temperature of about 450° F. However, the temperatures provided herein are intended as an example only and it should be understood that any of the cooking modes described herein may be performed at other temperatures.

Figure 12:
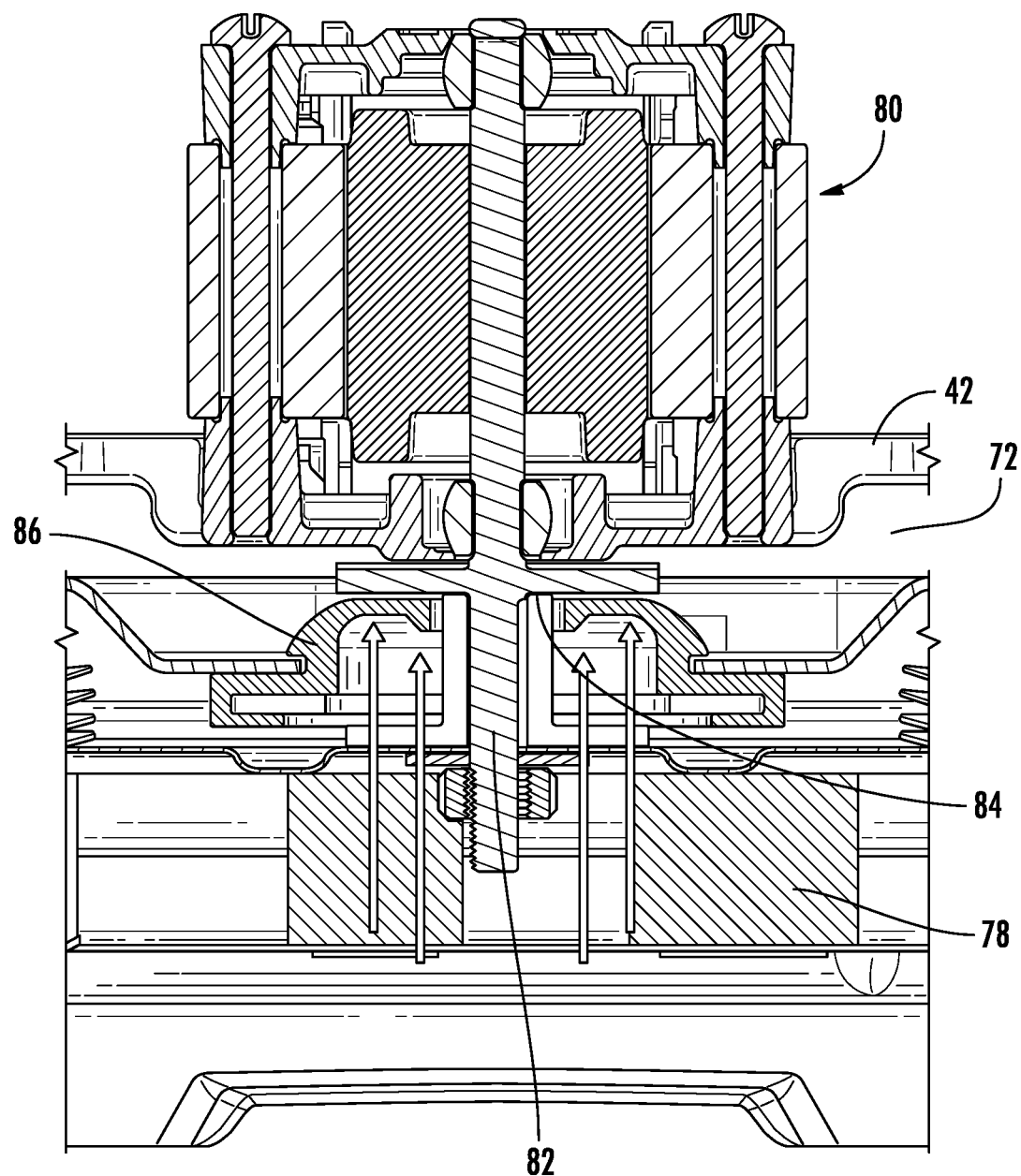
FIG. 12 is a cross-sectional view of a sealing element of the cooking system according to an embodiment.

In the illustrated, non-limiting embodiment, the air movement mechanism 78 is arranged within the interior 72 of the inner lid liner 42, downstream from the first heating element 70 relative to the path of circulation of the air. The air movement mechanism 78 is driven by a motor 80 having a separate cooling mechanism coupled thereto. In an embodiment, best shown in FIG. 12, the motor 80 is arranged on an opposite side of the inner lid liner 42 as the air movement mechanism 78. Accordingly, a motor shaft 82 of the motor 80 extends through an opening 84 formed in the inner lid liner 42. In an embodiment, a sealing device, such as a gasket 86 for example, is positioned between the motor shaft 82 and the inner lid liner 42 to minimize or eliminate friction of the motor shaft 82 as it rotates, while maintaining a pressure tight seal with the inner lid liner 42. In an embodiment, the gasket 86 is designed to deflect in response to pressure. In such embodiments, when the heating volume is not pressurized, such as during air fry operations where the motor shaft 82 is rotated about its axis, no contact is formed between the motor shaft 82 and the gasket 86. Accordingly, when the heating volume is not pressurized, the motor shaft 82 is configured to rotate freely absent friction from the gasket 86. Further, the motor 80 is not configured to operate when the heating volume is pressurized. Therefore, in response to the pressure within the heating volume, the gasket 86 will deflect to form a retaining feature that creates an air-tight seal with the motor shaft 82, thereby allowing pressure to build within the heating volume.

In an embodiment, the second heating element 74 is operable to cook food within the cooking container 32 via a contact cooking operation. As used herein, the term "contact cooking operation" includes a cooking operation where heat is transmitted via direct or indirect contact between a heating element or heat source and a food item, such as, but not limited to, conductive cooking. Inductive cooking via the lower heating element 74 is also contemplated herein. It should be understood that embodiments where the first heating element 70 is operable to perform a contact cooking operation and embodiments where the second heating element 74 is operable to perform a non-contact cooking operation are also within the scope of the disclosure. Non-contact or conductive cooking operations may generally be referred to as "wet cooking" operations, such as but not limited to pressure cooking, steam cooking, slow cooking, searing, and sautéing. To create a wet cooking environment the majority of the moisture within the container, i.e. liquid added to the container 24 or moisture released from the food within the container 24, is retained within the container as the food is cooked. Although during conductive cooking operations a minimal amount of air having moisture entrained therein may be vented from the system, such air is passively removed from the cooking enclosure. Pressure cooking as used herein will allow for cooking in a pressurized environment at or above 40 kPa (with a range of 40 kPa to 90 kPa).

Further, in embodiments including a first heating element 70 and a second heating element 74, it should be understood that the first and second heating elements 70, 74 may be operable independently or in combination to apply one or more predetermined power settings to cook the food products within the cooking container 32. In operation, the first and second heating elements 70, 74 may be capable of cooking the food independent of the loading of the food. In other words, the first and second heating elements 70, 74 may be capable of cooking the food independent of the amount of food within the cooking container 32. The cooking operations that may be performed by the cooking system 20 include but are not limited to pressure cooking, steam cooking, slow cooking, searing, sautéing air frying, broiling, baking/roasting, dehydrating, and grilling.

With reference to FIGS. 4-6, the lid 24 includes a heater/fan cover 90 that protects a user from the first heating element 70 and an air movement mechanism 78 and protects the first heating element 70 and an air movement mechanism 78 from the areas of the cooking system 20 where food is cooked. In the illustrated non-limiting embodiment, the cover 90 is mounted within the lid 24, such as adjacent, and more specifically upstream from, the first heating element 70 relative to an air flow. The cover 90 may be sized to substantially overlap, and therefore protect, the entire surface of the first heating element 70 facing the cooking volume. In an embodiment, a contour of the cover 90 is generally complementary to the shape of the first heating element 70 to protect the surface of the first heating element 70 closest to or facing the cooking chamber 34. However, in other embodiments, the contour of the cover 90 may be complementary to the interior of the lid 24.

As best shown in FIGS. 5 and 6, the cover 90 generally includes a body formed from any suitable heat-resistant material. The body of the cover 90 has a plurality of openings 92 formed therein to allow hot air circulating within the cooking chamber 34 of the cooking container 32 to pass there through. In the illustrated, non-limiting embodiment, the cover 90 has a nano-ceramic coating and is mounted via any suitable mounting mechanism, such as via one or more fasteners for example, and may be removably or permanently arranged therein. Accordingly, when the lid 24 is in the closed position, the cover 90 is arranged generally above the first open end of the cooking container 32.

To prevent the pressure within heating volume from increasing during a non-pressurized cooking operation as a result of the increased temperature, the cooking system 20 includes at least one vent for fluidly connecting the heating volume, and therefore the interior 34 of the cooking container 32, with the ambient atmosphere external to the cooking system 20. Although, the one or more vents are illustrated and described herein as being formed in a portion of the lid 24, it should be understood that vents arranged at another suitable location of the cooking system 20 are within the scope of the disclosure.

Figure 19:
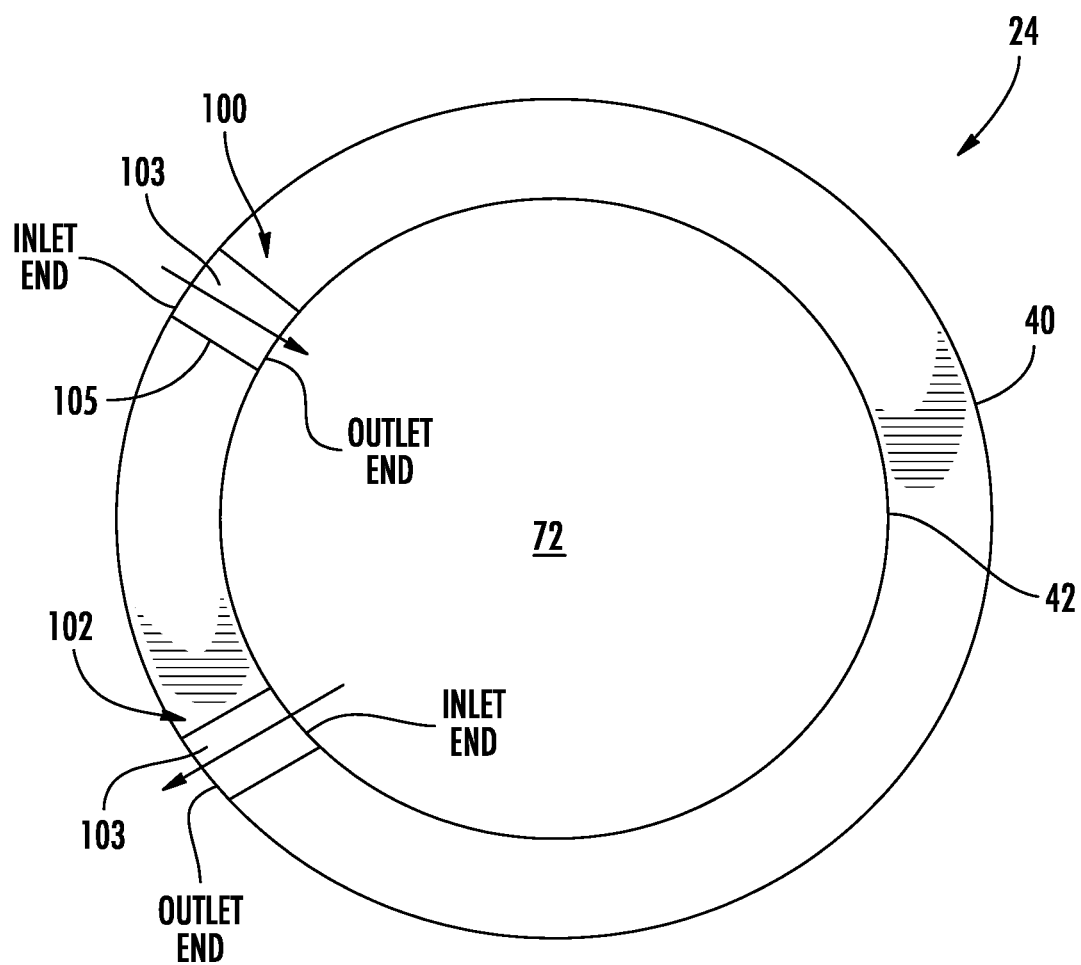
FIG. 19 is a schematic diagram of the venting system of the lid according to an embodiment.

As best shown in FIGS. 16A-17C and FIG. 19, the cooking system 20 includes at least one inlet vent 100 through which a fluid is configured to flow into the heating volume and at least one outlet vent 102 through which a fluid is expelled from the heating volume. In an embodiment, each of the at least one inlet vent 100 and outlet vent 102 is operable to control a flow through the inner lid liner 42 and into or out of the heating volume. As best shown in FIG. 19, the inlet vent 100 and outlet vent 102 each include an opening 103 having an inlet end and an outlet end associated with or defined in the lid housing 40 and the inner lid liner 42, respectively. For example, the inlet end of the opening 103 of the inlet vent 100 is formed in the lid housing 40 and the outlet end of the opening 103 of the inlet vent 100 is located at the inner lid liner 42. Similarly, the inlet end of the opening 103 of the outlet vent 102 is arranged at the inner lid liner 42 and the outlet end of the opening 103 of the outlet vent 102 is formed in the lid housing 40. Accordingly, each of the openings 103 defines a fluid flow path extending between the ambient atmosphere surrounding the exterior of the lid 24 and the atmosphere within the interior 72 of the inner lid liner 42. In an embodiment, a conduit 105 may extend between lid housing 40 and the inner lid liner 42 to define one or more boundaries of a respective fluid flow path of the inlet and outlet vents 100, 102. However, in other embodiments, the portion of the fluid flow path extending between the interior 53 of the lid housing 40 and the exterior 55 of the inner lid liner 42 may be unbounded. In such embodiments, a pressure differential, such as resulting from operation of the air movement device 78 for example, may be sufficient to move a flow between the inlet and outlet ends of the fluid flow path of each of the inlet and outlet vents 100, 102, respectively. In yet another embodiment, the surface 55 of the inner lid liner 42 may directly abut the surface 53 of the lid housing 40 at the inlet and outlet ends of the openings 103. As a result, flow through the inlet end and outlet end of each opening 103 may be aligned and directly position next to one another such that a fluid flow passes directly between the body of the lid housing and the body of the inner lid liner 42.

With reference again to FIG. 3, the motor 80 may be arranged within a motor cavity 81 isolated from the remainder of the interior 44 of the lid 24. As shown, a motor cavity vent 104 may be formed in the lid 24 in fluid communication with the motor cavity 81. Air is configured to flow through the motor cavity 81 to cool the motor 80. In an embodiment, another air movement device 83 (see FIG. 4) is positioned within the motor cavity 81. This air movement device 83 may be driven by the motor 81 and is operable to facilitate a cooling flow into and out of the motor cavity 81.

One or more of the at least one inlet vent 100 and outlet vent 102 may be adjustable to control the amount of a fluid, such as air for example, provided to or exhausted from the heating volume. In an embodiment, each of the at least one inlet vent 100 and the at least one outlet vent 102 includes an element 106, such as a flap, slat, or another mechanism for example, that is movable to cover or expose at least a portion of the opening 103 of the inlet and outlet vents 100, 102, respectively. The at least one inlet vent 100 and the movable element 106 associated therewith may be considered a first venting system and the at least one outlet vent 102 and the movable element 106 associated therewith may be considered a second venting system.

Figure 13:
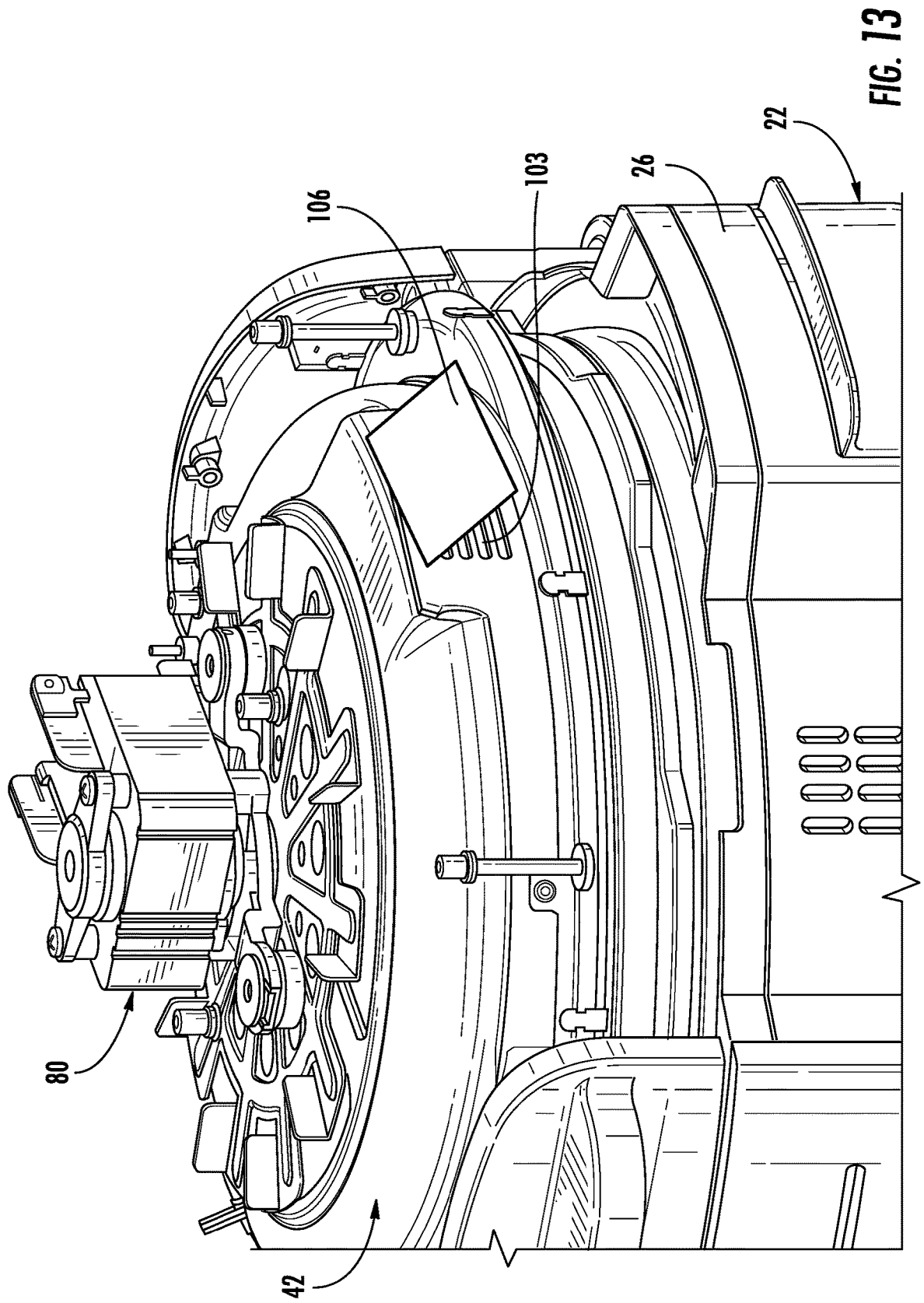
FIG. 13 is a perspective view of a portion of a lid of the cooking system according to an embodiment.
Figure 14:
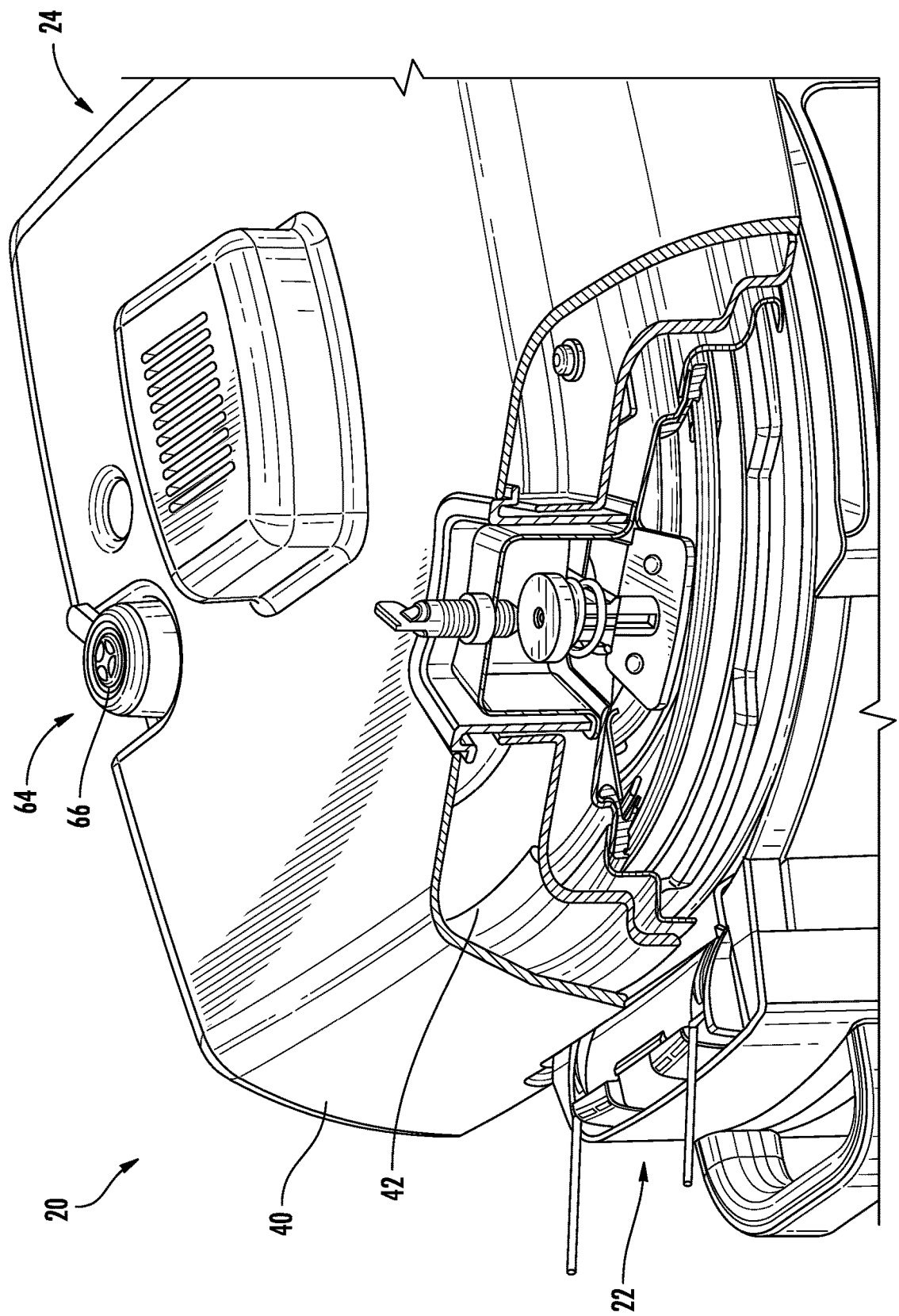
FIG. 14 is a perspective view of a partially cut away lid of the cooking system according to an embodiment.

In an embodiment, illustrated in FIG. 13, the movable element 106 is a flap or door arranged at an outer periphery of the inner lid liner 42 and movable vertically in and out of contact with an opening 103. With reference again to FIGS. 5-6 and FIGS. 15-17C, the movable element 106 may alternatively be arranged within the interior of the inner lid liner 42 adjacent to the outlet end of the opening 103 of the inlet vent 100 and the inlet end of the opening 103 of the outlet vent 102. In such embodiments, the movable element 106 is at a first position, at least partially separated from the opening 103 when the cooking container 32 is not pressurized. For example, as shown in FIG. 15, during an air fry operation, at least a portion of the movable element 106 is in a vertically lowered position, offset from the opening 103, such that air and steam are free to flow through the opening 103. However, once a pressure within the heating volume increases and exceeds a threshold, the pressure may be configured to act on and move the movable element 106. The force exerted by the pressure on the movable element 106 may move the element to a second position such that the movable element 106 blocks or seals the opening 103. Accordingly, when the movable element 106 is in the second position, such as during a pressure cooking operation for example, the movable element 106 seals the opening 103 thereby allowing the pressure within the cooking container 32 to increase. However, it should be understood that embodiments including a movable element 106 having another configuration and also embodiments where the movable element 106 moves in a different manner are also within the scope of the disclosure.

In an embodiment, a portion of the movable element 106 remains directly adjacent to the opening 103 as the movable element 106 moves relative to the housing 26 or lid 24. For example, the movable element 106 may have a first end 108 that remains generally fixed relative to an adjacent opening 103 and a second end 110 configured to move relative to the opening 103, thereby exposing at least a portion of the opening 103 to allow a fluid to flow there through. With reference to again FIGS. 16A-17C, in an embodiment, the second end 110 of the movable element 106 is configured to pivot or rotate relative to the opening 103. However, other types of movement, such as translation of the movable element 106 for example, are also contemplated herein.

In the illustrated, non-limiting embodiment, the movable element 106 is configured to rotate about an axis oriented generally parallel to the axis of rotation of the air movement mechanism 78. In such embodiments, the second movable end 110 may be configured to rotate inwardly toward a center of the lid 24. Accordingly, the flow path defined between the opening 103 and the rotated movable element 106 increases with respect to a direction of flow relative to the vent 100, 102. For example, in embodiments where the air movement mechanism 78, and therefore the air flow within the interior of the inner lid liner 42, is rotating in a clockwise direction, the downstream or trailing end of the movable element 106 associated with the inlet vent 100 is rotated inwardly. As a result, the portion of the opening 103 adjacent to the trailing end of the movable element 106 has a greater airflow capacity than portion of the opening 103 adjacent to the leading end of the movable element 106. Similarly, the upstream or leading end of the movable element 106 associated with the outlet vent 102 may be configured to rotate inwardly. As a result, the portion of the opening 103 adjacent the leading end of the movable element 106 has a greater airflow capacity than the portion of the opening 103 adjacent to the trailing end of the movable element 106.

Figure 16A:
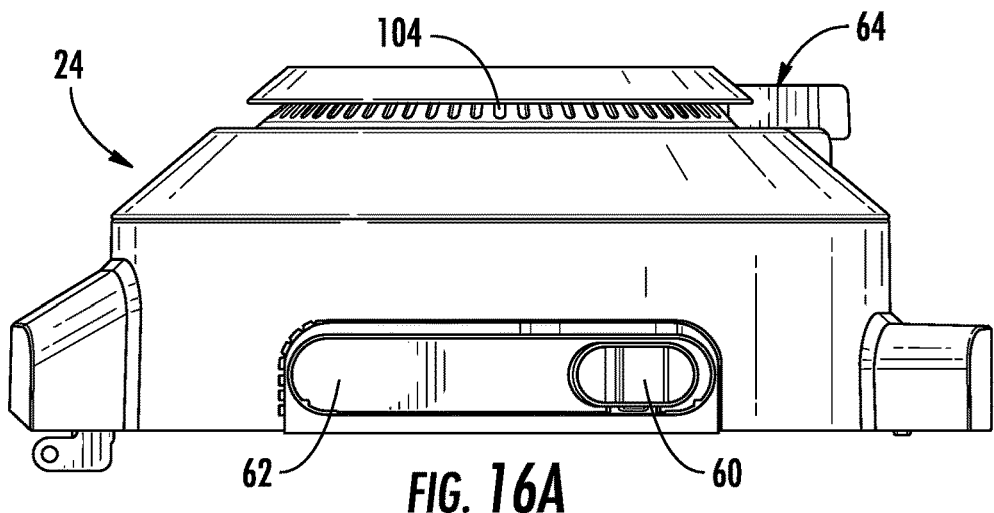
FIGS. 16A, 16B, and 16C are front views of a lid of a cooking system according to an embodiment.
Figure 16B:
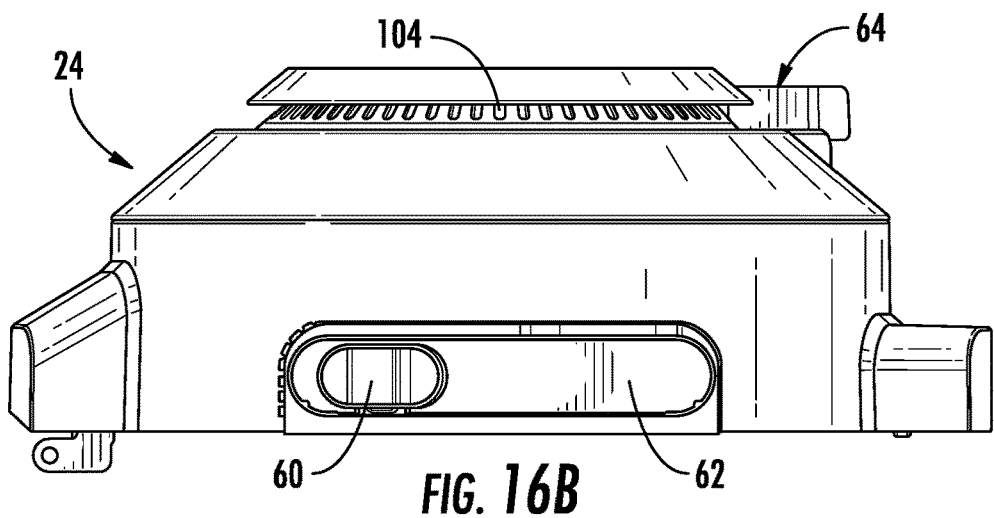
Figure 16C:
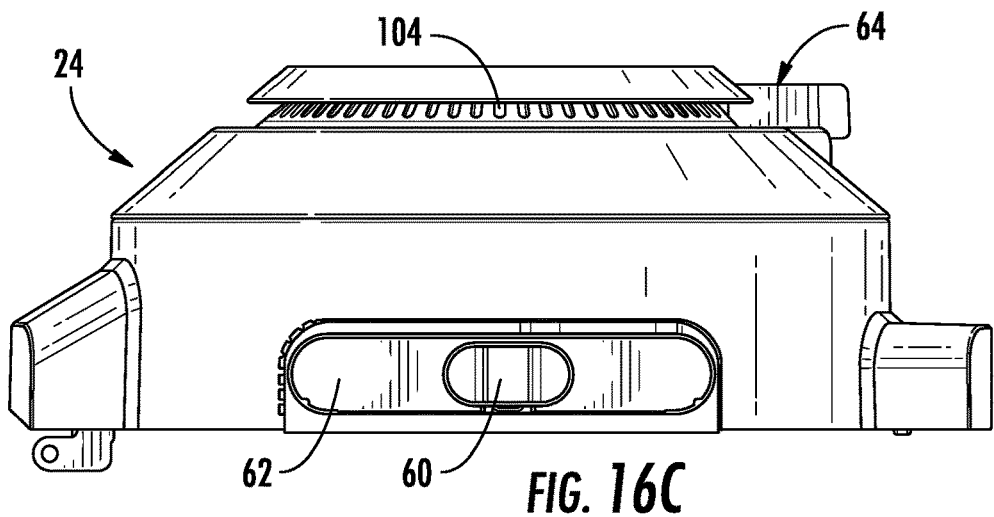
Figure 17A:
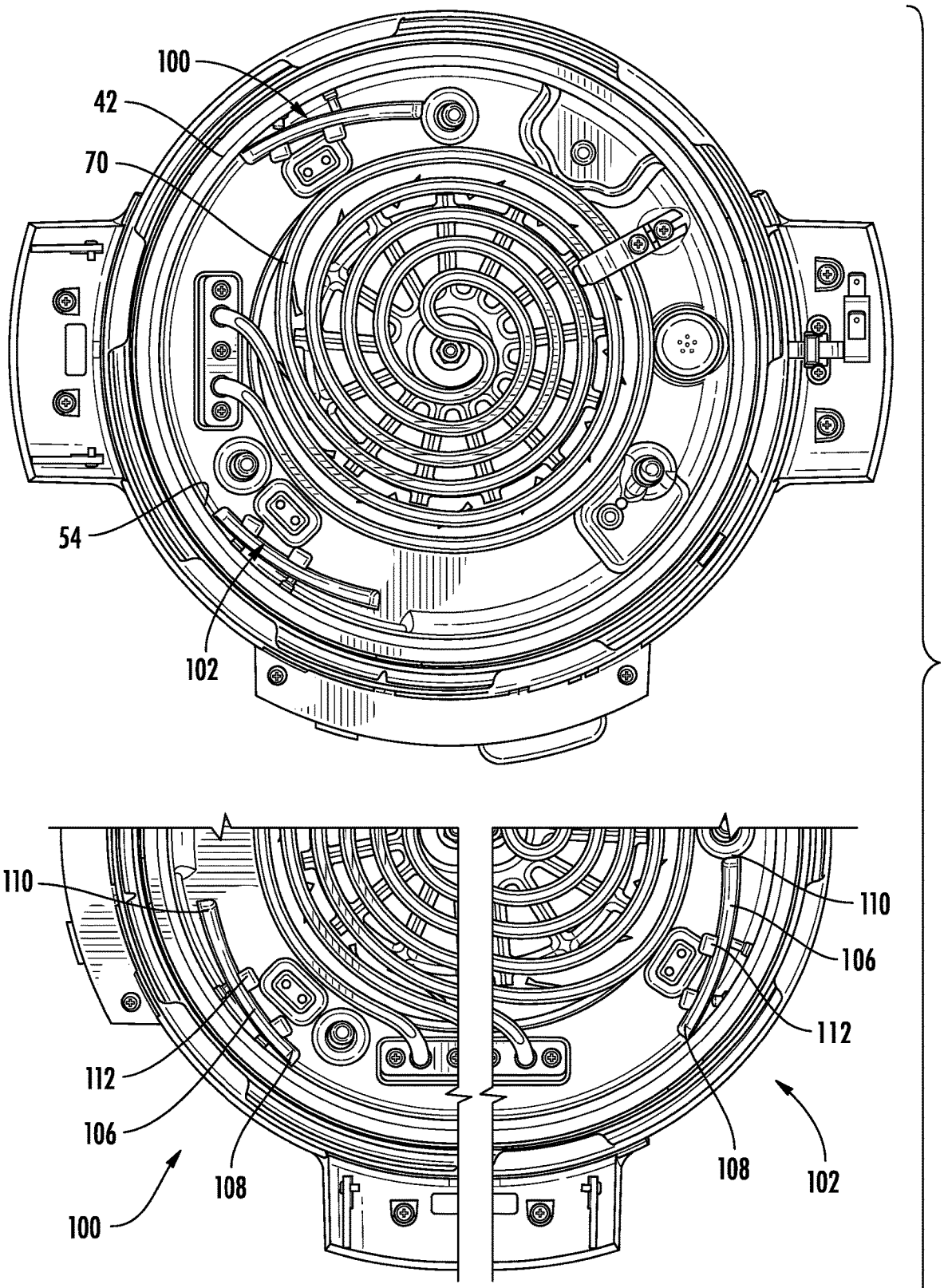
FIGS. 17A, 17B, and 17C are various top views of a lid according to an embodiment.
Figure 17B:
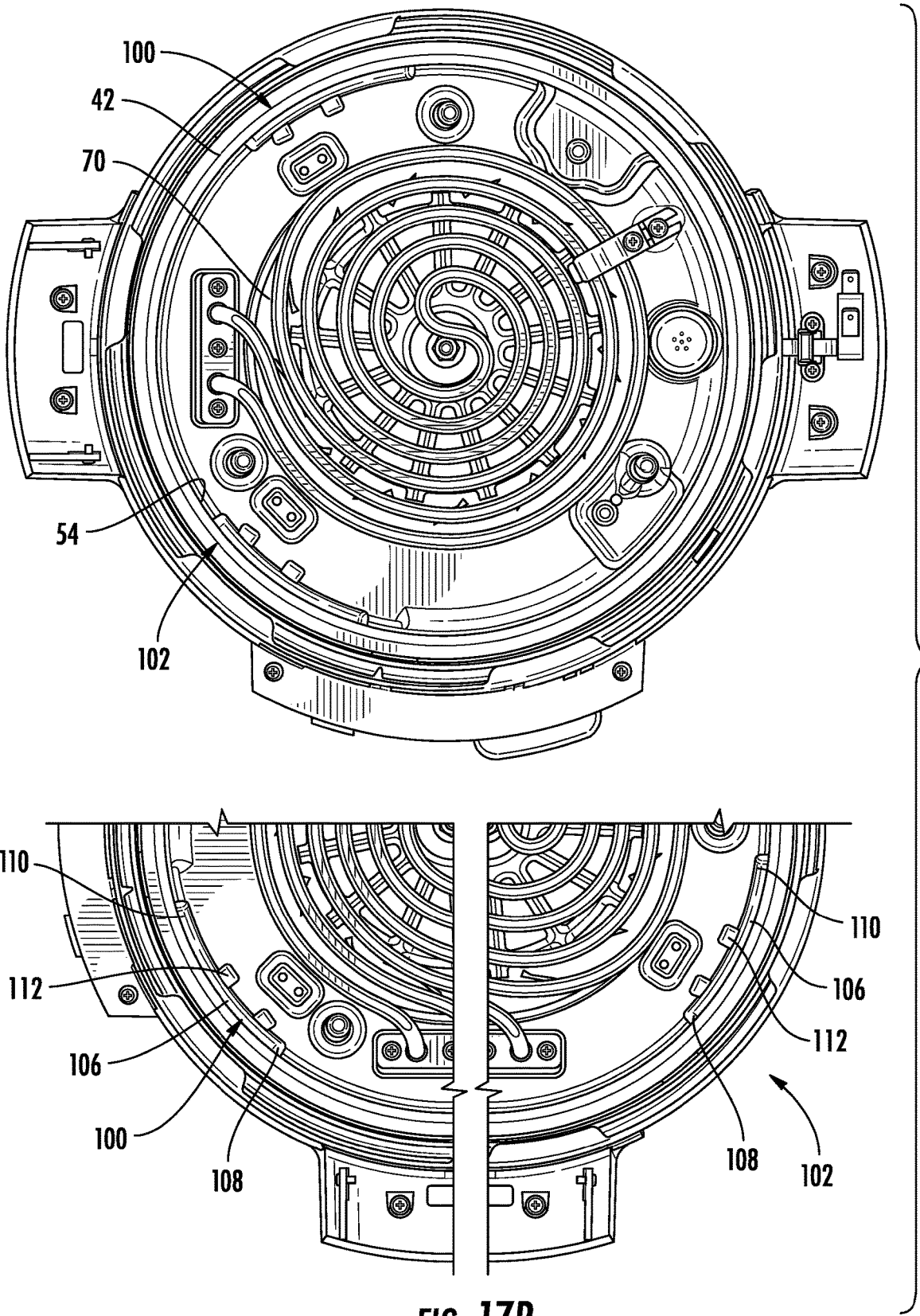
Figure 17C:
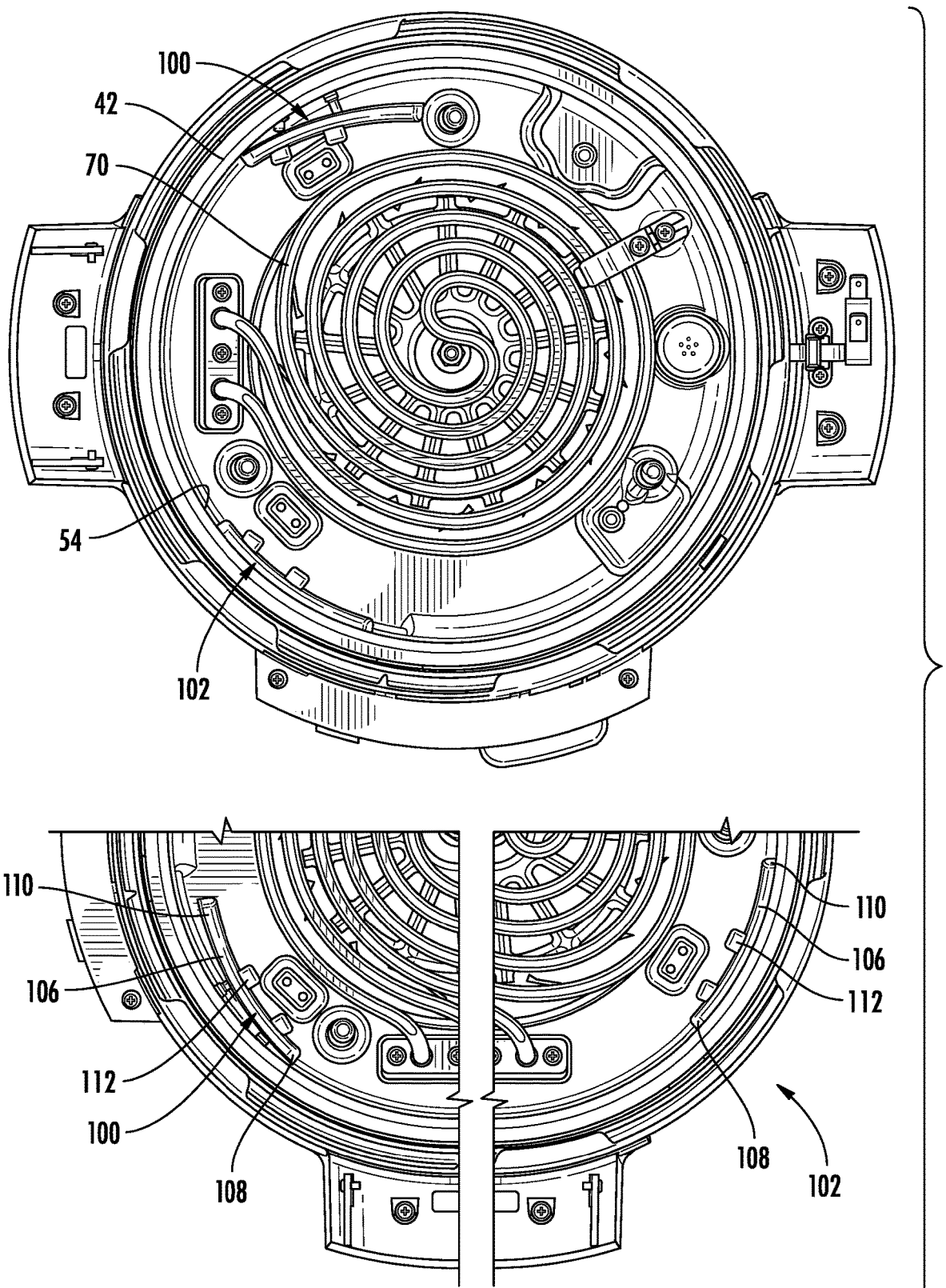

In an embodiment, the position of the movable element 106 relative to the opening 103 is adjustable to control a flow through one or both of the inlet vent 100 and the outlet vent 102 in response to a selected mode or cooking operation of the cooking system 20. For example, during a first cooking operation, such as an air frying operation, the inlet vent 100 may be partially or fully open, so that a fluid may flow through the opening 103 into the heating volume (see FIGS. 5, 16A and 17A). Further, the outlet vent 102 may also be at least partially or fully open to allow air to exhaust from the cooking container 32, thereby preventing the pressure within the heating volume from increasing in response to the air flow being drawn into the heating volume and operation of the heating element 70. With reference now to FIGS. 6, 16B 17B, during a second cooking operation, such as a pressure cooking operation, the opening 103 of both the inlet vent 100 and the outlet vent 102 may be sealed or substantially sealed to block air from flowing into and out of the heating volume. In such embodiments, a high-pressure cooking environment may be achievable, with pressure levels reaching and/or exceeding 40 kPa. Similarly, in an embodiment, best shown in FIGS. 16C and 17C, during a third mode of operation of the cooking system 20, such as a combination pressure cooking and air frying mode, the inlet vent 100 may be partially or fully open and the outlet vent 102 may be sealed.

In an embodiment, the lid lock 52 is used to adjust the position of the movable element 106 of at least one of the inlet vent 100 and the outlet vent 102 to control the flow therethrough. As a result, a user may transform the lid lock 52 between a first configuration and a second configuration to selectively seal the one or more inlet and outlet vents 100, 102. For example, when the mode selector 60 is adjacent to or in contact with a first side of the opening 62 (FIG. 5, 16A) and therefore the lid lock 52 is in a first configuration, at least one of the inlet vent 100 and the outlet vent 102 may be open such that the heating volume is not sealed. Similarly, when the mode selector 60 is arranged adjacent to or in contact with a second, opposite side of the opening 62 (FIG. 6, 16B), and therefore the lid lock 52, is in a second configuration, both the inlet vent 100 and the outlet vent 102 may be sealed, and as a result, pressure can build within the heating volume. It should be understood that this movement of the mode selector 60 within an opening 62 of the lid housing 40 to drive rotation of the lid lock 52 is intended as an example only, and that any suitable configuration of a lid lock 52 that allows a user to manipulate the sealing surface 46, to selectively form a pressure-tight seal with the housing 26 or the cooking container 32 is within the scope of the disclosure.

In an embodiment, the interior surface 53 of the lid lock 52 may include a ramp-like feature (not shown) configured to cooperate with a biased plunger 112 used to mount the movable element 106 to a portion of the lid 24, such as the inner lid liner 42, adjacent to a respective opening 103. As the mode selector 60 is rotated within the slot 62, the ramp-like feature will engage and apply an increasing force to the plunger 112 opposing its bias. This force will cause the plunger, and therefore the movable element 106, to move, such as in a direction away from the opening 103 for example. Movement of the mode selector 60 in the opposite direction will move the ramp-like feature out of engagement with the plunger 112 and the biasing force acting on the plunger 112 will cause the plunger 112 to move back to a neutral position. In an embodiment, in the neutral position, the movable element 106 is positioned directly adjacent to the opening 103, to block the airflow therethrough. Although engagement of the ramp-like feature and the plunger 112 is described as moving the element 106 away from the opening 103, it should be understood that embodiments where the engagement of the ramp-like feature and the plunger 112 moves the element 106 towards the opening 103 and the bias of the plunger 112 moves the element 106 away from the opening 103 are also contemplated herein. Further, it should be understood that the cooperation between the lid lock 52 and movable elements 106 as described herein is intended as an example only and any suitable mechanism for adjusting a configuration of the at least one vent is within the scope of the disclosure.

Although a configuration of the inlet vent 100 and the outlet vent 102 is described above as being dependent on a cooking operation, in other embodiments, the vents 100, 102 may be alternatively or additionally adjustable in response to feedback from one or more sensors disposed within the cooking volume. For example, a temperature of a heating element or within the cooking volume may be monitored by the sensors and/or used to control a position of the movable elements 106.

With reference again to FIGS. 1, 4, and 6, a control panel or user interface 120 of the cooking system 20 is positioned adjacent one or more sides of the housing 26 or the lid 24, such as a front of the housing 26 for example. The control panel 120 includes one or more inputs 122 associated with energizing the one or more heating elements 70, 74 of the cooking system 20 by selecting and/or initiating a mode of operation of the cooking system 20. One or more of the inputs 122 may include a light or other indicator to indicate to a user that the respective input has been selected. The control panel 120 may additionally include a display 124 separate from or integral with the at least one input 122.

Figure 18:
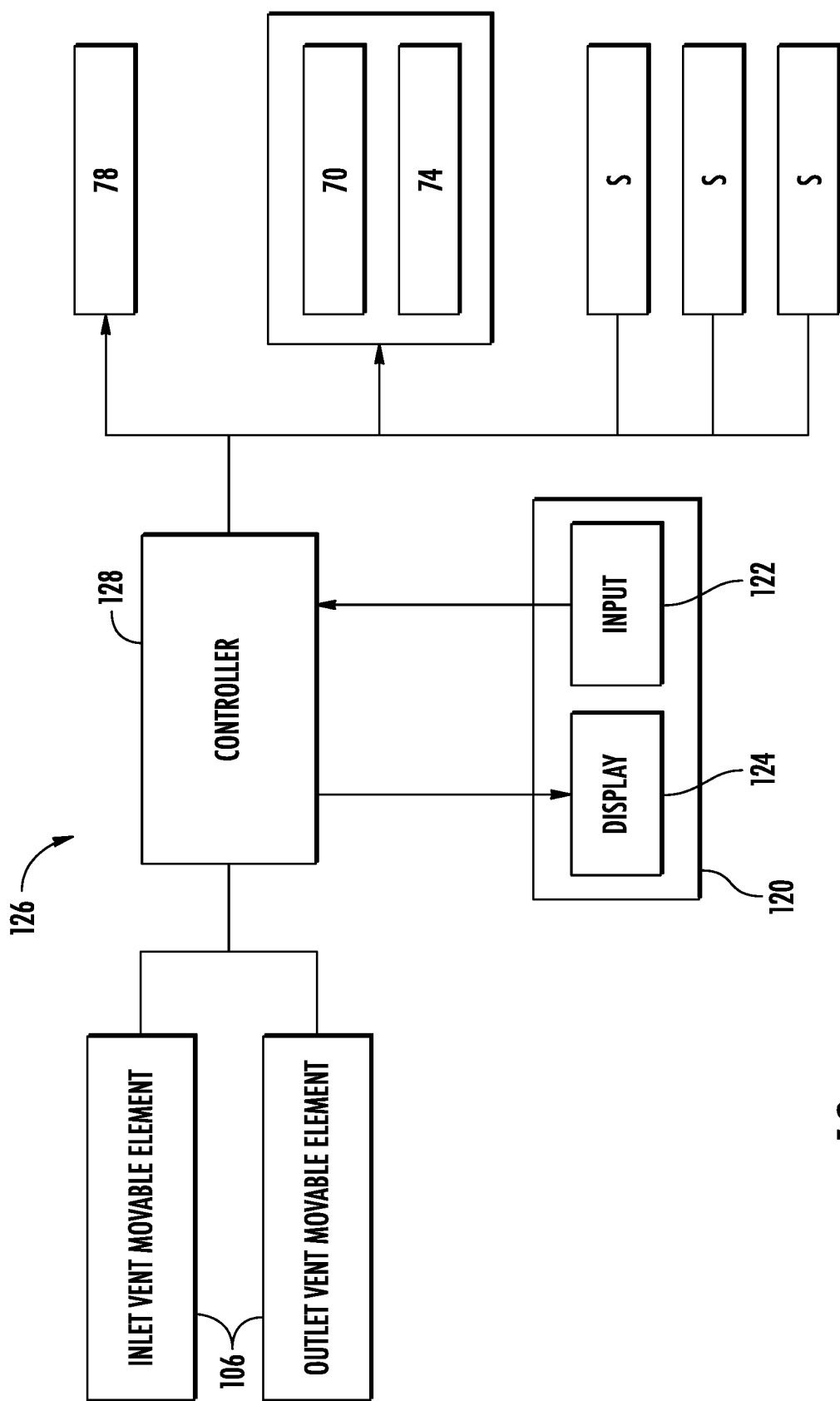
FIG. 18 is a schematic diagram of a control system of a cooking system according to an embodiment.

As shown in FIG. 18, a control system 126 of the cooking system 20 includes a controller or processor 128 for controlling operation of the heating elements 70, 74 and air movement mechanism 78 (including the motor 80 and fan associated therewith), and in some embodiments for executing stored sequences of heating operation. The controller 128 is operably coupled to the control panel 120, to the heating elements 70, 74, to the air movement mechanism 78, and in some embodiments, to the movable elements 106 for controlling a fluid flow through the inlet and outlet vents 100, 102. In addition, in an embodiment, one or more sensors S for monitoring one or more parameters (such as temperature, pressure, lid configuration, etc.) associated with operation of the heating elements 70, 74 may be arranged in communication with the controller 128. It should be understood that the sensors S may be the same, or alternatively, may be different than the sensors that provide feedback to control a fluid flow through the inlet vent 100 and/or outlet vent 102. In an embodiment, a first temperature sensor is located within the lid 24 proximate the first second heating element 70 and a second temperature sensor extends from a bottom surface of the liner 28 proximate the second heating element 74. In such embodiments, the first temperature sensor may be used, such as to monitor temperature for example, when the lid 24 is closed and the first temperature sensor S is arranged in fluid communication with the hollow interior 30 of the cooking system 20. The first temperature sensor may be used to monitor temperature in this manner, separately or in conjunction with the second temperature sensor.

As previously described, the cooking system 20 is capable of performing a plurality of cooking operations including a convective and conductive cooking operation. In such embodiments, the cooking operations include, but are not limited to air frying, pressure cooking, broiling, baking/roasting, dehydrating, slow cooking, steaming, searing, sautéing, and/or any combination thereof. To perform a cooking operation that includes a combination of multiple types of cooking modes, the food item need not be removed from the cooking container 32 as the cooking system 20 transforms between a first mode, such as a pressure cooking mode for example, and a second mode, such as an air frying mode for example.

The at least one input 122 may be used to select a mode or cooking operation of the cooking system 20. In an embodiment, the functionality of the control system 126, and therefore the inputs available to a user, may vary in response to the position of the mode selector 60 of the lid lock 52 and/or in response to the configuration of the one or more inlet and outlet vents 100, 102, which may be controlled by the mode selector 60. For example, one or more inputs 122 of the control panel 120 may be activated when the mode selector 60 is in the first position associated with a first cooking mode such as a conductive cooking mode, and one or more different inputs may be activatable when the mode selector 60 is in the second position associated with a second cooking mode, such as a convective cooking mode. Further, another group of different inputs may be activated when the mode selector 60 is in a third position, disposed between the first and second positions, and associated with a third cooking mode, such as a combination cooking mode. In an embodiment, one or more sensors, such as reed switches for example, may be mounted to the lid lock 52 to indicate to the controller 128 the position of the lid lock 52, and in response, a respective portion of the user interface 120 will be energized for selection by a user.

As previously described, the cooking system 20 may be operated in a cooking mode that uses conductive cooking. In the conductive cooking mode, the cooking system 20 may perform a pressure-cooking operation. In such embodiments, the lid lock 52 is affixed to the cooking container 32 or housing 26 to form a pressure-tight, sealed enclosure with the cooking container 32. During operation in the pressure cooker mode, the controller 128 initiates operation of the second heating element 74, causing the temperature and therefore the pressure, within the enclosure formed by the cooking container 32 and the interior of the inner lid liner 42 to rise. During operation in the pressure cooker mode, the heating element 70 disposed within the lid 24 is typically not energized. In embodiments where the cooking system 20 is operable in a pressure cooking mode, the liner 28 should be formed from a more rigid material capable of withstanding the pressure build up within the cooking container 32.

As is noted above, another of the cooking modes of the cooking system 20 employs convective cooking, for example to perform an air-frying operation. When utilizing the cooking system 20 in the air fryer mode, the controller 128 initiates operation of the first heating element 70 and the air movement mechanism 78 to circulate the hot air through the enclosure formed between the cooking container 32 and the inner lid liner 42. During operation in the air fryer mode, the second heating element 74 is generally not energized. However, embodiments where the first heating element 74 is energized are also within the scope of the disclosure.

The air movement mechanism 78 draws air upward through the adjacent heating element 70 and expels the hot air outwardly towards a guide (not shown, and which, in an exemplary embodiment, actually surrounds the fan 78). The guide deflects the air downwardly towards the sides of the cooking container 32. The air travels down through an annulus 130 formed between the cooking container 32 and the basket 36a until it is deflected off the bottom of the cooking container 32 and drawn up by the air movement mechanism 78 towards the diffuser 36b and an end of the basket 36a with an aperture pattern. The hot air flows over and between the plurality of vanes of the air diffuser 36b, which impart a rotational motion to the hot air, thereby creating a vortex as the air is drawn through the apertures and into the interior of the basket 36a by the air movement mechanism 78. After traversing the interior of the basket 36a, the air is drawn back up through the heating element 70 and into the air movement mechanism 78 for further circulation.

As the air circulates through the cooking container 32, and specifically the basket 36a, the hot air cooks and forms a crispy outer layer on the food items disposed therein as a result of the Maillard effect. In an embodiment, a liquid, such as oil or fat, is contained within the enclosure, such as at the bottom of the cooking container 32. The liquid may be added to the cooking container 32 prior to operation in the air fry mode, or alternatively, may be produced as a residual material as the hot air passes over the food within the cooking container 32. In embodiments where a liquid is disposed at the bottom of the cooking container 32, as the air circulates through the cooking chamber 34 of the cooking container 32, a portion of the liquid becomes entrained in the air flow and is heated.

During operation in any of the cooking modes of the cooking system 20, the controller 128 initiates operation of at least one of the first heating element 70 and the second heating element 74, causing the temperature within the cooking container 32 to increase. As previously described, the cooking system 20 may include one or more temperature sensors S for monitoring conditions within the cooking chamber 34. As is also previously described, a first temperature sensor may be arranged near the one of the heating elements 70, 74 and a second temperature sensor may be arranged near one of the heating elements or adjacent to the cooking container 32 to measure a temperature thereof. Upon detection that the temperature adjacent a heating element 70, 74 or within or at the cooking container 32 is equal to or exceeds a predetermined threshold, the controller 128 may de-energize the heating element 70, 74 until the temperature has returned to an acceptable level.

The cooking system 20 may additionally be configured to operate in another or third cooking mode that functions as a combination of two or more cooking modes. In the combination cooking mode, the cooking system 20 is configured to perform a first cooking operation and a second cooking operation sequentially and in response to a single input provided by a user. In an embodiment, during the first cooking operation of the combination cooking mode, a conductive cooking operation is performed and during the second cooking operation of the combination cooking mode, a convective cooking operation is performed. Further, the first cooking operation may be a steam, slow, or pressure cooking operation and the second cooking operation may be an air frying operation. In such embodiments, the controller 128 may execute a stored sequence where the second heating mechanism 74 is operated during a first portion of the sequence to perform the first cooking operation and the first heating mechanism 70 and air movement device 78 are operated during a second portion of the sequence to perform the second cooking operation. For example, in the combination mode, a food item, such as a chicken for example, may be steam or slow or pressure cooked via operation of the second heating element 74. Then, the first heating element 70 and the air movement device 78 may then be operated to air fry the chicken to achieve a crispy exterior layer. However, the embodiments described herein are intended as an example only and any sequence of operation combining both the first and second heating elements 70, 74 is contemplated herein. When operated in a combination of two or more cooking modes, the food need not be removed from the hollow interior 30, or more specifically the container 32 during such a transition.

As previously described, the cooking system 20 includes a plurality of temperature sensors operable to monitor a temperature within the cooking chamber 34. In the illustrated, non-limiting embodiment of FIG. 4, the cooking system 20 is shown as having two temperature sensors S1, S2; however, it should be understood that embodiments having more than two temperatures sensors are also within the scope of the disclosure. Further, although the temperature sensors S1, S2 are illustrated as being arranged at generally the same location relative to the cooking system 20, such as within a shared housing for example, in other embodiments, the temperature sensors S1, S2 may be located remotely from one another. These sensors S1, S2 may be affixed to the lid 24 and/or the housing 26 (or even the container 32) to sense temperature within the heating volume as defined by the container 32 and inner lid liner 42.

In an embodiment, one or more of the plurality of temperature sensors is a negative temperature coefficient (NTC) temperature sensor. Some NTC temperature sensors are designed to function more accurately at lower temperatures, such as between about 180° F.-245° F. (about 80° C.-118° C.) and other NCT temperatures sensors may be designed to function more accurately at higher temperatures, such as between about 245° F.-450° F. (about 118° C.-232° C.). In an embodiment, the cooking system 20 includes at least a first temperatures sensor S1 better suited for monitoring lower temperatures (referred to herein as a "lower temperatures sensor") and a second temperature sensor S2 better suited for monitoring higher temperatures (referred to herein as a "higher temperatures sensor"). The lower temperature sensor S1 may be suitable for detecting the temperature within the cooking chamber 34 during a conductive or contact cooking operation. Similarly, the higher temperature sensor S2 may be suitable for detecting the temperature within the cooking chamber 34 during a convective or non-contact cooking operation.

The transition between the first and second cooking operations during a combination cooking mode may occur automatically in response to the temperatures detected by at least one of the lower temperature sensor S1 and the higher temperature sensor S2. In an embodiment, when operation of the cooking system 20 is initiated in the combination cooking mode, both the lower temperature sensor S1 and the higher temperature sensor S2 are operational and communicate signals indicative of a sensed temperature to the controller 128. The controller 128, however, will select which of the signals to read and/or rely upon based on the sensed temperature when compared to a predetermined threshold associated with that sensor. For example, if the sensed temperature measured by the lower temperature sensor S1 is lower than, for example 90° C., the controller will read signals provided by the lower temperature sensor. However, when the temperature sensed by the lower sensor S1 reaches or exceeds 90° C., the controller 128 will switch from reading the signals provided by the lower temperature sensor S1 to the signals provided by the higher temperature sensor S2. Similarly, if, after switching to the high temperature sensor S2 the sensed temperature measured by the higher temperature sensor S2 remains higher than, for example 90° C., the controller will continue to read signals provided by the high temperature sensor S2. However, when the temperature sensed by the high temperature sensor S2 falls to the threshold of 90° C. or below, the controller 128 may switch from reading the signal provided by the higher temperature sensor S2 to the signals of the lower temperature sensor S1. The thresholds provided herein are intended as an example only. "Switching" or threshold temperature can be in any desirable range such as 80° C.-130° C., 85° C.-125° C., 90° C.-120° C., or any low number and high number range between 80° C.-130° C.

The one or more temperature sensors S of the cooking system 20 may additionally be used to indicate to the controller 128 when to transition from a first cooking operation to a second cooking operation of the combination cooking mode. In an embodiment, the controller 128 may be configured to transition operation of the cooking system 20 from the first cooking operation to the second cooking operation in response to reaching a predetermined threshold temperature(s) (such as but not limited to those discussed above) associated with one of the lower and higher temperature sensors S1, S2, respectively. For example, the threshold temperature associated with the lower temperature sensor S2 may correlate to the temperature required for convective cooking within the cooking chamber 34. When the threshold temperature is reached, the controller 128 may automatically switch from conduction cooking via the lower heating element 74 to convection cooking via the upper heating element 70. Indeed, upon receiving a signal or identifying a condition indicating to the controller 128 to transition the cooking system 20 to the next cooking operation, the controller 128 will deenergize the second heating element 74 and will energize the first heating element 70 and the air movement mechanism 78. Upon transitioning to the second cooking operation, the same sensor or a different sensor than was being used to monitor the temperature during the first cooking operation may be operable to monitor the temperature in the cooking chamber 34. If different, the switch in cooking mode may coincide with the switch in temperature sensor being read (S1 or S2) as discussed above. In other words, reaching a sensed threshold temperature (such as but not limited to threshold temperatures in the ranges discussed above) may signal to the controller 128 to automatically switch just the temperature sensors S1 or S2 to be read, the cooking mode, or both the temperature sensors S1 or S2 to be read and the cooking mode to be executed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:
    a housing defining a hollow chamber configured to receive food, said housing having an upper portion defining an opening to said hollow chamber;
    a lid movable relative to said housing between an open position and a closed position;
    an elongate slot disposed on an exterior surface of said lid;

a mode selector slidably disposed in said elongate slot, the mode selector being actuatable between a first position associated with a first cooking mode, a second position associated with a second cooking mode, and a third position associated with a third cooking mode, the third position being between the first position and the second position;

a lid lock coupled to said mode selector and associated with said lid, said lid being configurable between a lid locked condition with said housing, a lid unlocked condition with said housing, and an intermediate locked position with said housing, via said lid lock, wherein moving said mode selector relative to said lid from the first position to the second position transforms said lid from said lid locked condition to said lid unlocked condition, and moving said mode selector relative to said lid from the first position to the third position transforms said lid from said lid locked condition to said intermediate locked condition; and at least one vent disposed in said lid, wherein said at least one vent comprises an inlet vent and an outlet vent, both of which are configurable between an open vent condition and a closed vent condition via actuation of said mode selector, wherein, when said lid is in said intermediate locked condition, said inlet vent is in said open vent condition and said outlet vent is in said closed vent condition.

2. The cooking system of claim 1, wherein said lid lock is rotatable about an axis relative to said lid to transform said lid between said lid unlocked condition, said intermediate locked condition, and said lid locked condition.

3. The cooking system of claim 1, wherein the second cooking mode comprises a non-pressurized cooking mode wherein said at least one vent is in said open vent condition and the first cooking mode comprises a pressurized cooking mode wherein said at least one vent is in said closed vent condition.

4. The cooking system of claim 3, wherein the non-pressurized cooking mode includes a convection cooking mode and the pressurized cooking mode includes a conductive cooking mode.

5. The cooking system of claim 1, wherein both said inlet vent and said outlet vent are in said open vent condition when said lid is in said lid unlocked condition and both said inlet vent and said outlet vent are in said closed vent condition when said lid is in said lid locked position.

6. The cooking system of claim 5, wherein said third cooking mode comprises a combination cooking mode including at least two separate cooking modes.

7. The cooking system of claim 1, wherein said lid lock further comprises a first portion of an engagement mechanism and said housing further comprises a second portion of said engagement mechanism, and when said lid is in said lid locked condition said first portion and said second portion of said engagement mechanism are coupled.

8. The cooking system of claim 7, wherein said engagement mechanism is a bayonet locking system.

9. The cooking system of claim 1, wherein the cooking system further comprises a user interface including a plurality of inputs, and a functionality of said user interface is determined in response to a position of said lid lock.

10. The cooking system of claim 9, wherein said user interface includes a first portion and a second portion, said first portion is energized when said lid is in said lid unlocked condition and said second portion is energized when said lid is in said lid locked condition.

11. The cooking system of claim 1, further comprising at least one heating element disposed in at least one of said lid and said housing.

12. The cooking system of claim 1, further comprising a first heating element mounted within the lid and a second heating element disposed within the housing.

13. The cooking system of claim 12, wherein said first position of the mode selector allows for activation of the first heating element in the first cooking mode, and said second position of the mode selector allows for activation of the second heating element in the second cooking mode.

14. The cooking system of claim 1, wherein said mode selector is configured to move independently of said elongate slot.

15. A cooking system comprising:
a housing defining a hollow portion configured to receive food;
a lid coupled to the housing and movable between an open position and a closed position;
an elongate slot disposed on an exterior surface of said lid;
a lock ring concentrically disposed in the lid, the lock ring configured to rotate between first, second, and third positions, wherein in the first position the lock ring locks the lid relative to the housing, and wherein in the second position the lock ring releases the lid such that the lid is unlocked relative to the housing, and wherein in the third position the lid is in an intermediate locked position;
at least one vent disposed within the lid, the at least one vent having a closed vent state when the lock ring is in the first position, the at least one vent being moved by the lock ring to a fully open vent state when the lock ring is in the second position, and the at least one vent being moved by the lock ring to a partially open vent state when the lock ring is in the third position; and
a mode selector knob slidably disposed in said elongate slot, wherein said mode selector knob is coupled to the lock ring and configured to move the lock ring between the first position associated with a first cooking mode, the second position associated with a second cooking mode, and the third position associated with a third cooking mode,
wherein said at least one vent comprises an inlet vent and an outlet vent, both of which are configurable between the fully open vent state, the partially open vent state, and the closed vent state via actuation of said mode selector knob, and
wherein, when the lid is in the intermediate locked condition, the inlet vent is in the fully open vent state or the partially open vent state and the outlet vent is in the closed vent state.

16. The cooking system of claim 15, wherein the at least one vent is moved to the open position by the lock ring via a plunger system.

17. The cooking system of claim 15, wherein the lock ring includes a bayonet mechanism for locking the lid relative to the housing.

18. The cooking system of claim 15, further comprising a fan disposed on the lid, the fan configured to create a fluid flow direction, wherein the inlet vent extends with the fluid flow direction and the outlet vent extends against the fluid flow direction.

19. A cooking system comprising:
a housing defining a hollow food chamber;
a lid coupled to the housing and lid movable between an open position and a closed position;
an elongate slot disposed on an exterior surface of said lid;

a mode selector knob slidably disposed in said elongate slot and movable between a first position associated with a first cooking mode, a second position associated with a second cooking mode, and a third position associated with a third cooking mode, the third position being between the first position and the second position;

a lock ring disposed within and adjacent to an outer perimeter of the lid, the lock ring being coupled to the mode selector knob such that movement of the mode selector knob from the first position to the second position causes the lock ring to rotatably move from an engaged position in which the lock ring engages the housing to lock the lid relative to the housing to a disengaged position in which the lock ring is disengaged from the housing;

an inlet vent formed in the lid and configured to be moved between a closed vent condition and an open vent condition in response to movement of the mode selector knob from the first position to the second position and/or the third position; and an outlet vent formed in the lid and configured to move between a closed vent condition and an open vent condition in response to movement of the mode selector knob from the first position and/or the third position to the second position, wherein, in the third cooking mode, the inlet vent is in the open vent condition and the outlet vent is in the closed vent condition.

20. The cooking system of claim 19, wherein the lock ring includes a bayonet mechanism for locking the lid relative to the housing.

21. The cooking system of claim 19, wherein the lock ring is configured to move the inlet vent to the open vent condition when the lock ring is in the disengaged position.

22. The cooking system of claim 19, further comprising a fan disposed on the lid, the fan configured to create a fluid flow direction, wherein the inlet vent extends with the fluid flow direction and the outlet vent extends against the fluid flow direction.

* * * * *